United States Patent
Feng et al.

(10) Patent No.: US 12,555,809 B2
(45) Date of Patent: *Feb. 17, 2026

(54) ADDITIVES FOR FLUORENONE/FLUORENOL BASED AQUEOUS REDOX FLOW BATTERIES

(71) Applicant: Battelle Memorial Institute, Richland, WA (US)

(72) Inventors: Ruozhu Feng, Richland, WA (US); Wei Wang, West Richland, WA (US); Xin Zhang, Richland, WA (US); Yangang Liang, Richland, WA (US); Aaron M. Hollas, Richland, WA (US); Yuyan Shao, Richland, WA (US); Vijayakumar Murugesan, Richland, WA (US); Ying Chen, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 819 days.

This patent is subject to a terminal disclaimer.

(21) Appl. No.: 17/748,699

(22) Filed: May 19, 2022

(65) Prior Publication Data
US 2023/0006229 A1 Jan. 5, 2023

Related U.S. Application Data

(60) Provisional application No. 63/208,648, filed on Jun. 9, 2021.

(51) Int. Cl.
*H01M 8/08* (2016.01)
*H01M 8/18* (2006.01)

(52) U.S. Cl.
CPC ............ *H01M 8/08* (2013.01); *H01M 8/188* (2013.01)

(58) Field of Classification Search
CPC ................................ H01M 8/08; H01M 8/188
See application file for complete search history.

(56) References Cited

U.S. PATENT DOCUMENTS 11,591,294 B2 * 2/2023 Wang et al. .......... H01M 8/188
2021/0147347 A1 5/2021 Wang et al.

OTHER PUBLICATIONS

Hollas et al., "A biomimetic high-capacity phenazine-based anolyte for aqueous organic redox flow batteries," *Nature Energy*, Jun. 4, 2018, 3:508-514.
Kato et al., "A ketone/alcohol polymer for cycle of electrolytic hydrogen-fixing with water and releasing under mild conditions"; *Nature Communications*; 7:13032 | DOI: 10.1038/ncomms13032; Sep. 30, 2016; 7 pages.
Lin et al., "Alkaline quinone flow battery," *Science*, Sep. 25, 2015, 349(6255):1529-1532.

(Continued)

*Primary Examiner* — Matthew T Martin
*Assistant Examiner* — Alexandra J Simmons
(74) *Attorney, Agent, or Firm* — Klarquist Sparkman, LLP

(57) ABSTRACT

Aqueous anolytes for redox flow batteries are disclosed. The anolytes include a fluorenone-fluorenol derivative, an additive comprising an organic compound including one or more proton acceptor groups, an alkali metal hydroxide, and water. The additive functions as a homogeneous organocatalyst and may increase the current density of an aqueous redox flow battery including the anolyte.

20 Claims, 27 Drawing Sheets

(56) References Cited

OTHER PUBLICATIONS

Monte et al., "Experimental and Computational Study of the Thermodynamic Properties of 9-Fluorenone and 9-Fluorenol," *J Chem & Eng Data*, Aug. 15, 2012, 57:2486-2496.

Perepichka et al., "Electron Acceptors of the Fluorene Series. 7.1 2,7-Dicyano,4-5-dinitro-9- X-fluorenes: Synthesis, Cyclic Voltammetry, Charge Transfer Complexation with N-Propylcarbazole in Solution, and X-ray Crystal Structures of Two Tetrathiafulvalene Complexes," *J. Org. Chem*. 1998, 63:6484-6493.

Rodriguez Jr. et al.; "Fluorenone Based Anolyte for an Aqueous Organic Redox-Flow Battery;" *ECS Transactions* 2019, 89(1):49-59.

Sanyal, et al., Hydrogen Bonding Enhances the Electrochemical Hydrogenation of Benzaldehyde in the Aqueous Phase, *Angew. Chem. Int. Ed.* 2021, 60:290-296 (published online Oct. 27, 2020).

Sayfutyarova, et al., "Strategies for Enhancing the Rate Constant of C—H Bond Cleavage by Concerted Proton-Coupled Electron Transfer," *J. Am. Chem. Soc.*, Aug. 29, 2019, 141:15183-15189.

Warner et al., "A Practical Synthesis of 2,6-Dicarboxyfluorenone," *J. Chem. Research (S)* 1998, 814-815.

Zhang et al., "Aerobic Oxidation of 9H-Fluorenes to 9-Fluorenones using Mono-/Multilayer Graphene-Supported Alkaline Catalyst," *ChemPlusChem*, Jul. 2013, 78:703-711 (published online May 28, 2013).

\* cited by examiner

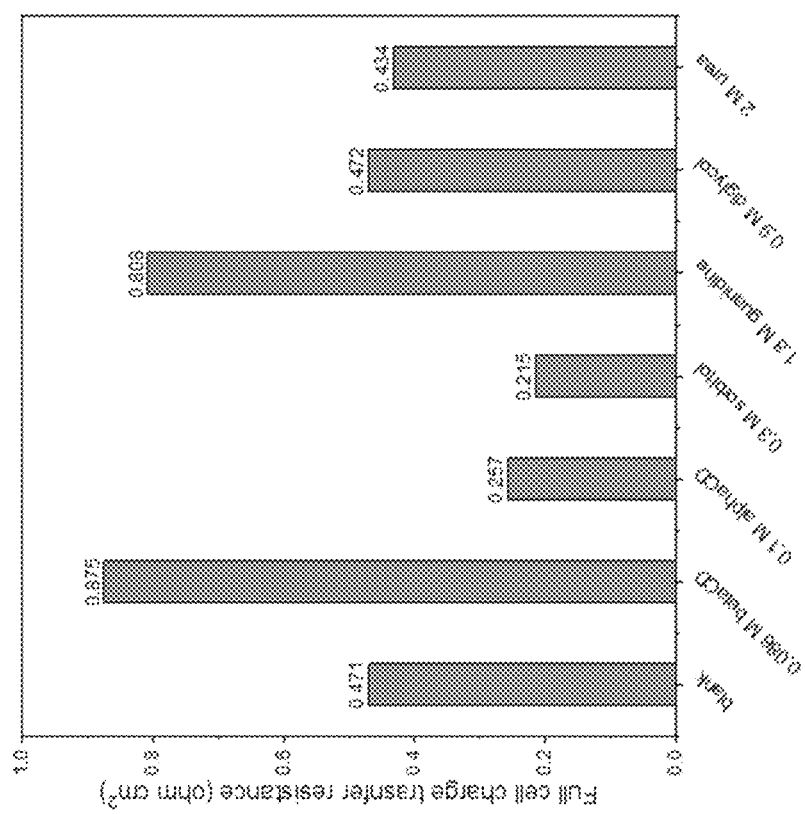
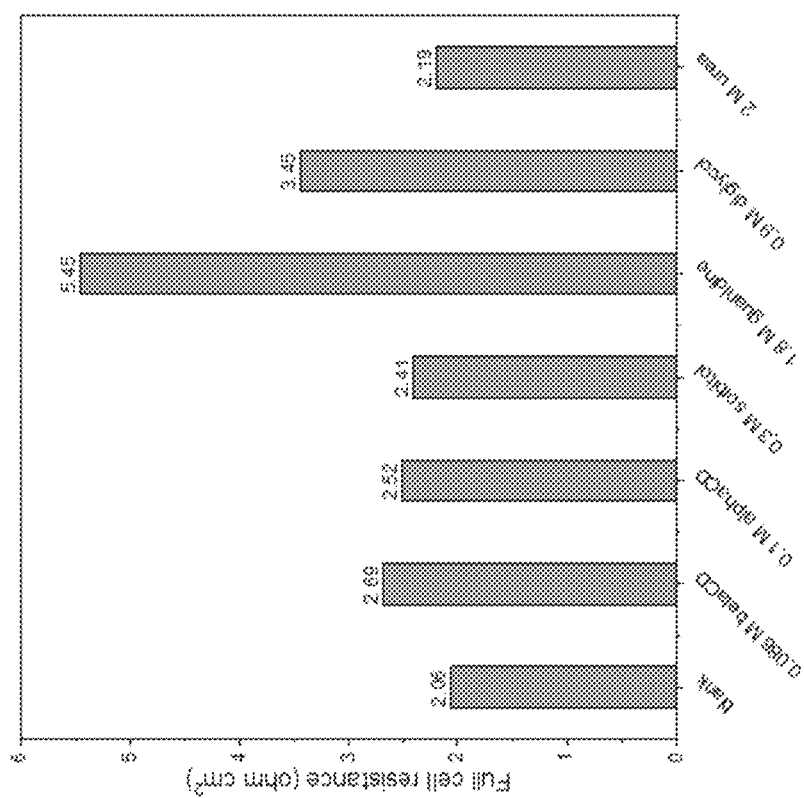
FIG. 24A
FIG. 24B

ADDITIVES FOR FLUORENONE/FLUORENOL BASED AQUEOUS REDOX FLOW BATTERIES

CROSS REFERENCE TO RELATED APPLICATION

This application claims the benefit of the earlier filing date of U.S. Provisional Application No. 63/208,648, filed Jun. 9, 2021, which is incorporated by reference in its entirety herein.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

The present disclosure concerns electrolytes including fluorenone/fluorenol derivatives and additives, as well as aqueous redox flow batteries including the electrolytes.

SUMMARY

Embodiments of an anolyte comprising a fluorenone/fluorenol derivative and an additive are disclosed. Aqueous redox flow batteries (ARFBs) including the anolytes also are disclosed.

In some embodiments, an aqueous composition comprises (i) a fluorenone/fluorenol derivative, (ii) an additive, wherein the additive is an organic compound including one or more proton acceptor groups, (iii) an alkali metal hydroxide, and (iv) water. The fluorenone/fluorenol derivative may have a structure according to any one of formulas I-III:

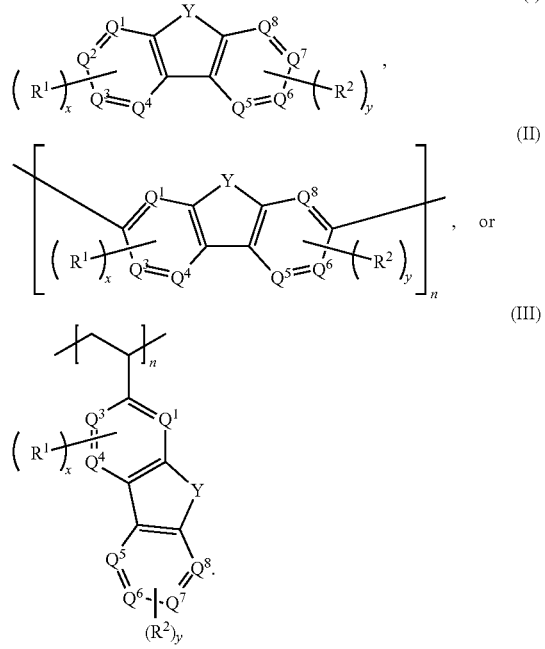

With respect to formulas I-III, $Q^1$-$Q^4$ independently are CH, $C(R^1)$ or N, wherein 0, 1, or 2 of $Q^1$-$Q^4$ are N. $Q^5$-$Q^8$ independently are CH, $C(R^2)$, or N, wherein 0, 1, or 2 of $Q^5$-$Q^8$ are N. Y is C=O or C(H)OH. Each $R^1$ and $R^2$ independently is an electron withdrawing group, and x and y independently are 0, 1, 2, 3, or 4. If none of $Q^1$-$Q^8$ is N, then x and y are not 0. The following provisos apply: (a) $R^1$ and $R^2$ are different electron withdrawing groups, or (b) the compound comprises two different $R^1$ or two different $R^2$ groups, or (c) both (a) and (b).

In any of the foregoing or following embodiments, the additive may comprise two or more proton acceptor groups. In some embodiments, the proton acceptor groups comprise —OH, —N($R^A$)$R^B$, —O$^-$Z$^+$, or any combination thereof, where Z is a counterion with a +1 charge, and $R^A$ and $R^B$ independently are H, unsubstituted $C_1$-$C_6$ alkyl, or substituted $C_1$-$C_6$ alkyl. In some implementations, the additive has a pKa of from 9 to 17. In certain embodiments, the additive comprises a cyclodextrin, D-sorbitol, diglycol, guanidinium chloride, or any combination thereof. In some examples, the additive comprises β-cyclodextrin.

In some embodiments, (i) the additive is present in the anolyte at a concentration of from 0.05 M to 2 M; or (ii) the additive is present in the anolyte at a concentration of from 1.5 N to 2 N with respect to proton acceptor groups; or (iii) both (i) and (ii). In certain embodiments, the anolyte comprises 0.07-0.1 M β-cyclodextrin.

In any of the foregoing or following embodiments, the fluorenone/fluorenol derivative may comprise:

or any combination thereof, where Y is C=O or C(H)OH, and each Z independently is a counterion with a +1 charge.

In any of the foregoing or following embodiments, (i) the fluorenone/fluorenol derivative may be present in the anolyte at a concentration of 0.5 M to 1.5 M; or (ii) the additive may be present in the anolyte at a concentration of from 1.5 N to 2 N with respect to proton acceptor groups; or (iii) the alkali metal hydroxide may be present in the anolyte at a concentration of from 0.1 M to 6 M; or (iv) any combination of (i), (ii), (iii), and (iv).

In some embodiments, an aqueous electrolyte system for a redox flow battery system comprises an aqueous anolyte comprising an aqueous composition as disclosed herein, and an aqueous catholyte comprising water and an electrochemically active material. In some embodiments, the aqueous catholyte comprises water and $K_4Fe(CN)_6$, $K_3Fe(CN)_6$, or a combination thereof. The aqueous catholyte may further comprise a base or an acid. In some embodiments, a redox flow battery system comprises an aqueous electrolyte system as disclosed herein, an anode, a cathode, and a separator.

The foregoing and other objects and features of the present disclosure will become more apparent from the following detailed description, which proceeds with reference to the accompanying figures.

BRIEF DESCRIPTION OF THE DRAWINGS

FIGS. 9A-9C illustrate two complexes with H-bonding between a fluorenol derivative, 2,7-sulfonate-4-carboxylate fluorenol (27S4CFL-OH), and β-cyclodextrin (β-CD), wherein FIGS. 9A and 9B show classical molecular dynamics calculations of the complexes and FIG. 9C shows the chemical structures of the complexes; only one sugar unit is shown in FIG. 9C for simplicity.

FIG. 11A shows the fluorenol benzylic position proton is in proximity with β-CD primary hydroxyl group, as indicated by dashed line. The black box region of FIG. 11A is expanded in FIG. 11B, showing aromatic region proton interactions.

FIGS. 17A and 17B are graphs showing H-cell measurement of radical and fluorenol oxidation at −0.65V vs Hg/HgO, wherein FIG. 17A is an illustration of the measured data with linear fitting and the fitted slope represents oxidation rate (C/s) of oxidizable species in solution; and FIG. 17B shows the radical anion oxidation rate and fluorenol oxidation rate influenced by addition of β-CD at 25% SOC and fully charged.

FIGS. 24A-24D are graphs showing the effects of varying additives in 1 M NaOH on full cell resistance (FIG. 24A), full cell charge transfer resistance (FIG. 24B), dynamic viscosity (FIG. 24C), and conductivity (FIG. 24D).

FIGS. 26A-26C are a battery demonstration using 2,7-dihydroxyanthraquinone (DHAQ), wherein FIG. 26A shows the effect of β-CD on discharge capacity and FIGS. 26B and 26C show extended recycling results without β-CD (FIG. 26B) and with β-CD (FIG. 26C).

FIGS. 29A-29D are a rotating disk electrode (RDE) study of 27S4CFL (5 mM) in 0.1 M β-CD/1 M NaOH, wherein FIG. 29A shows linear sweep voltammetry curves at a scan rate of 5 mV s$^{-1}$ with rotation rates from 300 to 2400 rpm and an increment of 300 rpm, FIG. 29B is a fitted linear Levich plot of the limiting current ($i_L$) vs. the square root of rotation rate ($\omega^{1/2}$), $R^2$=0.99849, FIG. 29C shows linearly fitted Koutecky-Levich plots of i$^{-1}$ with respect to $\omega^{-1/2}$, and FIG. 29D is a linearly fitted plot of log $i_k$ at different overpotentials, $R^2$=0.9968.

DETAILED DESCRIPTION

Figure 1:
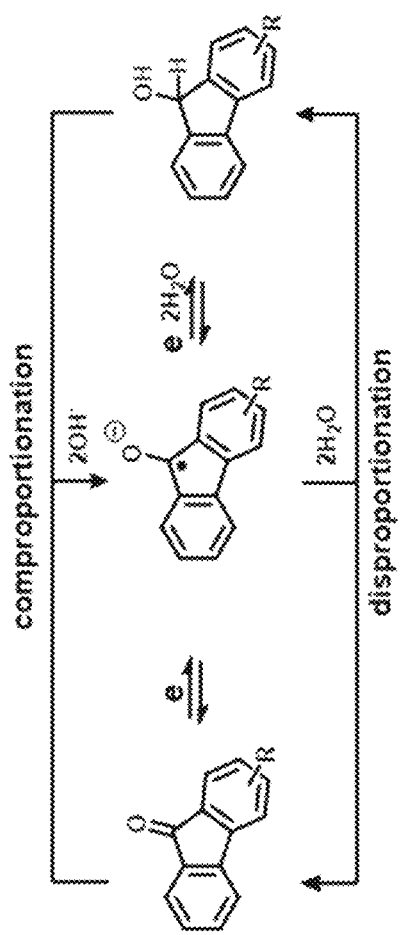
FIG. 1 is a reaction scheme showing comproportionation and disproportionation of fluorenone and fluorenol derivatives during oxidation and reduction.
Figure 2:
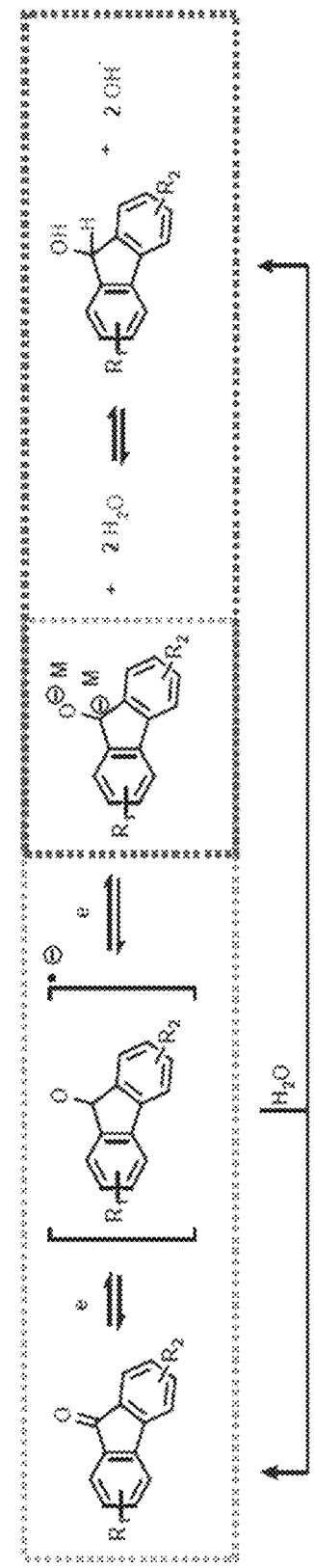
FIG. 2 is a reaction scheme showing stepwise reduction of a fluorenone derivative to a fluorenol derivative.

This disclosure concerns embodiments of an aqueous anolyte comprising a fluorenol/fluorenone derivative and an additive for use in an aqueous redox flow battery (ARFB). Although fluorenone is natively redox-inactive, embodiments of the disclosed fluorenone/fluorenol derivatives are capable of undergoing a reversible two-electron transfer process. The reversible two-electron process occurs through a comproportionation and disproportionation mechanism. The reaction proceeds through a radical anion intermediate, as shown in FIG. 1 where R represents an electron withdrawing group. FIG. 2 shows the stepwise oxidation mechanism.

Figure 3:
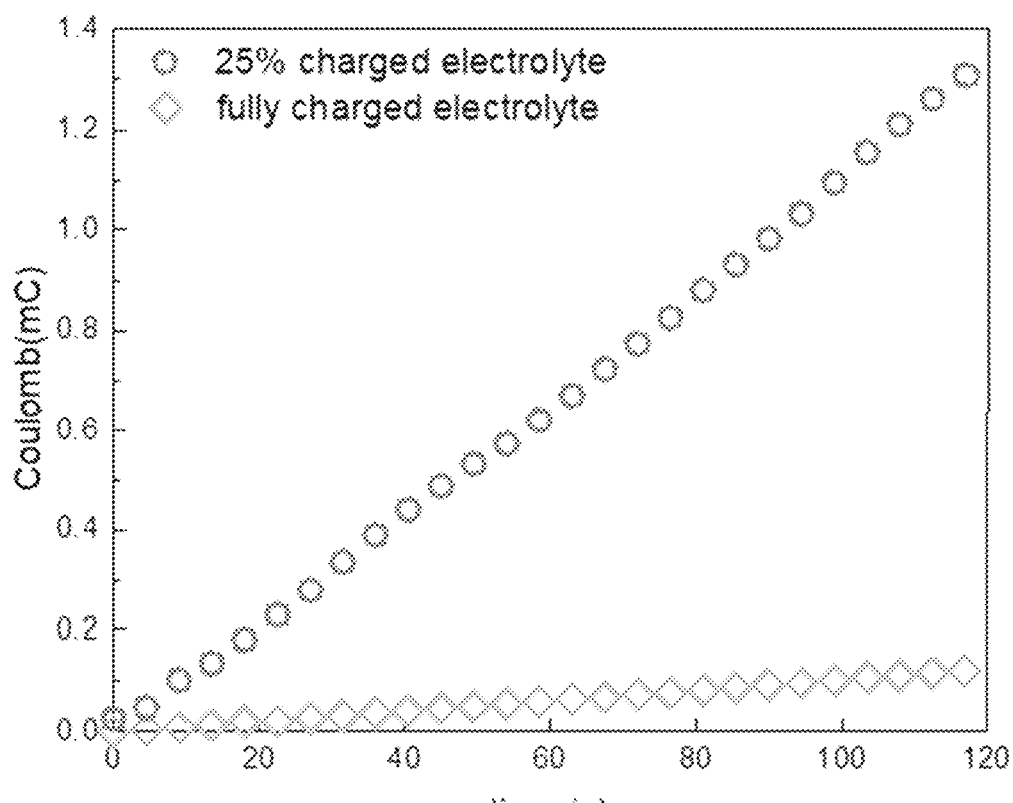
FIG. 3 is a graph showing the fluorenol oxidation rates in batteries including a fully charged electrolyte and an electrolyte having a 25% state of charge.

In the absence of the additive, the formation rate and/or concentration of the radical anion intermediate in the anolyte limits the battery rate capability or current density. The battery demonstrates a lower rate capability than that achieved with other organic flow systems. Interestingly, the oxidation rate depends on the electrolyte state of charge. As shown in FIG. 3, the oxidation rate of a 25% charged electrolyte is much faster than that of the fully charged electrolyte. By measurement of the radical concentration in-operando with battery operation, 25% SOC electrolyte contains a much higher radical concentration than the fully charged electrolyte.

Although radical anion species can be generated by direct anodic alcohol oxidation on an electrode in the presence of a noble metal catalyst, heterogeneous catalysis is not feasible in a flow battery where the flowing electrolyte can dislodge the catalyst from the electrode surface. The inventors have solved at least this problem by introducing an additive into the anolyte that functions as a homogeneous catalyst to alter the mechanism of radical anion formation and increase the rate of formation of the radical anion.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly indicates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods, as known to those persons of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

Additive: As used herein, the term "additive" refers to an organic compound comprising one or more proton acceptor groups. If the additive comprises a liquid and/or is in liquid form, the additive is not considered to be a non-aqueous solvent.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Catalyst: A substance, usually present in small amounts relative to reactants, which increases the rate of a chemical reaction without itself being consumed or undergoing a chemical change. A catalyst also may enable a reaction to proceed under different conditions (e.g., at a lower temperature) than otherwise possible.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle.

Current density: A term referring to the amount of current per unit area. Current density is typically expressed in units of $mA/cm^2$.

Derivative: A compound that is derived from a similar compound or a compound that can be imagined to arise from another compound, for example, if one atom is replaced with another atom or group of atoms. The latter definition is common in organic chemistry.

Electrochemically active component: A component (an element, an ion, or a compound) that is capable of forming redox pairs having different oxidation and reduction states, e.g., ionic species with differing oxidation states, a metal cation and its corresponding neutral metal atom, or a metal cation and its corresponding metal ions at a different oxidation state. In a flow battery, an electrochemically active component refers to the chemical species that participate in the redox reaction during the charge and discharge processes, significantly contributing to the energy conversions that ultimately enable the battery to deliver/store energy. By "significantly contributing" is meant that a redox pair including the electrochemically active component contributes at least 10% of the energy conversions that ultimately enable the battery to deliver/store energy. In some embodiments, the redox pair including the electrochemically active component contributes at least 50%, at least 75%, at least 90%, or at least 95% of the energy conversions in a catholyte or anolyte comprising the electrochemically active component.

Electrolyte: A substance containing free ions and/or radicals that behaves as an ionically conductive medium. In a redox flow battery, some of the free ions and/or radicals are electrochemically active components. An electrolyte in contact with the anode, or negative half-cell, may be referred to as an anolyte, and an electrolyte in contact with the cathode, or positive half-cell, may be referred to as a catholyte. The anolyte and catholyte are often referred to as the negative electrolyte and positive electrolyte, respectively, and these terms can be used interchangeably. As used herein, the terms anolyte and catholyte refer to electrolytes composed of electrochemically active components and an aqueous supporting solution.

Electron withdrawing group: An atom or group capable of drawing electron density from neighboring atoms towards itself, usually by resonance or inductive effects. For a substituent on an aryl ring, an electron withdrawing group typically has an atom bound to the ring with the atom also having several bonds to more electronegative atoms (e.g., O, F, C, N). Exemplary electron withdrawing groups include, but are not limited to, $-SO_3^-$, $-CO_2^-$, $-X$ (X=F, Cl, Br, I), $-NO_2$, $-CN$, $-NR_3^+$ (R=alkyl or H), $-CF_3$, $-SO_2CF_3$, $SO_2R$, $-COX$ (X=F, Cl, Br, I), $-CHO$, $-C(O)R$ (R=alkyl), and $C(O)NR_2$ (R=alkyl or H).

Energy efficiency (EE): The product of coulombic efficiency and voltage efficiency. $EE=CE \times VE$.

ET: Electron transfer.

Glycol: An alcohol including two hydroxyl groups attached to different carbon atoms.

Normality (N): A unit of concentration. Normality=molarity×equivalent number. As used herein with respect to an additive, the term normality refers to molarity×the number of proton acceptor groups on each molecule of the additive.

Oligosaccharide: A carbohydrate composed of a relatively small number, e.g., 2-10, monosaccharide units.

PCET: Proton-coupled electron transfer.

Proton acceptor group: A basic group capable of accepting a proton ($H^+$) from another molecule. For example, an amino group $-NH_2$ can accept a proton to form $-NH_3^+$. A hydroxy group in its conjugate base form ($-O^-$) can accept a proton to form $-OH$.

Redox pair or redox couple: An electrochemically active component and its corresponding oxidized (or reduced) component. Exemplary redox pairs include, but are not limited to, $[Fe(CN)_6]^{4-}/[Fe(CN)_6]^{3-}$, fluorenone/fluorenol, etc.

Substituent: An atom or group of atoms that replaces another atom in a molecule as the result of a reaction. The term "substituent" typically refers to an atom or group of atoms that replaces a hydrogen atom, or two hydrogen atoms if the substituent is attached via a double bond, on a parent hydrocarbon chain or ring. The term "substituent" may also cover groups of atoms having multiple points of attachment to the molecule, e.g., the substituent replaces two or more hydrogen atoms on a parent hydrocarbon chain or ring. In such instances, the substituent, unless otherwise specified, may be attached in any spatial orientation to the parent hydrocarbon chain or ring. Exemplary substituents include, for instance, alkyl, alkenyl, alkynyl, alkoxy, alkylamino, alkylthio, acyl, aldehyde, amido, amino, aminoalkyl, aryl, arylalkyl, arylamino, carbonate, carboxyl, cyano, cycloalkyl, dialkylamino, halo, haloaliphatic (e.g., haloalkyl), haloalkoxy, heteroaliphatic, heteroaryl, heterocycloaliphatic, hydroxyl, oxo, sulfonamide, sulfhydryl, thio, and thioalkoxy groups.

Substituted: A fundamental compound, such as an aliphatic compound, or a radical thereof, having coupled thereto one or more substituents, each substituent typically replacing a hydrogen atom on the fundamental compound.

Sugar alcohol: A polyol, typically derived from a saccharide, containing a hydroxyl group attached to each carbon atom. For example, sorbitol is obtained from hydrogenation of glucose.

Voltage efficiency (VE): The voltage produced by the battery while discharging divided by the charging voltage.

II. Electrolytes

Disclosed herein are embodiments of an aqueous anolyte comprising a fluorenone/fluorenol derivative, an additive, and an alkali metal hydroxide for use in an ARFB. The additive is an organic compound including one or more proton acceptor groups. In some embodiments, the additive increases the current density of the electrolyte relative to the current density in the absence of the additive. In some embodiments, the battery can operate at room temperature (e.g., 20-25° C.) and at elevated temperatures, including temperatures greater than 50° C. For example, the battery may be operated at temperatures from 20° C. to 60° C. In certain embodiments, the disclosed anolyte provides long-term cycling stability, as can be evidenced by charge/discharge capacity, Coulombic efficiency, energy efficiency voltage efficiency, or any combination thereof that varies by less than ±10%, or less ±5% over at least 50 cycles, at least 100 cycles, at least 200 cycles, or even at least 250 cycles after an initial 5-10 cycles.

In any of the foregoing or following embodiments, the anolyte may comprise, consist essentially of, or consist of the fluorenone/fluorenol derivative, the additive, the alkali metal hydroxide, and water. As used herein, "consists essentially of" means that the anolyte does not include any additional components that may materially affect properties of the anolyte or a battery including the anolyte. For example, the anolyte does not include any electrochemically- or redox-active component (i.e., a component, such as an element, an ion, or a compound, that is capable of forming redox pairs having different oxidation and reduction states, e.g., ionic species with differing oxidation states or a metal cation and its corresponding neutral metal atom) other than the compound as disclosed herein in an amount sufficient to affect performance of the anolyte, and the anolyte does not include more than a trace amount (e.g., no more than 1 wt %) of a non-aqueous solvent (if the additive comprises a liquid and/or is in liquid form, the additive is not considered to be a non-aqueous solvent).

In some embodiments, the fluorenone/fluorenol derivative has a structure according to any one of formulas I-III:

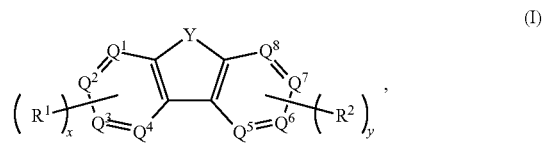

(I)

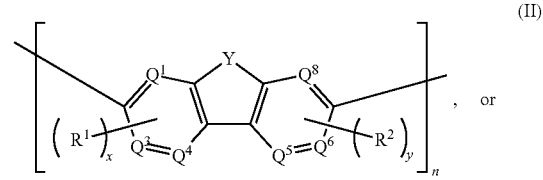

(II)

, or

-continued

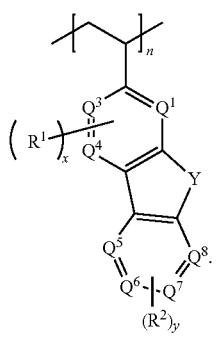
(III)

With respect to formulas I-IIII, $Q^1$-$Q^4$ independently are CH, C($R^1$) or N, wherein 0, 1, or 2 of $Q^1$-$Q^4$ are N. $Q^5$-$Q^8$ independently are CH, C($R^2$), or N, wherein 0, 1, or 2 of $Q^5$-$Q^8$ are N. Y is C=O or C(H)OH. Each $R^1$ and $R^2$ independently is an electron withdrawing group. The variables x and y independently are 0, 1, 2, 3, or 4, where if none of $Q^1$-$Q^8$ is N, then x and y are not 0. With respect to formulas II and III, n is an integer>1.

In some embodiments, the compounds have a formula according to any one of formulas IA-IC, IIA-IIB, or IIIA-IIIC:

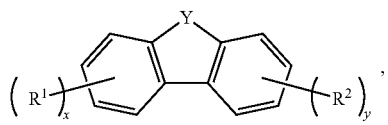
(IA)

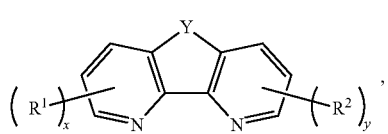
(IB)

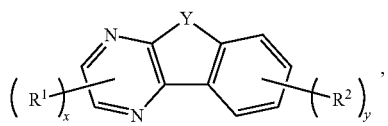
(IC)

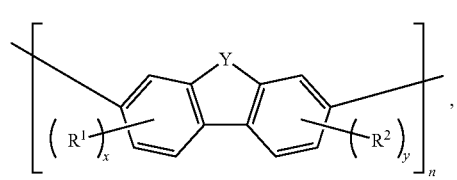
(IIA)

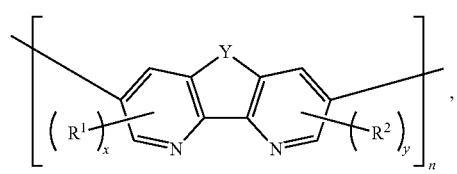
(IIB)

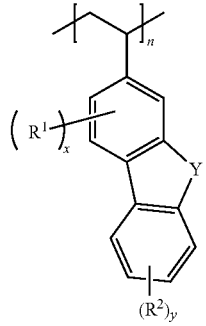
(IIIA)

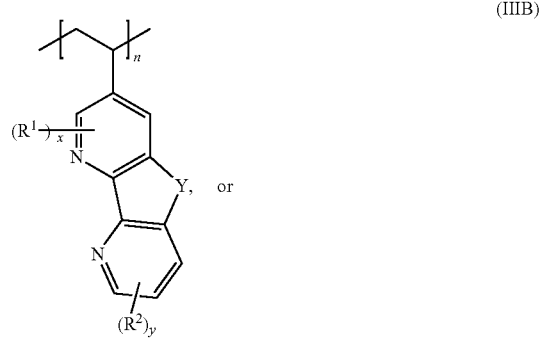
(IIIB), or

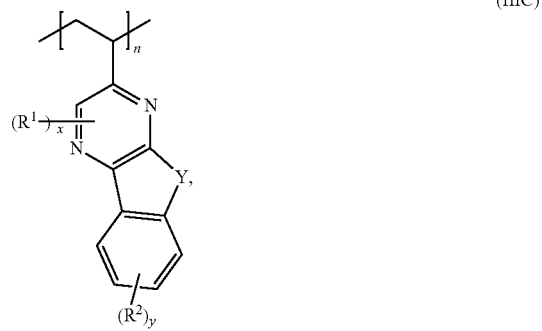
(IIIC)

where Y is C=O or C(H)OH, $R^1$, $R^2$, n, x, and y are as previously defined. In some embodiments, the compound has a structure according to formula IA, IB, or IC.

The presence of electron withdrawing groups stabilizes the reversible two-electron reaction and/or may enhance aqueous solubility of the compound. Without wishing to be bound by a particular theory of operation, the inclusion of a sufficient number and type of electron withdrawing groups on the ring system can activate the reduced fluorenol in aqueous media and enable its re-oxidation at carbon electrodes. With appropriate electron withdrawing groups, the alcohol species has sufficiently low pKa so that it can be deprotonated in strong basic water solution to form an anionic intermediate to initiate reversible oxidation.

In any of the foregoing or following embodiments, each $R^1$ and $R^2$ independently may be —$SO_3Z$, —$CO_2Z$, —$(CH_2)_mPO_3Z_2$, X, —$NR'_3{}^+$, —$NO_2$, —$SO_2R'$, —CN, $CX_3$, —COX, —C(H)O, —C(O)R', —C(O)$NH_2$, —C(O)NHR', —C(O)$NR'_2$, —N=O, —OR', or —$(CH_2CH_2O)_pR'$. Each R' independently is H, substituted or unsubstituted aliphatic, or substituted or unsubstituted heteroaliphatic. Each X independently is halo (F, Cl, Br, I), each Z independently is a counterion with a +1 charge, m is an integer from 0 to 10, and p is an integer from 1 to 10. Exemplary counterions with a +1 charge include, but are not limited to, H+, Na+, K+, and NH4+. In some embodiments, each electron withdrawing group independently is —SO3Z, —CO2Z, halo, —CN, or —OH. In certain embodiments, each electron withdrawing group independently is —SO3Z or —CO2Z. In some examples, Z is Na+ or K+.

In some embodiments, $Q^1$-$Q^4$ independently are CH or C($R^1$), and $Q^5$-$Q^8$ independently are CH or C($R^2$). In independent embodiment, one of $Q^1$-$Q^4$ is N and one of $Q^5$-$Q^8$ is N. In another independent embodiment, two of $Q^1$-$Q^4$ are N, and none of $Q^5$-$Q^8$ is N. In still another independent embodiment, two of $Q^1$-$Q^4$ are N, and two of $Q^5$-$Q^8$ are N. In one example, $Q^1$ and $Q^4$ are N. In another example, $Q^4$ and $Q^5$ are N.

With respect to formulas I and II, x and y independently are 0, 1, 2, 3, or 4, where if none of $Q^1$-$Q^8$ is N, then x and y are not 0. With respect to formula III, x is 0, 1, 2, or 3; y is 0, 1, 2, 3, or 4, where if none of $Q^1$, $Q^3$-$Q^6$, or $Q^8$ is N, then x and y are not 0. In some embodiments, x is 1 or 2, and y is 1 or 2. In one embodiment, x is 1 and y is 1. In an independent embodiment, one of x and y is 2 and the other of x and y is 1. In another independent embodiment, x is 2 and y is 2. In still another independent embodiment, x is 2 and y is 0. In another independent embodiment, none of $Q^1$-$Q^8$ is N, and x and y independently are 1 or 2; in some examples, x+y=2 or 3. In yet another independent embodiment, one of $Q^1$-$Q^4$ is N, one of $Q^5$-$Q^8$ is N, and x and y independently are 0, 1, or 2. In still another independent embodiment, two of $Q^1$-$Q^4$ are N, none of $Q^5$-$Q^8$ is N, x is 1 or 2, and y is 0, 1, or 2; in some examples, x+y=2 or 3. In one example, $Q^1$ and $Q^4$ are N. x is 2, and y is 0. In another example, $Q^4$ and $Q^5$ are N, and x and y are 0.

In some embodiments, the compound has a structure according to formula IA, IIA, or IIIA, where x is 1 or 2, and each $R^1$ independently is —SO3Z or —CO2Z. In some embodiments, y is 1 and $R^2$ is —SO3Z. In certain embodiments, x is 1 or 2, and each $R^1$ independently is —SO3Z or —CO2Z; and y is 1 and $R^2$ is —SO3Z.

In any of the foregoing embodiments, the fluorenone/fluorenol derivative may be asymmetrically substituted. In one implementation, $R^1$ and $R^2$ are different electron withdrawing groups. In an independent implementation, $R^1$ and $R^2$ are asymmetrically positioned on the compound. In some embodiments, $R^1$ and $R^2$ are different electron withdrawing groups and are asymmetrically positioned on the compound.

In some embodiments, the fluorenone/fluorenol derivative comprises

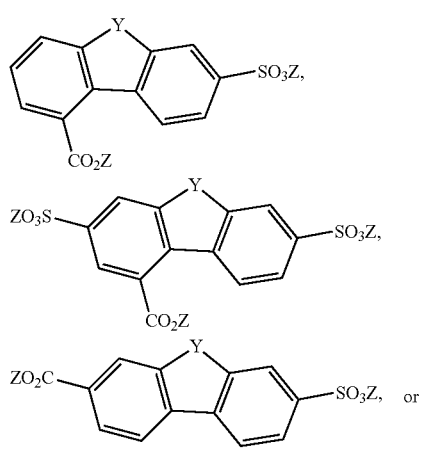

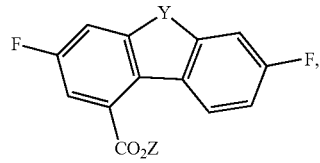

where Z is as previously defined. In certain embodiments, the —CO2Z and —SO3Z substituents are —COOH and —SO3K, respectively.

Exemplary fluorenone derivatives include, but are not limited to, the compounds in Table 1. In the naming convention used in Table 1, the numbers refer to ring positions, D=di, H=hydroxy, C=carboxylate/carboxylic acid, S=sulfonate or sulfonic acid, and FL=fluorenone. It is understood that, where sulfonate and carboxylate substituents are shown with a particular cation, compounds with alternative cations, e.g., H+, K+, Na+, or NH4+, are envisioned and included within the scope of this disclosure. Although the table shows fluorenone derivatives, it is understood that the compounds are reduced to the corresponding fluorenol derivatives when a battery comprising an anolyte including a fluorenone derivative is charged.

TABLE 1

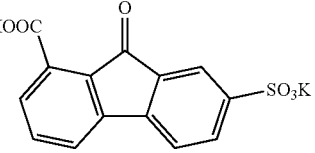 1C7SFL

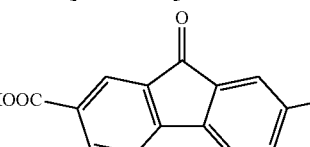 2C7SFL

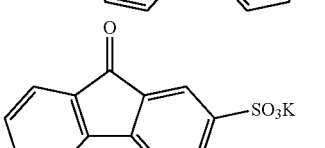 4C7SFL

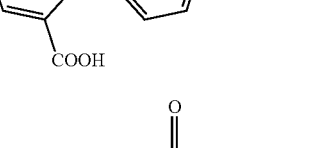 27S4CFL

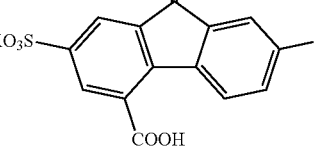 27F4CFL

TABLE 1-continued

| | |
|---|---|
| 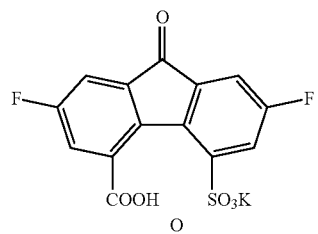 | 27F4C5SFL |
|  | 14N2CN3OHFL |

In any of the foregoing or following embodiments, the fluorenone/fluorenol derivative may be present in the anolyte in a concentration of from 0.1 M to 2 M, such as 0.25 M to 2 M, 0.5 M to 1.5 M, or 1 M to 1.5 M.

The disclosed anolytes further comprise a base. In some embodiments, the base is an alkali metal hydroxide. The base may be, for example, sodium hydroxide, potassium hydroxide, or a combination thereof. In some embodiments, the base has a concentration within a range of from 0.1-6 M, such as from 0.1-2 M, 0.5-2 M, or 1-2 M.

Embodiments of the disclosed anolytes comprise an additive, wherein the additive is an organic compound including one or more proton acceptor groups. The additive is redox inert, i.e., the additive itself does not undergo oxidation or reduction in a redox flow battery in the working potential range. As discussed above, oxidation/reduction of the fluorenone/fluorenol derivative proceeds through a radical anion intermediate. In the absence of the additive, the formation rate and/or concentration of the radical anion in the anolyte limits the current density of the electrolyte. Without being bound by a particular theory, it currently is believed that the additive catalyzes formation of the radical anion from the reduced fluorenol derivative.

Figure 4:
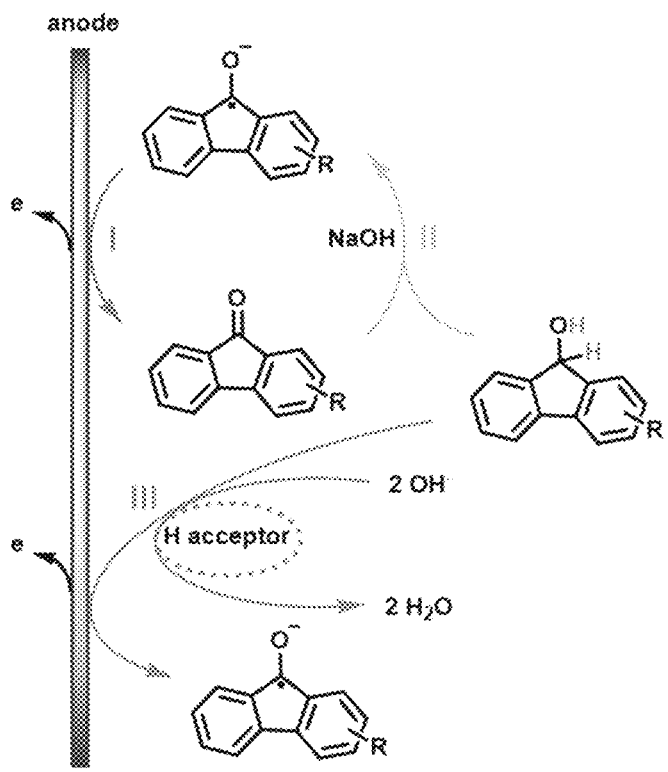
FIG. 4 is a schematic diagram showing an exemplary additive-mediated mechanism for formation of a radical anion during oxidation of a fluorenol derivative.
Figure 5A:
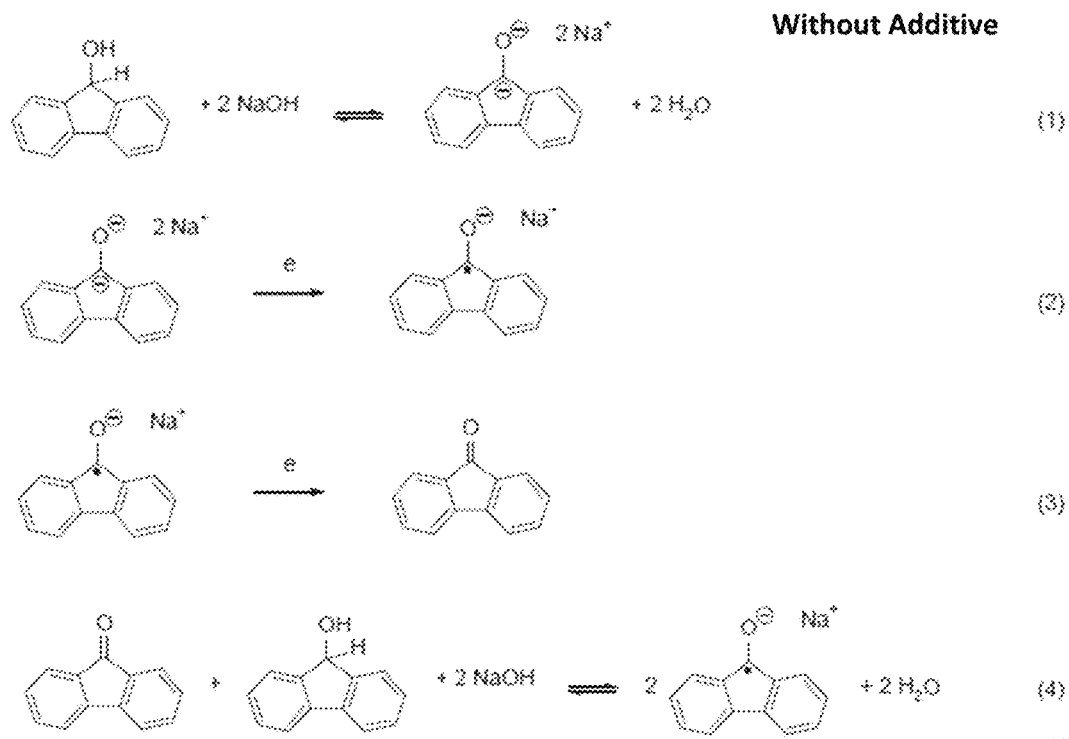
FIGS. 5A and 5B show the fluorenol oxidation mechanisms in the absence (FIG. 5A) and presence (FIG. 5B) of an additive as disclosed herein.
Figure 5B:
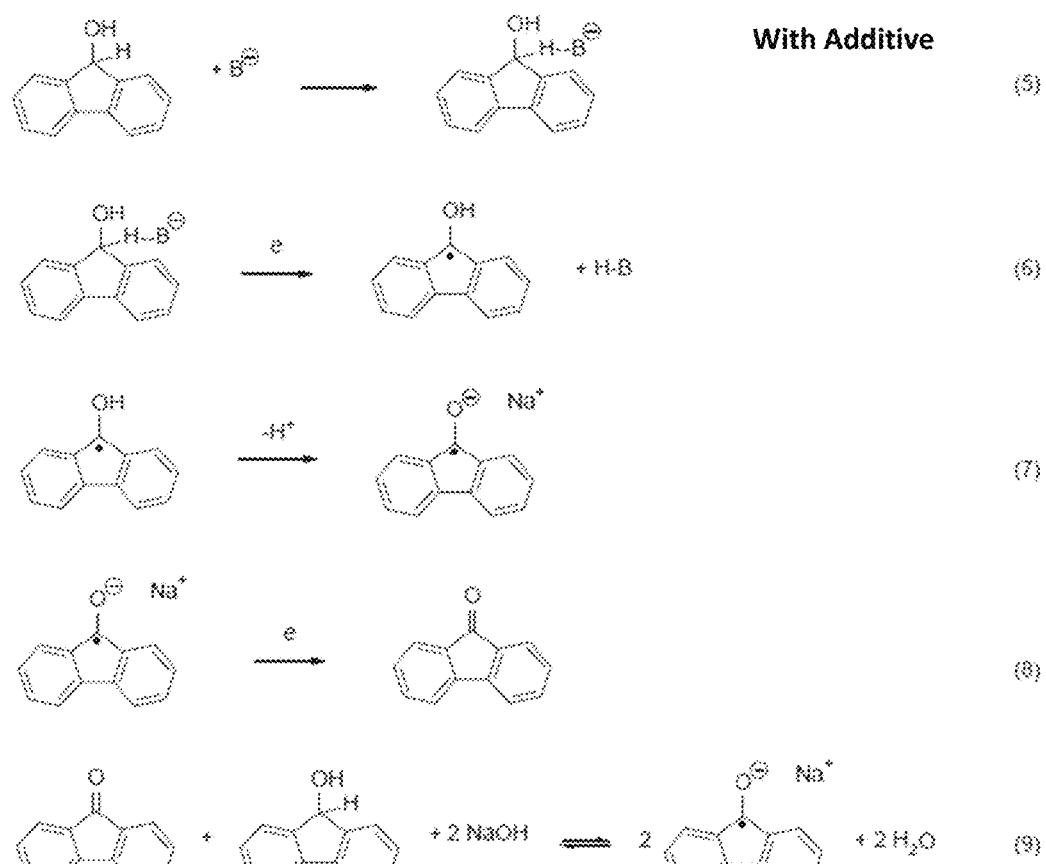

FIG. 4 is a schematic diagram showing how it currently is believed that the additive (labeled "H acceptor") changes the mechanism by which the fluorenol derivative is oxidized to the corresponding fluorenone derivative. In the absence of the additive, the fluorenol derivative oxidizes in the presence of the base (NaOH) to form the radical anion (reaction II), which loses another electron to form the fluorenol derivative (reaction I). When the electrolyte is in a charged state, formation of the anion radical is the rate-limiting step of the oxidation process. However, the additive with its hydrogen acceptor group(s) mediates formation of the radical anion through another mechanism (reaction III), providing an additional source of the radical anion and increasing the magnitude of reaction I. As illustrated in FIG. 4, the additive is a homogeneous organocatalyst, which catalyzes a proton-coupled electron transfer reaction, in contrast to the direct electron transfer that occurs without the additive. The additive accelerates the proton transfer process and the resulting fluorenol oxidation process by providing a different primary mechanism of radical anion formation, thereby enhancing discharge kinetics of the fluorenol-based anolyte. In some embodiments, the reaction occurs at low potentials. A further breakdown of the oxidation mechanism in the absence and presence of the additive is shown in FIGS. 5A and 5B, respectively, where the additive is represented as B⁻ in its deprotonated state and H-B in its protonated state.

As discussed previously, the oxidation rate of a 25% charged electrolyte is much faster than that of the fully charged electrolyte (FIG. 3). Without being limited to a single theory, it currently is believed that these observations suggested that, on battery discharge, the discharge of the radical anion is not the limiting step (FIG. 4, reaction I). Instead, the battery kinetics can be highly dependent on the regeneration process of intermediate radical anion species by comproportionation of fluorenone and fluorenol (FIG. 4, reaction II). The kinetic limitation is more severe at high depth of discharge (DOD) or lower active material concentration due to the bimolecular reaction route. Thus, regeneration of the radical anion species dictates the system discharge kinetics.

The approach illustrated in FIG. 4 utilizes a multi-site proton-coupled electron transfer mechanism, which bypasses a high energy barrier from direct electron transfer. To pre-position the proton acceptor group for such a proton regulation, an H-bonding structure between the additive and fluorenol is formed. In general, proton transfer between fluorenol and the additive is thermodynamically more favorable with increasing additive pKa (the same applies to the second proton transfer). However, free hydroxide anions are not suitable additives for the anolyte because the hydroxides are primarily coordinated as $OH^-(H_2O)_4$ clusters in solution and are not available for H-bonding with the fluorenol derivative. The cluster becomes a hurdle for hydroxide to further improve proton transfer efficiency. Additionally, not all organic molecules rich in H-bonding groups are equally effective. Instead, a well-positioned proton acceptor additive with suitable pKa and a shortened proton donor-acceptor distance is most effective. In some embodiments, proton transfer between the fluorenol derivative and the additive is thermodynamically more effective with a larger H-additive pKa (FIG. 5B). However, in some embodiments, the additive pKa is lower than that of water, in order to generate proton acceptor sites in alkaline aqueous solution.

In some embodiments, the additive comprises two or more proton acceptor groups. In certain embodiments, the additive comprises 1-30 proton acceptor groups, such as 2-25 proton acceptor groups. Exemplary proton acceptor groups include, but are not limited to —OH, —N(R$^A$)R$^B$, —O⁻Z⁺, and combinations thereof, where Z is a counterion with a +1 charge (e.g., Na⁺, K⁺, NH$_4^+$), and R$^A$ and R$^B$ independently are H, unsubstituted $C_1$-$C_6$ alkyl, or substituted $C_1$-$C_6$ alkyl (e.g., substituted with one or more carboxylate groups). In some implementations, the proton acceptor groups comprise —OH, —NH$_2$, or a combination thereof. In certain implementations, the proton acceptor groups comprise —OH. In any of the foregoing or following embodiments, the additive may have a pKa of from 9 to 17, such as from 12 to 17, 12 to 16, or 12 to 14. In some embodiments, the additive has a pKa value that ranges between 12 and less than 14 (i.e., 12≤pKa<14).

Exemplary additives include, but are not limited to, alcohols, polyols (compounds with two or more hydroxy groups), amines, and polyamines (compounds with two or more amino groups). In some embodiments, the additive comprises an oligosaccharide, a sugar alcohol, a glycol, guanidinium chloride, an amine (primary, secondary, or tertiary), or any combination thereof. In certain embodiments, the additive comprises a cyclodextrin (e.g., α-, β-, or γ-cyclodextrin), sorbitol (e.g., D-sorbitol), diglycol, guanidinium chloride, or any combination thereof. In some implementations, the additive is an amine and the amine is butylamine, triethylamine, benzylamine, pyrrolidine, 1-azabicyclo[2.2.2]octane, or 1,4-diazabicyclo[2.2.2]octane. In some examples, larger molecules, such as a cyclodextrin, are preferable since the larger molecules are less likely to exhibit crossover through a battery separator. In certain implementations, the additive comprises a cyclodextrin, such as α-cyclodextrin or β-cyclodextrin. Structures of several exemplary additives are shown in Table 2.

embodiments, as the fluorenol derivative concentration increases, the additive concentration is increased proportionately.

The additive functions as a homogeneous organocatalyst and, at suitable concentrations, increases the rate of fluorenol oxidation during discharge. In some embodiments, the

TABLE 2

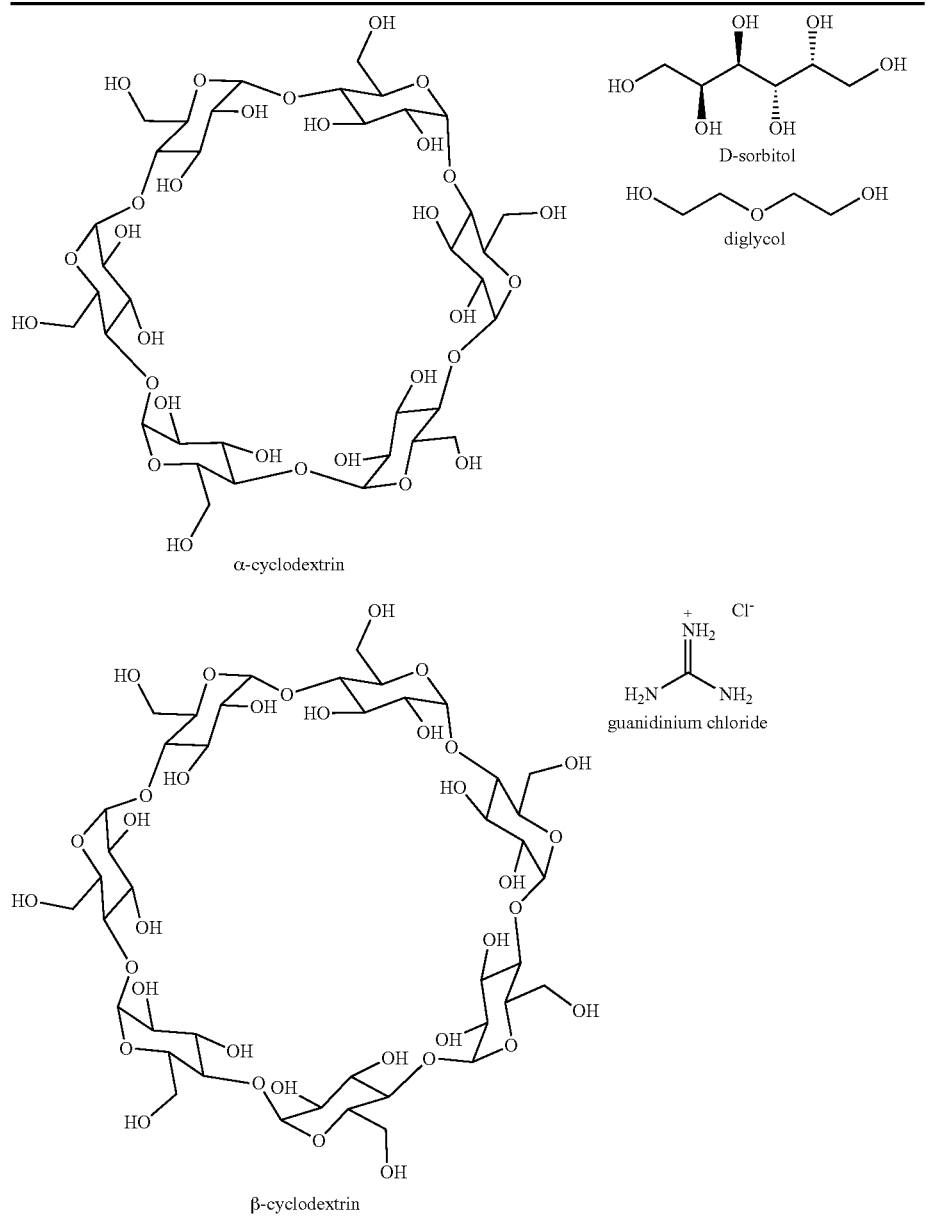

In any of the foregoing or following embodiments, the additive concentration may be selected to maximize the current density of the anolyte in an ARFB. In any of the foregoing or following embodiments, the additive may be present in the anolyte at a concentration of from 0.05 M to 2 M, such as at a concentration of from 0.05 to 1.5 M, 0.05 to 1 M, 0.07 to 1.5 M, or 0.07 to 1.1 M. In any of the foregoing or following embodiments, the additive may be present in the anolyte at a concentration of from 1.5 N to 2 N with respect to proton acceptor groups, such as a concentration of from 1.6 N to 1.9 N, or 1.7 N to 1.9 N. In some additive increases the current density 1.2× to 2.0×, such as 1.4× to 1.8×, relative to the current density in the absence of the additive.

III. Redox Flow Batteries

Figure 6:
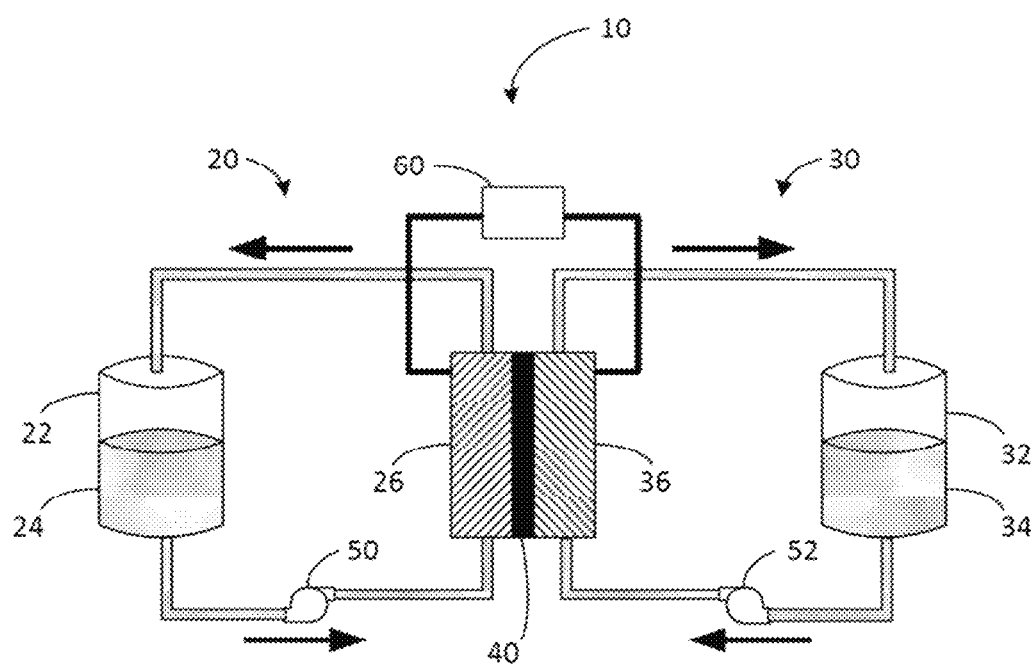
FIG. 6 is a schematic diagram of an exemplary redox flow battery system.

Redox flow batteries (RFBs) can provide electrical energy converted from chemical energy continuously, and are promising systems for energy storage, providing flexibility and resiliency to the power grid. As shown in FIG. 6, some embodiments of an aqueous RFB (ARFB) system 10 comprise a positive half-cell 20 and a negative half-cell 30. The half-cells are separated by a membrane or separator 40, such as an ion-exchange membrane (cation- or anion-exchange membrane), ion conductive membrane (polymer or ceramic) or porous separator. The positive half-cell 20 comprises an electrode tank 22 containing a catholyte 24 and the negative half-cell 30 comprises an electrode tank 32 containing an anolyte 34. The positive half-cell 20 further comprises a cathode 26, and the negative half-cell 30 further comprises an anode 36. The anolyte and catholyte are solutions comprising electrochemically active components in different oxidation states. The electrochemically active components in the catholyte and anolyte couple as redox pairs. In some embodiments, at least one of the catholyte and anolyte redox active materials remains fully soluble during the charging and discharging cycles of the RFB.

The battery may be assembled in ambient atmosphere in a housing that is closed and operated without flowing an inert gas through the housing. In some embodiments, the housing may be sealed such that additional oxygen from the ambient atmosphere is excluded or substantially excluded. Embodiments of the disclosed battery may operate at a lower cost than comparable RFBs that require constant flow of an inert gas.

During charging and discharging of the ARFB, the catholyte and anolyte are continuously circulating via pumps 50, 52 through the positive and negative electrodes 26, 36, respectively, where redox reactions proceed, providing the conversion between chemical energy and electrical energy or vice-versa. To complete the circuit during use, positive and negative electrodes (including a current collector at each side) 26, 36 of the ARFB system 10 are electrically connected through current collectors (not shown) with an external load 60. The electrodes are selected to be stable with the anolyte and catholyte. In some embodiments, the electrodes are carbon-based. Suitable carbon-based materials include, but are not limited to, carbon felt, carbon paper, and woven carbon cloth. Exemplary separators include, but are not limited to, cation-exchange membranes, such as Nafion™ N115, NR-212, and NR-211 membranes (available from Ion Power, Inc., New Castle, DE).

Figure 7:
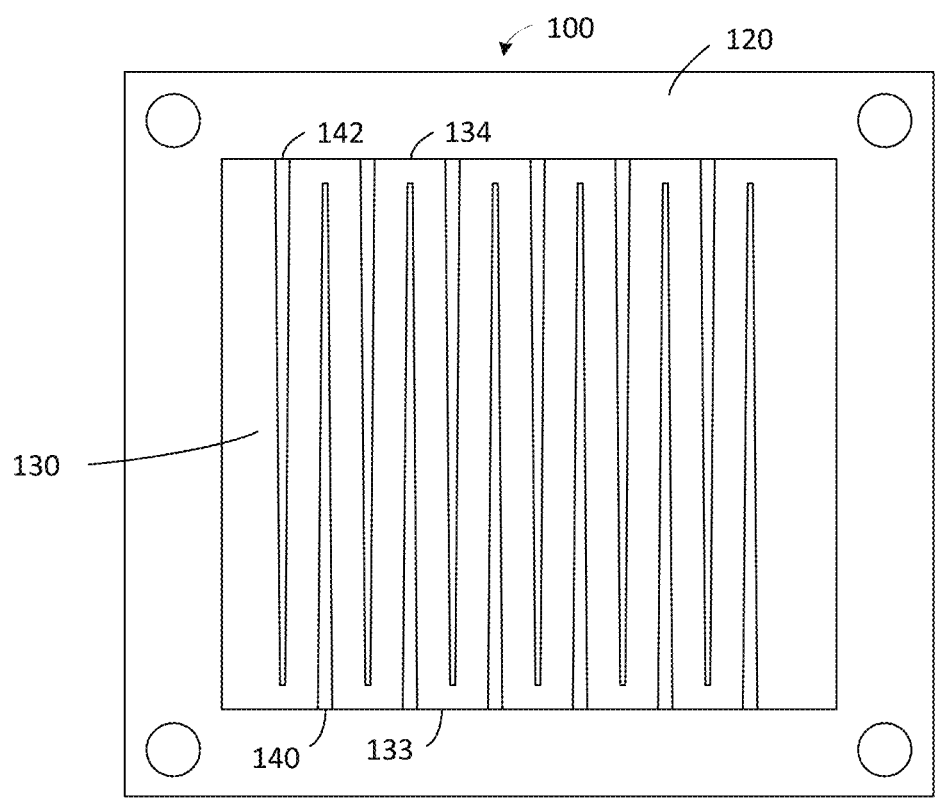
FIG. 7 is a simplified diagram of an exemplary flow half-cell including interdigitated inlet and outlet flow channels.
Figure 8:
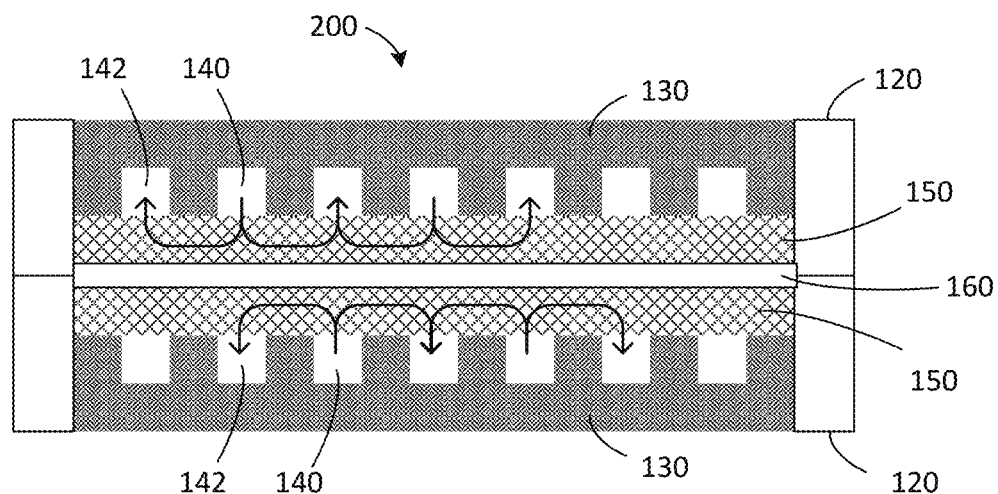
FIG. 8 is a cross-sectional view of an exemplary redox flow battery stack cell with an interdigitated design.

In some embodiments, the ARFB is a flow cell with an interdigitated design of flow channels. FIG. 7 is a simplified diagram of one exemplary half cell 100 comprising a support frame 120 and a bipolar plate 130 with interdigitated inlet and outlet flow channels 140, 142. The inlet flow channels 140 extend inwardly from a first side edge 133 of the bipolar plate 130 and have a closed distal end. The outlet flow channels 142 extend inwardly from the opposing side edge 134 of the bipolar plate and also have a closed distal end. The bipolar plate 130 may also include flow channels on the opposing surface with anolyte circulating through the channels on one side of the plate and catholyte circulating through the flow channels on the opposing side. With reference to the cross-sectional view of FIG. 8, a redox flow battery stack cell 200 comprises two electrodes 150 and an ion-exchange membrane or separator 160. The electrodes 150 are disposed on either side of and in contact with the separator 160. The redox flow battery stack cell 200 further comprises two half cells 100 each half cell comprising a support frame 120 and bipolar plate 130. The half cells are positioned such that a bipolar plate 130 is in contact with each electrode 150. The electrode 150 may be porous so that an electrolyte may flow through the electrode. In some embodiments, the electrode 150 comprises a carbonaceous material, such as carbon felt, carbon paper, and woven carbon cloth. Exemplary separators include those described above. End plates on either side of the cell include a current collector in electrical communication with the cell (not shown). The arrows in FIG. 6 illustrate the direction of electrolyte flow through the redox flow battery stack cell 200. An electrolyte flowing through an inlet flow channel 140 cannot directly exit the inlet flow channel because the distal end of the inlet flow channel is closed (FIG. 7). As shown in FIG. 8, the electrolyte flows from the inlet flow channel 140 into the electrode 150, through the electrode 150 in a direction substantially perpendicular to the inlet flow channel 140, and subsequently into adjacent outlet flow distribution channels 142. Several cells may be assembled into a battery stack (not shown) with an end plate at each end of the stack.

Embodiments of the disclosed aqueous electrolytes comprising a fluorenone/fluorenol derivative, an additive, and an alkali metal hydroxide as disclosed herein are suitable for use as the anolyte. The catholyte is an aqueous solution comprising an electrochemically active material suitable for use in a redox flow battery. In one embodiment, the catholyte comprises a base and the electrochemically active material. In an independent embodiment, the catholyte comprises an acid and the electrochemically active material. The catholyte may consist essentially of, or consist of, water, the base or the acid, and the electrochemically active material. As used herein, "consists essentially of" means that the catholyte does not include any additional components that may materially affect properties of the anolyte or a battery including the anolyte. For example, the catholyte does not include any electrochemically- or redox-active component (i.e., a component, such as an element, an ion, or a compound, that is capable of forming redox pairs having different oxidation and reduction states, e.g., ionic species with differing oxidation states or a metal cation and its corresponding neutral metal atom) other than the compound as disclosed herein in an amount sufficient to affect performance of the catholyte, and the catholyte does not include more than a trace amount (e.g., no more than 1 wt %) of a non-aqueous solvent. In certain embodiments, the base is the same base as that of the anolyte, and may have the same concentration as the base in the anolyte. In some examples, the electrochemically active material in the catholyte is potassium ferrocyanide ($K_4Fe(CN)_6$). In certain examples, the catholyte is an aqueous solution comprising a base and $K_4Fe(CN)_6$. Because the disclosed compounds undergo a $2e^-$ redox process, the amount (number of moles) of $K_4Fe(CN)_6$ in the catholyte in some embodiments is twice the amount of the fluorenone/fluorenol derivative in the anolyte.

In some embodiments, the disclosed anolytes increase current density of an aqueous redox flow battery relative to anolytes that do not include the additive. In certain implementations, the additive increases the current density 1.2× to 2.0×, such as 1.4× to 1.8×, relative to the current density in the absence of the additive. In one example, a battery exhibited a 1.6× peak current density when β-CD was added to the anolyte. The disclosed anolyte also may increase battery discharge capacity, particularly at higher current densities (e.g., 40-100 mA $cm^{-2}$), compared to anolytes that do not include the additive. In certain embodiments, the disclosed anolytes provide long-term cycling stability of an ARFB. For example, a battery with an anolyte comprising 0.7 M 27S4CFL/1 eq NaOH, 0.86 M β-CD, 1 M NaOH exhibited 0.025%/day observed capacity decay rate over the continuous operation of over half year (4,000 cycles), with a voltage efficiency decrease of 9% (Example 2, FIG. 32A). A similar capacity decay rate was observed in a battery with an anolyte comprising 1.67 M 4C7SFL/1 eq NaOH dissolved with 0.086M β-CD/1 M NaOH. The battery exhibited a capacity decay rate of 0.020%/day over 160 days (~650 cycles), with around 5% VE drop (Example 2, FIG. 32B).

IV. Examples

Materials and Methods

Chemicals and Instruments

All chemicals were purchased from TCI, Sigma-Aldrich, Fisher scientific or AA Blocks, and used as received from commercial suppliers. NMR solvents were purchased from Cambridge Isotopes. Deionized water was used to make the electrolytes and was purged with nitrogen prior to use. Fluorenone derivatives were synthesized following previous reported procedure (4). The structures of all chemicals involved in this work were shown in FIG. S1 with its abbreviations listed.

Nuclear magnetic resonance spectroscopy: NMR spectra were either collected on a 500 MHz Oxford NMR spectrometer at 25° C. (the system consists of an Oxford AS500 magnet connected to an Agilent Technologies console), or collected on a 400 MHz NMR spectrometer (Bruker 400 MHz Avance III NMR with NanoBay console, equipped with a SampleCase™ autosampler using IconNMR automation. Probe: BBFO 5 mm SmartProbe sensor). Chemical shifts were reported in ppm with the solvent resonance as the internal standard (DMSO, $\delta=2.50$; $D_2O$, $\delta=4.70$; $CDCl_3$, $\delta=7.26$).

Mass spectroscopy: MS analysis was performed using a 15 T Fourier transform ion cyclotron resonance mass spectrometer (FTICR-MS) (Bruker SolariX) outfitted with a standard electrospray ionization (ESI) interface. LC-MS analysis was performed using Q Exactive™ HF-Orbitrap™ MS. The duration time was 15 min. Scan range was 150 to 700 m/z. Flow rate was at 3 μL/min and volume was 250 μL.

Electron paramagnetic resonance spectroscopy: EPR measurements were performed on a Bruker ELEXSYS E580 spectrometer at 298 K. The electrolyte solution sample was pulled into a glass capillary (VitroTubes™, ID 0.8 mm and OD 1 mm) using a Hamilton syringe connected through nanotight fittings from Valco Instruments Co. Inc. The capillary was sealed using Critoseal™ Leica Microsystems capillary tube sealant on both ends and was further placed inside a 4 mm EPR tube with the open end sealed inside a glove box filled with nitrogen. All samples were prepared inside the glove box immediately before EPR experiments to minimize the influence of air and moisture. The typical settings for the spectra were microwave frequency=9.324 GHz, sweep time=41.94 s, time constant=5.12 ms, power=0.02 mW, field modulation amplitude=0.05 G, and sweep width=24 G for dilute solutions in order to capture the detailed hyperfine structures but the sweep width was increased to 50 G for relatively concentrated solutions to incorporate their broader line widths. Absolute spin concentrations of the samples were determined by calibration curves of the spin standard TEMPO (2,2,6,6-tetramethyl-1-piperidinyloxyl) with concentrations varying from 0.01 mM to 100 mM, and another spin standard 4-Hydroxy-TEMPO with concentrations varying from 0.1 M to 1.0 M.

Ultraviolet-visible (UV-vis) spectroscopy: UV-vis was conducted on a SHIMADZU UV-2501 PC spectrophotometer (Shimadzu Scientific Instruments, Columbia, MD).

Viscosity was measured on a MCR101 SN80788119 rheometer (Anton Paar, Ashland, VA); FW3.55; Slot7; Adj5d, and on system DG26.7-SN21106 (Anton Paar); d=0 mm, with accessory TU1=C-PTD200-SN81796014.

Small-angle X-ray scattering: Synchrotron SAXS technique is a powerful technique to measure the size of dissolved molecules, clusters, and suspended particles. SAXS resolves the particle size and shape over a wide range of sizes from several Å to hundreds of nm. Considering the small sizes and low electron contrast of β-CD, FL and FLOH relative to solution, there was a focus on collecting data from a scattering vector, q, of 0.05 to 2 Å-1. Small-angle X-ray scattering (SAXS) data was acquired at beamline 12-ID-B of the APS. A constant incident photon energy of 13.3 keV ($\lambda=0.9322$ Å) was used to measure samples in transmission through a 2-mm ID silica capillary (Charles Supper $SiO_2$ capillaries, 10 μm wall thickness). Sample-to-detector distance was calibrated using a silver behenate standard. 2D images were recorded using a Pilatus 2M detector (Dectris; pixel size 172×172 μm²) for five frames at a 1 s exposure time each. Artifacts from static noise were subtracted using detector dark images, which were acquired every ten frames. Solution blanks were acquired identical to the suspension samples and subtracted using a scaling factor of 1. The RAW program from the BioXTAS package was used, as well as SasView and Irena, to integrate the data, average and merge scans, perform background subtractions, and to calculate pair distance distribution functions (PDDF).

All battery performance tests were performed under $N_2$-atmosphere purge box (PLAS-LABS) except specified conditions.

Electrochemical Tests

CV measurements in aqueous phase were performed using a three-electrode configuration including a glassy carbon working electrode (3 mm diameter), a glassy carbon counter electrode and a Hg/HgO reference electrode. The glassy carbon electrode was polished before each scan with 3 mm alumina powder. The electrolytes of 5 mM redox-active materials in 1.0 M NaOH were used. Additives at specified concentration in 1.0 M NaOH were used. CV data were collected using a Gamry potentiostat at various scan rates.

Rotating disk electrode (RDE) measurements (Feng et al., Science 2021, 372:836) were performed using a three-electrode configuration consisting of a glassy carbon working electrode (3 mm diameter), a carbon rod counter electrode and an Ag/AgCl reference electrode. The electrolytes of 5 mM redox-active materials in 1.0 M NaOH were used. Data were collected using a CHI potentiostat at scan rates of 5 mV/s in the potential range of −1.55V~−0.5V vs Ag/AgCl. The rotation rates were at 300, 600, 900, 1200, 1500, 1800, 2100 and 2400 rpm. The diffusion coefficient (D) was calculated according to Levich equation:

$$i_{Lim}=0.62nFAD^{2/3}\omega^{1/2}v^{-1/6}C$$

where $i_{Lim}$ is limiting current, n is the number of electrons transferred (n=1), F is Faradaic constant (96485 C mol⁻¹), A is the surface area of the working electrode (0.0707 cm²), C is the concentration of redox species (5.0×10⁻⁶ mol cm⁻³), ω is the routing angular rotation rate (rad s⁻¹) and ν is the kinetic viscosity (0.0118 cm² s⁻¹ for 1M NaOH in $H_2O$). The Koutecky-Levich plots at different overpotentials were extrapolated to get the kinetic current $i_k$ according to the Koutecky-Levich equation:

$$\frac{1}{i}=\frac{1}{i_k}+\frac{1}{i_L}=\frac{1}{i_k}+\frac{1}{0.62nFAD^{2/3}\omega^{1/2}v^{-1/6}C}$$

The exchange current $i_0$ can be obtained by fitting $i_k$ to the Tafel plot at the overpotential of zero, from which the reaction rate constant ($k_0$) was determined according to Butler-Volmer equation:

$$i_0 = nFACk_0$$

Flow Battery Tests

Cells were constructed with Interdigitated cell design, FreudenbergH23 (two layers, heat treated) and ELAT (Nuvant, heat treated) were employed as the electrode with ~25% of compression. A Masterflex L/S peristaltic pump (Cole-Parmer) was used to circulate the electrolytes through the electrodes at a flow rate of 40 mL min$^{-1}$. Nafion® 212 (presoaked in 1 M NaOH at r.t.) was used as the separator. This setting was applied to all battery tests mentioned below.

Batteries in FIGS. 22, 26A-26C, 28, 30A-30C, and 31 were tested with 6 mL anolyte including 0.5 M active material (0.25 M active material for FIGS. 26A-26C), with 1 equiv NaOH (2 equiv NaOH for FIGS. 26A-26C), specified concentration of additive, and 1 M NaOH. 30 mL catholyte was applied, the catholyte including 0.3 M potassium ferrocyanide, 0.3 M potassium ferricyanide, and 1 M NaOH. Rate capability tests were conducted galvanostatically charged/discharged at room temperature on an Arbin BT-2000 battery tester between specified voltage limits at specified current. A 1-min discharge at 50 mA step was scheduled prior to discharge step at specified current density to avoid electrode influences surface area influence. Battery Electrochemical Impedance Spectroscopy was measured using Gamry Potentiostat IFC1010-25036 (Gamry Instruments, Warminster, PA).

Figure 32A:
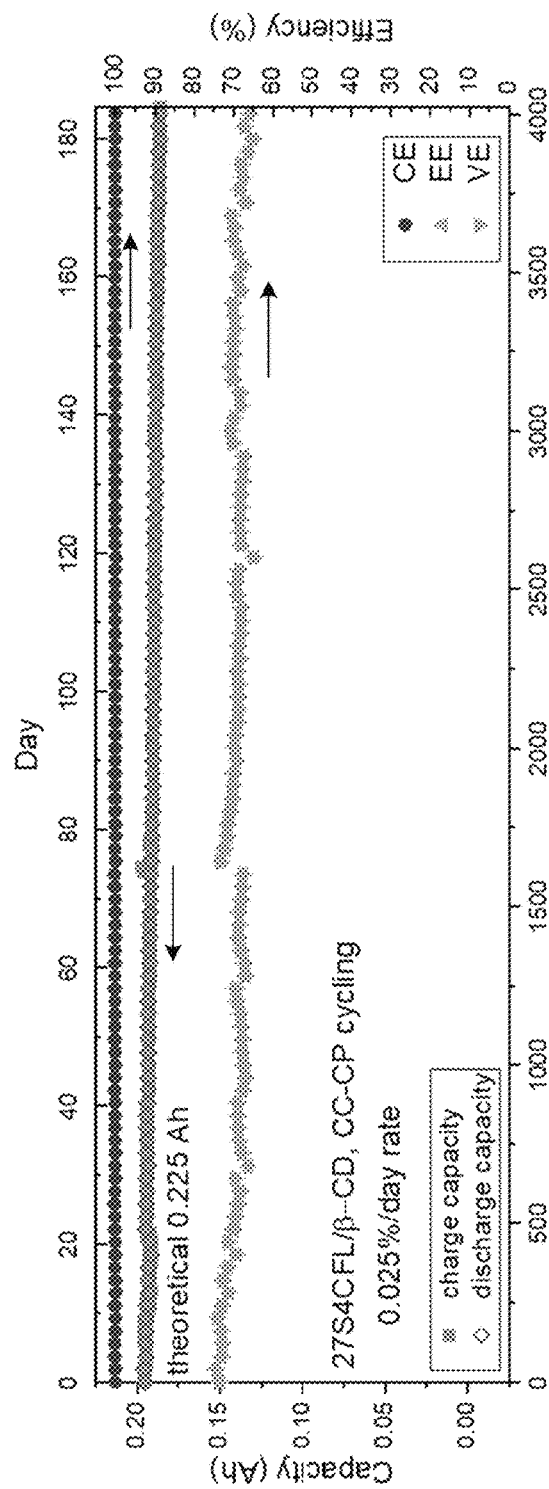
FIGS. 32A and 32B show extended cycling stability with 27S4CFL (FIG. 32A; every 40 data points shown) and 4-carboxylate-7-sulfonate fluorenone/fluorenol 4C7SFL (FIG. 32B, every 8 data points shown).

The battery demonstrated in FIG. 32A was constructed with 6 mL of 0.7 M 27S4CFL/1 eq NaOH dissolved with 0.086 M β-CD/1 M NaOH, and 60 mL of catholyte solution containing 0.3 M potassium ferrocyanide, 0.3 M potassium ferricyanide, and 1 M NaOH. A galvanic/potentiostatic cycling protocol was applied. At galvanostatic step, the current is held at 40 mA/cm2 until 1.6 V cutoff voltage reached during charging, at 20 mA/cm2 until 0.2 V cutoff voltage reached during discharging. At potentiostatic step, the potential is held at 1.4 V until 2 mA/cm2 cutoff current reached during charging, at 0.6 V until 2 mA/cm2 cutoff current reached during discharging. Catholyte was refreshed at cycle 1600.

Figure 32B:
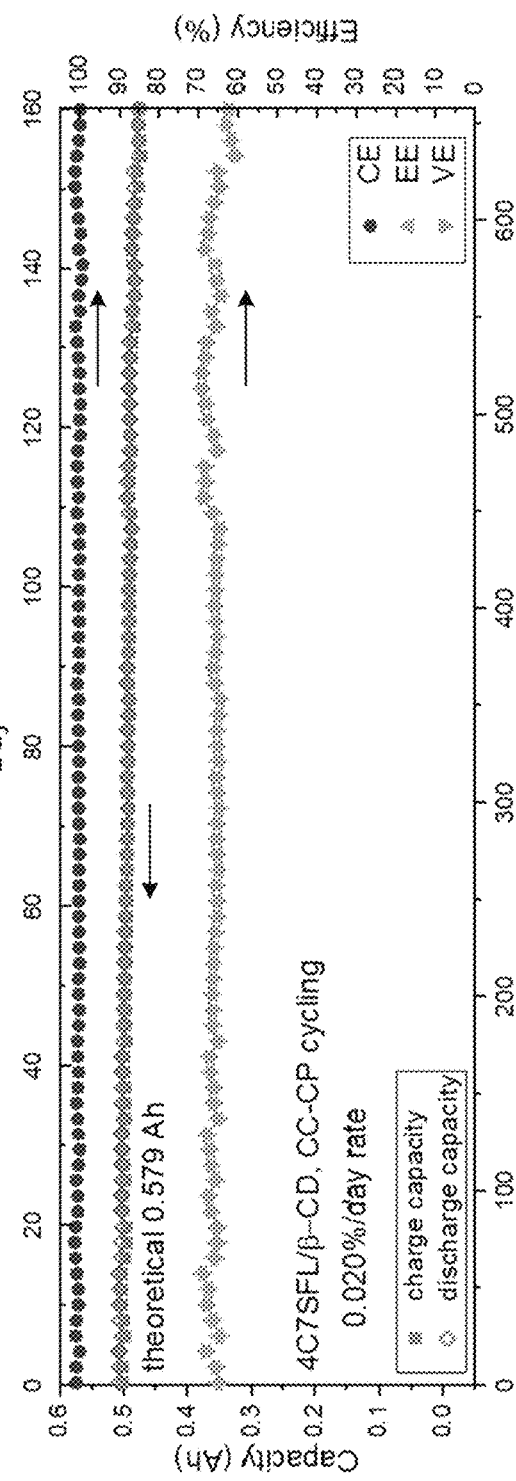

The battery demonstrated in FIG. 32B was constructed with 6.5 mL of 1.67 M 4C7SFL/1 eq NaOH dissolved with 0.086 M β-CD/1 M NaOH, and 100 mL of catholyte solution containing 0.3 M potassium ferrocyanide, 0.3 M potassium ferricyanide, and 1 M NaOH. A same galvanic/potentiostatic cycling protocol was applied, except 20 mA/cm2 was employed at constant current step. A flow-through design cell was employed for this case, using a 4.2 mm thickness graphite felt with 5 cm$^2$ area. 20 mL/min flow rate was employed to maintain same fluid velocity as other tested cells. Volume increase on anolyte side was observed during testing, resulting anolyte material concentration decrease and lower utilization. Due to small catholyte concentration and large volume, the mass transfer is expected to be limited by catholyte side. An optimization can be further conducted to optimize cell rate performance. Here the demonstration is aimed for stability test with anolyte side as limiting capacity.

Current Response Test

Figure 13:
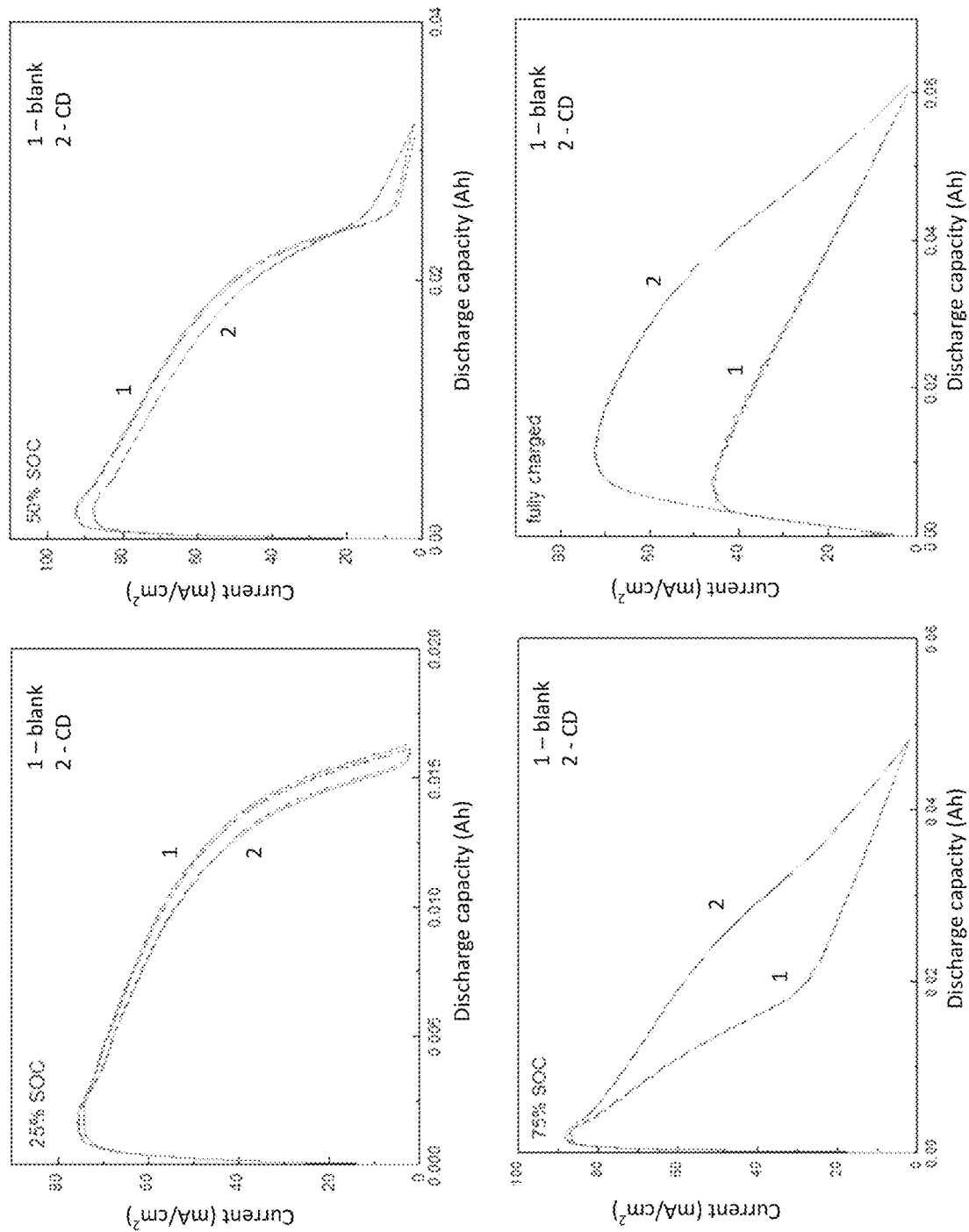
FIG. 13 shows graphs of a battery response test at controlled voltage conducted with an anolyte comprising 0.1 M 27S4CFL and a catholyte comprising 0.1 M ferrocyanide/0.05 M ferricyanide/1 M NaOH at different states of charge (SOC)—25%, 50%, 75%, and fully charged.

The battery of FIG. 13 was constructed similar to above described procedure, except that two consecutive cell stacks were employed (electrolyte flow through the two cells consecutively), one for charging and discharging, one for OCV monitoring. The battery in FIG. 18 was constructed using one cell stack, with additional pump and tubing system circulating ~3 mL electrolyte through EPR detecting tube at 100 rpm rate. Anolyte was comprised of 12 mL 0.1 M 274FL/1 M NaOH with specified additive at 0.086 M. Catholyte was comprised of 500 mL 0.1 M ferrocyanide/0.05 M ferricyanide/1 M NaOH. Electrolyte was charged until desired SOC reached. Then the discharge current response was measured at controlled voltage of 0.9V. Each measurement was repeated 5 cycles (FIG. 13) and experiments were repeated two times in FIG. 18.

Oxidation Rate Measurement

The measurement was conducted with H-cell equipped with Hg/HgO as reference electrode and Glassy carbon electrode as working electrode (0.0707 cm$^2$). Carbon rod was used as counter electrode. Stir bar was equipped to facilitate mass transfer, so it is not considered as a limiting factor in the measurement of oxidation process. Chronocoulometry method was applied at specified potential for 120 s with IR compensation (CI mode on Gamry) and 1.5 s per data point. Nafion® 212 (soaked in 1 M NaOH at room temperature) was used as separator. Each data point was repeated three times. The electrolyte solution was prepared using the battery charging to specified SOC. The battery was constructed with 8 mL of 0.3 M 274FL/1 eqNaOH/1 M NaOH and 30 mL of 0.3 M potassium ferrocyanide/0.3 M potassium ferricyanide/1 M NaOH. After charged to specified SOC, the anolyte solution was diluted with 1 M NaOH to result a 15 mM active material solution. The catholyte was diluted with 1 M NaOH to result an 8.75 mM potassium ferrocyanide/28.75 mM potassium ferricyanide solution. The solution used for H-cell measurement in each compartment was 5 mL, with addition of specified amount of additive. To prepare deuterated fluorenol, the cell was constructed using NaOD/D$_2$O for both anolyte and catholyte.

Figure 17A:
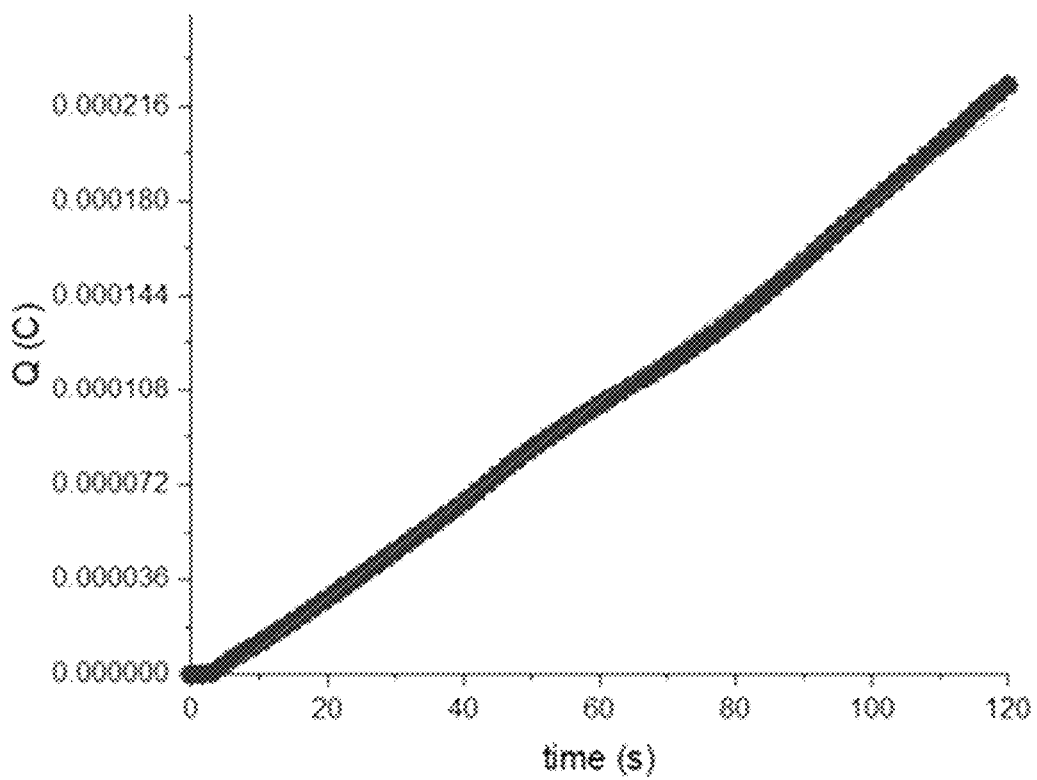
Figure 17B:
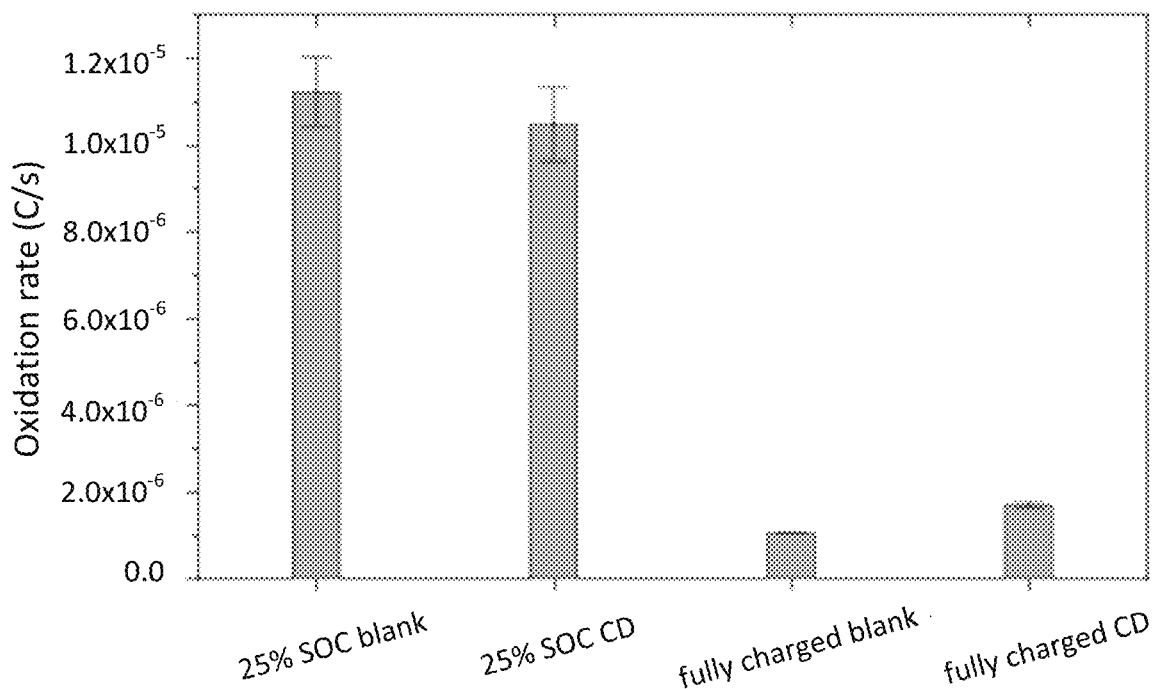

A generic illustration of collected data is shown in FIGS. 17A-17B. Due to well stirred solution and only 120 s measurement with small electrode area, mass transfer and SOC change influence can be considered as neglectable. Thus, a linear relationship was obtained (A condition where neglectable oxidizable material concentration change during testing period). The slope represents an oxidation rate (C/s, average current, unit A) for the solution oxidizable species during that testing period.

A heterogeneous reaction oxidation rate constant (cm/s) at a specified overpotential was calculated based on a pseudo first order reaction model (Hammerich et al., *Organic electrochemistry:revised and expanded* 2015, CRC Press; Markle et al., *Science Advances* 2018, 4: eaat5776):

$$\text{Rate}(\text{mol} \cdot s^{-1} \cdot \text{cm}^{-2}) = \frac{i}{nFA}$$

here "i" unit is A(C/s), A is 0.0707 cm$^2$. Under the assumption that the electrode surface concentration is the same as bulk electrolyte (under the reaction condition, very small current is passed through the system and mass transfer is facilitated with stir bar to minimizing solution DOD change, the electrode adsorption influence is neglected in this calculation). A simplified derived equation is used in this study, shown below:

$$k_{obs}(\text{cm} \cdot s^{-1}) = \frac{i}{nFAC_{bulk}}$$

where the $C_{bulk}$ is 15 mM (0.000015 mol/cm$^3$).

Comproportionation Reaction Rate Measurement Via In-Situ UV-Vis

A reactor was built in-house for in-situ monitoring of the comproportionation reaction. The reactor was built based on quartz cuvette with screw cap, three syringes with bent needles were fixed onto the screw cap. All the connection and gap were sealed with epoxy. Two of the syringes were used for injection of fluorenone and fluorenol solution independently, the third one was used for balancing pressure. 0.5 mL of 1 mM 27S4CFL/1 M NaOH and 0.5 mL of 1 mM 27S4CFL-OH/1 M NaOH solution were used for each test. The set-up was pre-assembled in a N$_2$-filled glovebox with two solutions filled in each syringe. Upon mixing, data point was collected around every 28 s for monitoring of 800 s. Two peaks observed increasing at ~370 nm and ~450 nm were attributed to newly generated radical anion. The peak intensity increased fast in the beginning and then stabilized, suggesting an equilibrium reached. The initial portion of the curve was fitted linear, the slope was employed to estimate the comproportionation reaction rate (a.u./s).

Solubility Measurement

A general procedure was applied following below steps. First a supernatant was prepared by mixing solute and solvent with heating, stirring, and centrifugation. The resulting cooled mixture was filtered through 0.2 μm PP membrane filter. The saturated solution concentration was determined by NMR. NMR sample was prepared with mixing 100 μL of saturated solution, 50 μL of internal standard solution (1 M sodium methane sulfonate) and 950 μL D$_2$O.

Example 1

β-Cyclodextrin Additive

β-(Cyclodextrin)CD was selected as model compound. Not only benefiting from the cavity containing poly-hydroxyl structure, but it also has a pKa at around 13.5, which is similar to the pKa of functionalized fluorenol, rendering a potentially strong H-bonding structure. Based on past studies (Gaidamauskas et al., *Carbohydrate Research* 2009, 344:250-254) and measurement of β-CD behavior in alkaline solution, this supermolecule experiences two-fold of deprotonation in 1 M NaOH. Upon addition of 0.1 M β-CD to 1 M NaOH, the pH decreased in an amount corresponding to consumption of 0.184 M hydroxide, suggesting close to two-fold deprotonation per β-CD molecule. From a battery operation point, β-CD is notable for its redox-inert character and large molecular size, which leaves no concern of crossover and loss of catalyst. From a practical application point, the low-cost and non-toxic merit warrants feasible implementation.

Figure 9A:
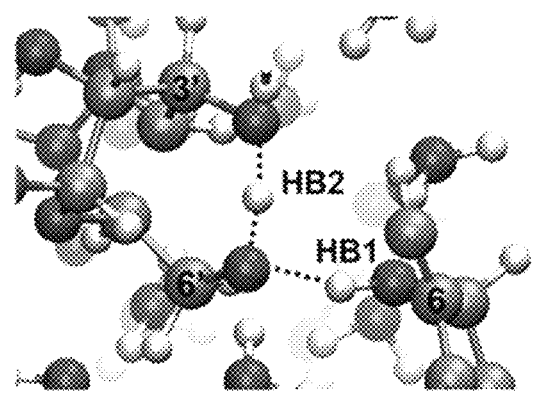
Figure 9B:
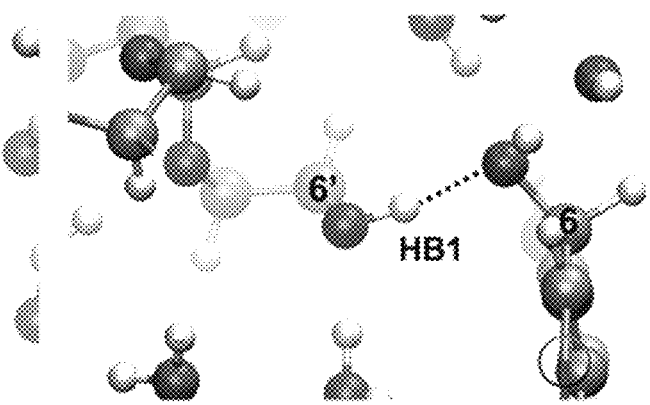
Figure 9C:
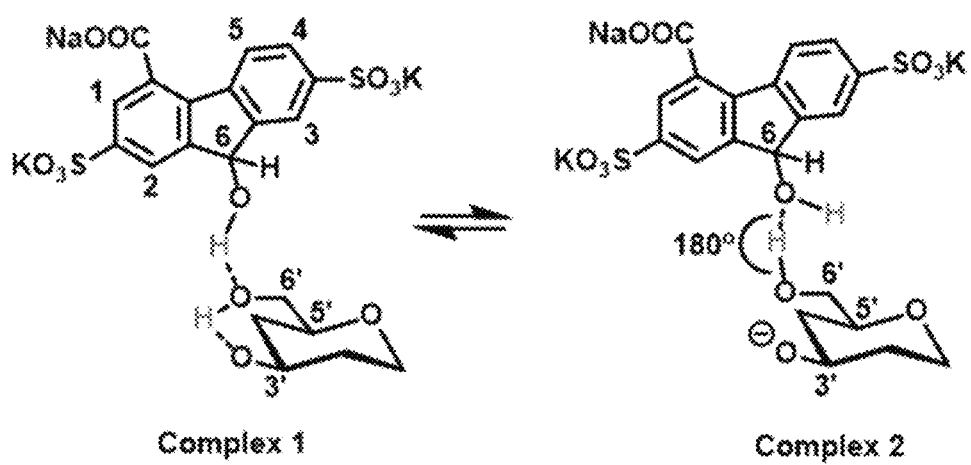
Figure 10:
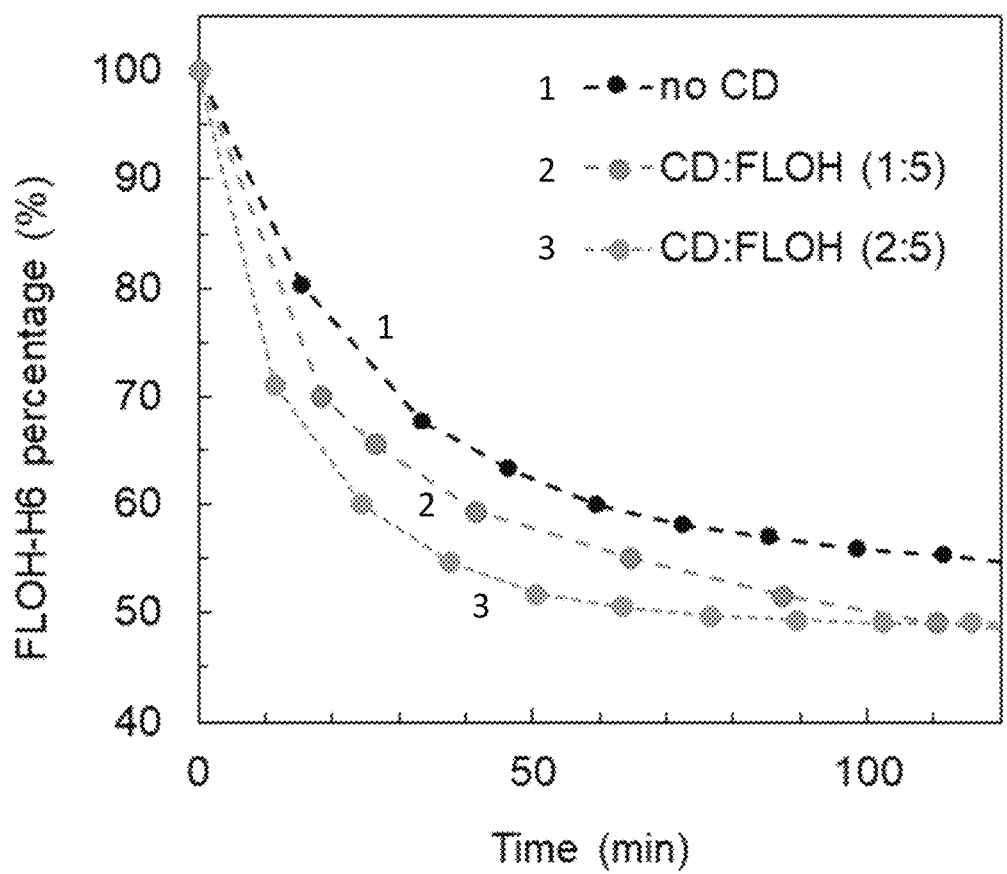
FIG. 10 is a graph showing the proton exchange rate with increasing ratios of β-CD to 27S4CFL-OH.
Figure 11A:
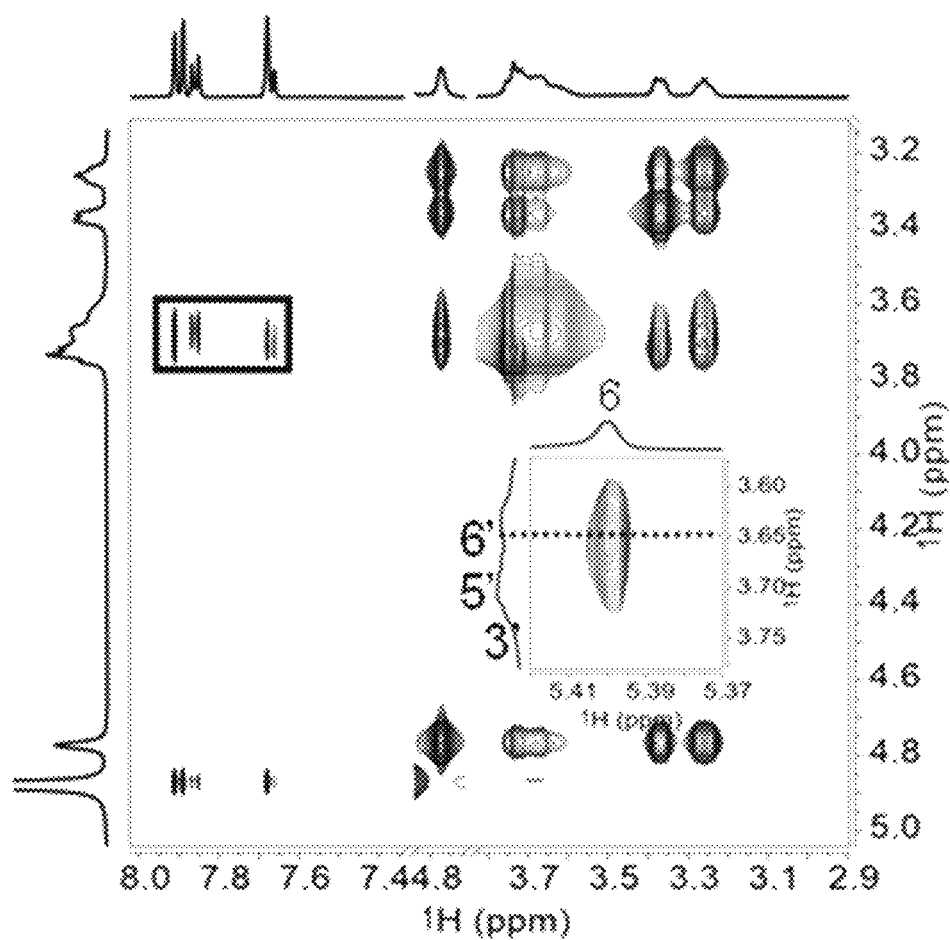
FIGS. 11A and 11B are Nuclear Overhauser Effect Spectroscopy (NOESY) illustrations of the bonding complex of β-CD and 27S4CFL-OH.
Figure 11B:
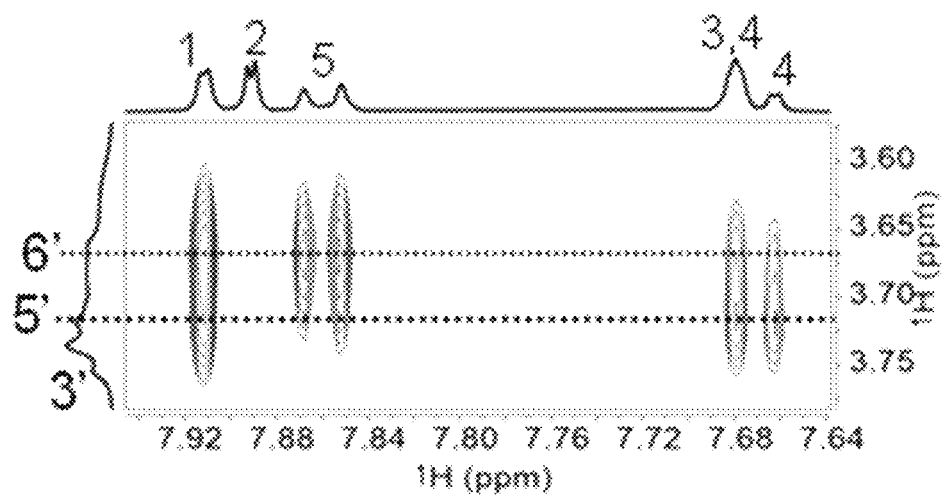
Figure 12A:
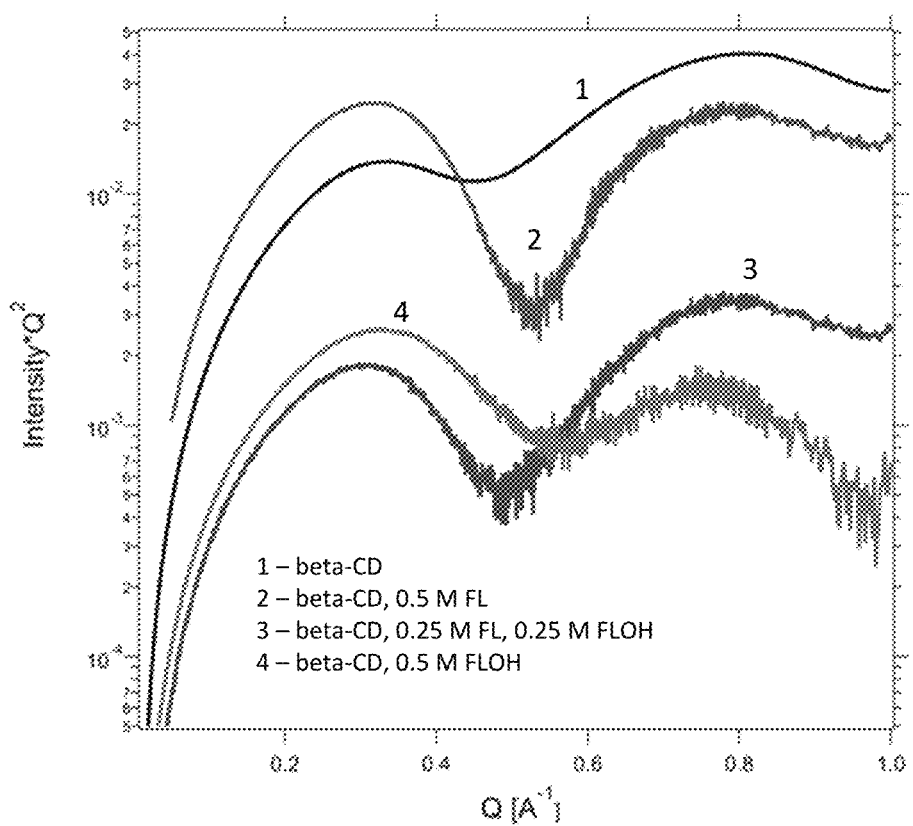
FIGS. 12A and 12B show SAXS data for the complex cluster electron density (FIG. 12A) and size (FIG. 12B).
Figure 12B:
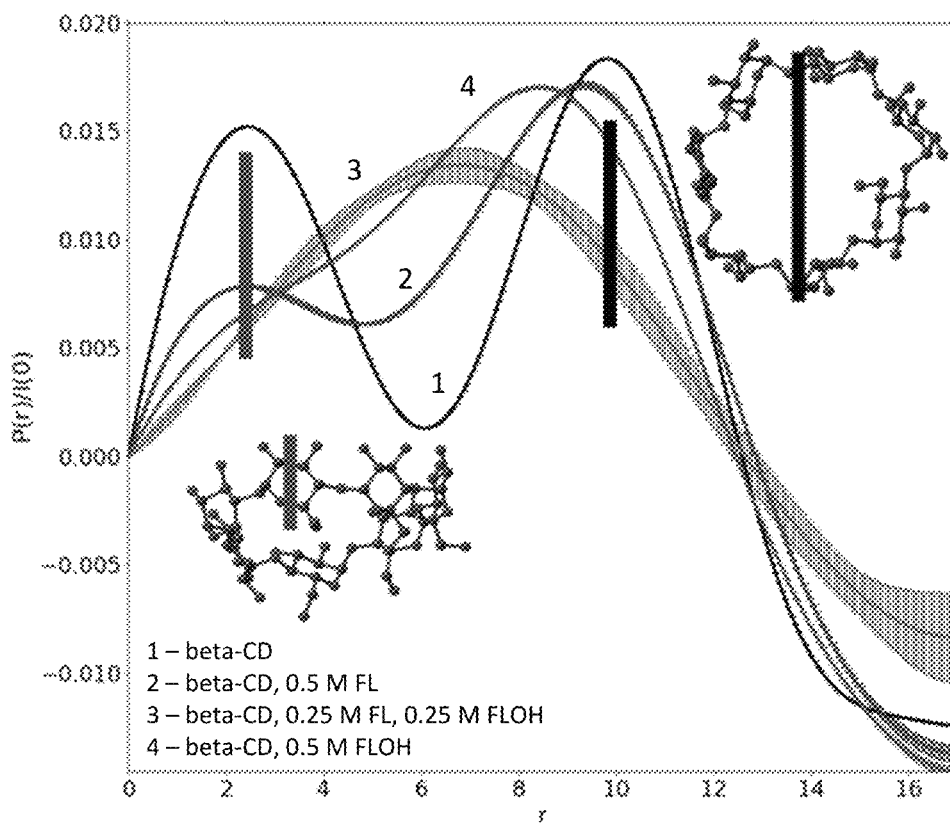

The H-bonding structure was investigated and verified theoretically and experimentally using β-CD and 2,7-sulfonate-4-carboxylate fluorenone (27S4CFL) as model compounds (structures in Tables 1 and 2). In classical Molecular Dynamics (MD) calculation, a major H-bonding structure (FIG. 9A) was captured, with fluorenol 6O-H as proton donor and β-CD 6'O as proton acceptor (HB1). A simulation suggested the residence time ratio of Complex 1 (1089.164 ps) and Complex 2 (340.037 ps) (FIG. 9B) is 3.2:1, illustrating Complex 1 as a more thermodynamically favored H-bonding structure (FIG. 9C). DFT calculation also validated that Complex 1 was thermodynamically more favored. The intramolecular H-bonding (FIG. 2A HB2) between 3'O$^-$ and 6'O would render this proton even more acidic than individual 3' hydroxyl or 6' hydroxyl (proton moving back and forth between the two oxygens on 3' and 6' observed in MD simulation), potentially serving as proton outlet of the complex to bulk solution hydroxide during the proton-coupled electron transfer (PCET) process with less steric hindrance. This acceleration was also validated experimentally by nuclear magnetic resonance (NMR) proton exchange (FIG. 10). With increasing β-CD ratio, the proton exchange rate of fluorenol benzylic C—H increased. This observation directly supported the hypothesis that a suitable H-bonding structure could accelerate the deprotonation process in alkaline water. The formation of the bonding structure was cross-verified by both NMR and Small-angle X-ray scattering (SAXS). The Nuclear Overhauser Effect Spectroscopy (NOESY) correlation between FLOH (H1, H3, H4, H5 and H6) and β-CD (H5' and H6') illustrated that FLOH mostly interacts with β-CD at the primary hydroxyl on 6' (FIGS. 11A-11B, Tables 3 and 4). A cross peak observed between H6 and H6' suggested a distance <5 Å. In SAXS, the critical radial distributions functions (RDFs) suggested that FL-OH/β-CD bonding structure experienced a cluster shape transformation compared to plain β-CD (FIGS. 12A-12B, Table 5). This shape transformation further supports the interaction between FL-OH and β-CD at 6' position. A more detailed discussion of the spectroscopy data is provided below.

TABLE 3

Diffusion coefficients (×10$^{-10}$ m$^2$/s) measured using $^1$H (for H$_2$O, FL, FLOH and β-CD) and $^{23}$Na (for Na$^+$) PFG NMR at 25° C.

| D(×10$^{-10}$ m$^2$/s) | 0.5M FLOH | 0.5M FL | 0.1M β-CD | 0.5M FLOH + 0.1M β-CD | 0.5M FL + 0.1M β-CD |
|---|---|---|---|---|---|
| D(H$_2$O) | 13.6 | 12.1 | 13.1 | 11.9 | 9.72 |
| D(Na$^+$) | 6.72 | 7.60 | 8.12 | 4.41 | 4.31 |
| D(FLOH or FL) | 2.45 | 1.92 | — | 1.91 | * |
| D(FLOH - H6) | 2.43 | — | — | 1.72 | — |
| D(β-CD) | — | — | 1.57 | 1.13 | 0.81 |

* $^1$H signals of FL in this solution are so broad that no signal survives PFG measurements.

TABLE 4

The ratio of diffusion coefficient of Na$^+$, FLOH, FL, and β-CD to that of H$_2$O reveals the changes in hydrodynamic radius of these species with the addition of β-CD.

| D/D(H$_2$O) | 0.5M FLOH | 0.5M FL | 0.1M β-CD | 0.5M FLOH+ 0.1M β-CD | 0.5M FL + 0.1M β-CD |
|---|---|---|---|---|---|
| D(Na$^+$)/D(H$_2$O) | 0.49 | 0.63 | 0.62 | 0.37 | 0.44 |
| D(FLOH or FL)/D(H$_2$O) | 0.18 | 0.16 | — | 0.16 | — |
| D(β-CD)/D(H$_2$O) | — | — | 0.12 | 0.09 | 0.08 |

TABLE 5

| Sample | Diameter |
|---|---|
| β-CD | 11.76 ± 3.94 Å |
| FL | 16.48 ± 0.21 Å |
| FL/FLOH | 15.04 ± 3.38 Å |
| FLOH | 12.32 ± 1.84 Å |

With the introduction of 0.1 M β-CD, $^1$H signals of FLOH aromatic regions shift to lower frequency by 0.24-0.31 ppm, indicating the less electron density located at the aromatic rings due to the interaction between FLOH and β-CD. Meanwhile, $^1$H signals from β-CD are slightly broadened with the addition of 0.5 M FLOH due to the slightly lowered molecular motions as a result of higher viscosity. The NOE correlation between FLOH (H1, H3, H4, H5 and H6) and β-CD (H5' and H6') suggests that FLOH mostly interact with the small opening of β-CD. Furthermore, the lowered diffusion coefficient of FLOH-H6 compared to the diffusion coefficient of FLOH aromatic protons in the mixed solution (Tables 3-4) may support the hypothesis that FLOH interacts with β-CD through the hydrogen bonding between FLOH and hydroxyl oxygen of the primary carbon at β-CD.

On the other hand, $^1$H signals from FL become a much broader resonance between 6-10 ppm, suggesting that the tumbling motions of FL molecules are highly restricted at the presence of β-CD; meanwhile, H5' and H6' from β-CD experience the most significant shift by 0.14-0.17 ppm to lower frequency. Combined with the remarkably reduced diffusion coefficients of water and β-CD in the mixed solution, it is believed that the FL molecules are "trapped" between the small openings of CD molecules in a way that CD may still rotate freely while FL rotations are highly suppressed. This observation corresponded to the data obtained in SAXS.

The SAXS data critical radial distributions functions (RDFs) obtained suggested that plain β-CD exhibited two peaks (FIGS. 12A-12B), with the width of the cup at ~12 Å and height of the cup at ~4 Å. FL-OH/β-CD bonding structure showed only one peak of diameter at ~12 Å, suggesting a distributed ball-shaped cluster. This shape change further supported that FL-OH was interacting with the smaller opening of the cup-shaped β-CD at 6' position and transforming the whole cluster into a ball-shaped cluster. FL/β-CD (red curve) illustrated the cup-shaped β-CD being compressed on the width dimension. Combing the increased electron density in FIGS. 12A-12B, curve 4, it is proposed that FL entered the CD cavity and changed the cluster shape from cup to more eclipsed. This was also validated in NMR with reduced diffusion coefficient obtained discussed above. While FL-OH was interacting on the outside smaller opening of the cup-shape CD (No electron density increased), transforming it into a ball-shaped cluster. Combing information from both NMR and SAXS, a dynamic movement of the FL can be depicted: At discharged state, some of the FL can enter the CD cavity. While charged, FL-OH moved out and interacted mainly at the outside of the CD.

A battery current response test at controlled voltage was conducted with 0.1 M 27S4CFL to examine the battery discharge kinetics at different states of charge (SOC) (FIG. 13). In prior tests for this FL derivative, the two plateaus observed in the charging curve (more distinct at faster charging rate) suggested a competitive event between the disproportionation coupled electrochemical process and the consecutive two-electron pure electrochemical process (FIG. 1). The 25% SOC electrolyte solution was considered as radical anion rich electrolyte state due to low SOC at faster charging rate. In situ EPR also validated this understanding.

Figure 14:
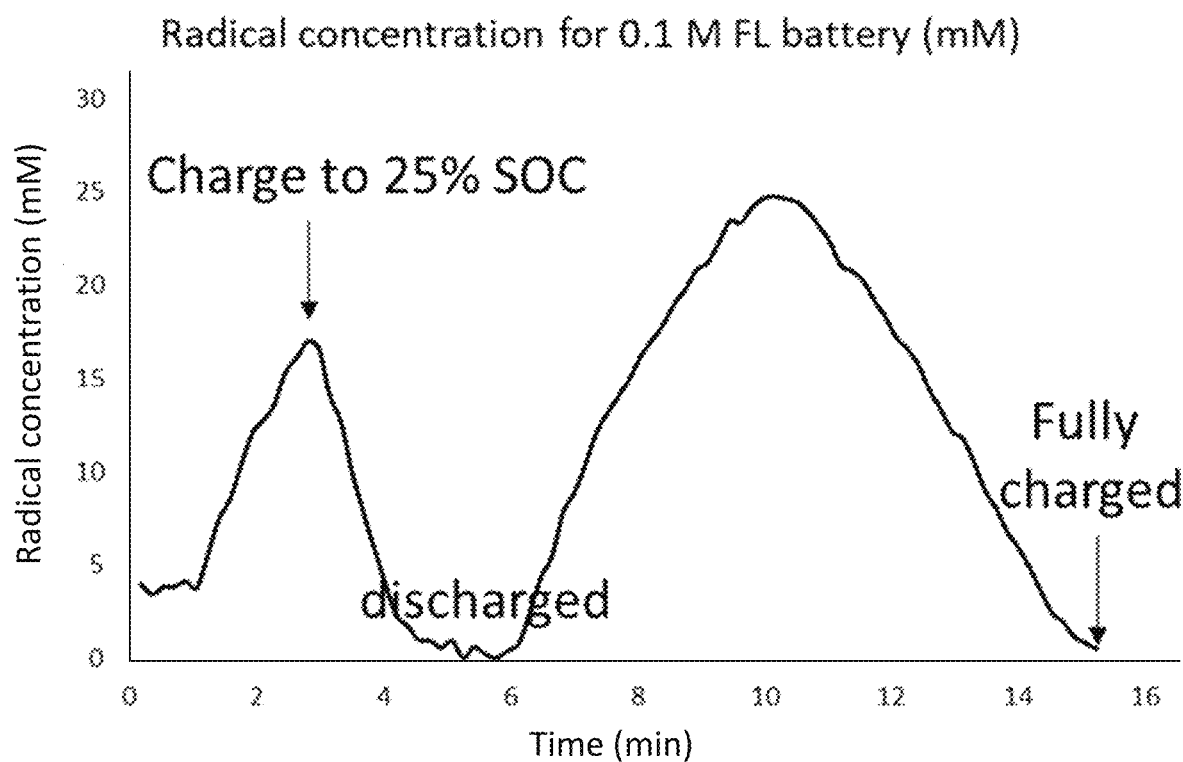
FIG. 14 is a graph showing concentration of the radical anion during charge of the battery of FIG. 13.

On the charging towards 25% SOC, the radical anion concentration was increasing and didn't reach a reverse trend point (FIG. 14). As the battery was initially charged to 25% SOC at 20 mA/cm$^2$, the radical concentration was observed increasing to 17 mM during the charging process. On contrary, during the full battery charge process at same current density, the radical concentration was observed to have a concave shape, with the radical concentration increasing in the first half then decreasing. In either case, the radical concentration was observed much smaller the value calculated assuming "no disproportionation involved." For example, for a battery charged to 25% SOC (2.8 min), without disproportionation, 50 mM of radical concentration would be expected. For a battery in the full charge process, without disproportionation, 100 mM of radical concentration would be expected at the 50% SOC point. Instead, only 25 mM of radical concentration was captured. The radical concentration at 25% SOC was much higher than in the fully charged electrolyte.

In FIG. 13, at 25% SOC, in the case with β-CD, the battery exhibited a smaller average discharge current density under 0.9V controlled voltage discharge, which suggested a negative effect of β-CD on the discharge of radical anion rich electrolyte (FIG. 4, reaction I). The battery was constructed with 12 mL 0.1M 27S4CFL anolyte. The catholyte was prepared with 500 mL 0.1 M ferrocyanide/0.05 M ferricyanide/1 M NaOH to maintain a relative constant catholyte SOC and constant anode potential under controlled voltage test, based on Nernst Equation. With increasing initial electrolyte SOC (FIGS. 13, 50% and 75% SOC), the electrolyte composition at the beginning of the discharge shifted from radical anion rich to fluorenol rich with less radical anion, due to higher SOC (FIG. 14). When the β-CD was present, the battery exhibited higher current density than the corresponding blank test. In FIG. 13 (fully charged), the battery electrolyte was first fully charged and fluorenol was the predominant species in the electrolyte (FIG. 14). In the case with β-CD, the battery exhibited a 1.6 times peak current density, which suggested a positive effect on the discharge of fluorenol.

Figure 15:
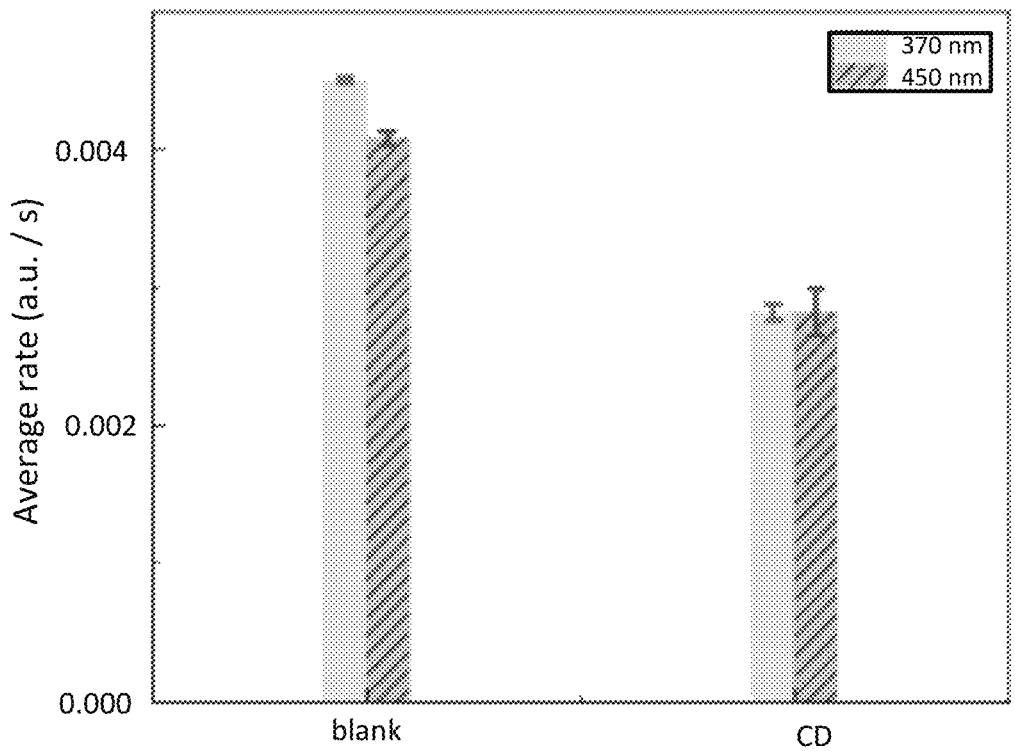
FIG. 15 is an absorbance graph showing the relative amounts of 27S4CFL comproportionation in the absence and presence of β-CD.
Figure 16:
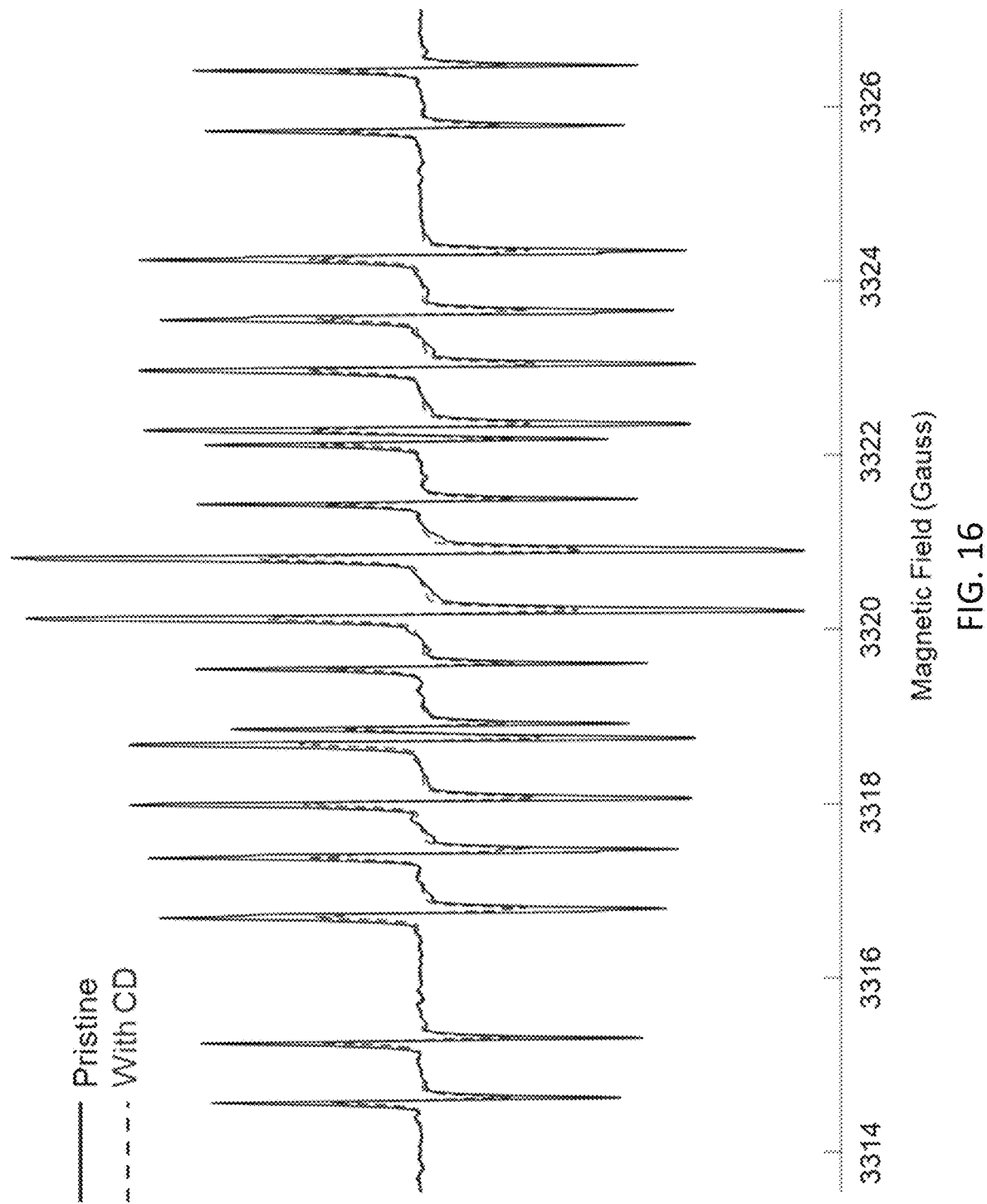
FIG. 16 shows electron paramagnetic resonance (EPR) spectra of a pristine solution (a mixture of 0.001 M FLOH and 0.001 M FL at a volume ratio of 1:1, solid line) and with the addition of 0.001 M β-CD (dashed line).

A negative effect on the comproportionation reaction (FIG. 4, reaction II) brought by β-CD can be readily verified via UV-vis and EPR. FIG. 15 is a graph of UV-Vis results showing that comproportionation was reduced when β-CD was added. Data was collected over 800 seconds. FIG. 16 shows EPR spectra of the pristine solution (a mixture of 0.001 M FLOH and 0.001 M FL at a volume ratio of 1:1, solid line) and with the addition of 0.001 M β-CD (dashed line), the samples were mixed inside glove box and EPR was performed at equilibrium (20 min after mixing). The splitting pattern is consistent with a radical center at the close proximity of five protons. The presence of β-CD does not change the radical species but reduced the radical concentration by 60% estimated form peak intensity. The hydrogen bonding between FLOH-H6 and β-CD as well as the clustering between FL and β-CD may lead to the lower radical yield. This is also empirically understandable due to larger steric hindrance of β-CD in solution for the bi-molecular comproportionation reaction and slower diffusion of the complex overserved in NMR (Tables 3 and 4).

Taken together the above observations, the result suggested that in flow battery operation, β-CD slightly slowed the radical anion oxidation (FIG. 4, reaction I), slowed the comproportionation reaction to chemically regenerate radical anion to sustain discharge (FIG. 4, reaction II), and significantly boosted the fluorenol PCET process to electrochemically regenerate intermediate radical anion sustaining a much higher discharge current (FIG. 4, reaction III). This approach bypass the kinetic limitation on chemical regeneration of intermediate radical anion, especially at extreme SOC and DOD.

Figure 18:
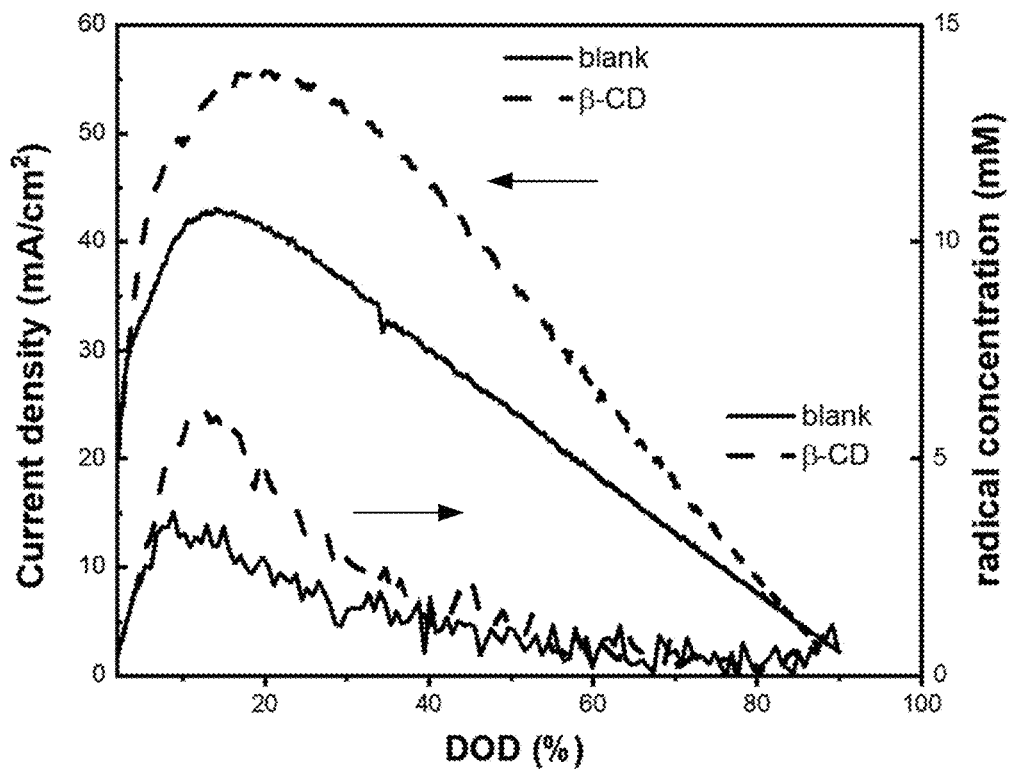
FIG. 18 shows in-situ EPR monitoring of the radical concentration during controlled voltage discharge starting from fully charged electrolyte in the battery of FIG. 13.

A measurement of substrate oxidation rate constant was performed using H-cell by Chronocoulometry. Using a pseudo first order reaction model (Hammerich et al., *Organic electrochemistry:revised and expanded* 2015, CRC Press; Sanyal et al., Angew. *Chem. Int. Ed.* 2021, 60:290-296), the measured oxidation kinetics of radical anion and fluorenol were in good agreement with the battery current response test result (FIGS. 17A-17B). IR correction was applied using the current interruption method in Gamry. A diluted solution and a stirring bar were used, and short applied potential time was applied. All contributed to a system excluding mass transfer influence and relatively constant species concentration (on the assumption that surface concentration same to bulk solution in short time period), with a focus on the oxidizable species oxidation rate on the electrode surface. The addition of β-CD resulted in a slightly reduced oxidation of the radical anion. On the other side, the oxidation of fluorenol was much slower than radical anion oxidation, and the addition of β-CD resulted 1.6 times increment of fluorenol oxidation, achieving a faster supply of radical anion. This was verified with in situ EPR measurement in a battery cell under controlled voltage operation (FIG. 18). In order to reach a relatively constant anode potential, 42 times of catholyte (2:1 ratio of $Fe^{2+}$: $Fe^{3+}$) was paired to maintain a relative constant catholyte SOC. By Nernst equation calculation, a theoretical maximum of 0.36 mV of potential fluctuation would be expected at anode side, which was acceptable in the testing system. Starting the discharge process from a fully charged electrolyte at controlled voltage, the radical concentration generated during the discharge was monitored (FIG. 18). When β-CD was present, a higher radical concentration was observed, which corresponded to a higher current density at the same DOD under the same controlled voltage. As a result, the battery discharge kinetics was boosted by a positive-sum outcome of all process involved (FIG. 4), with increased radical anion supply.

Figure 19:
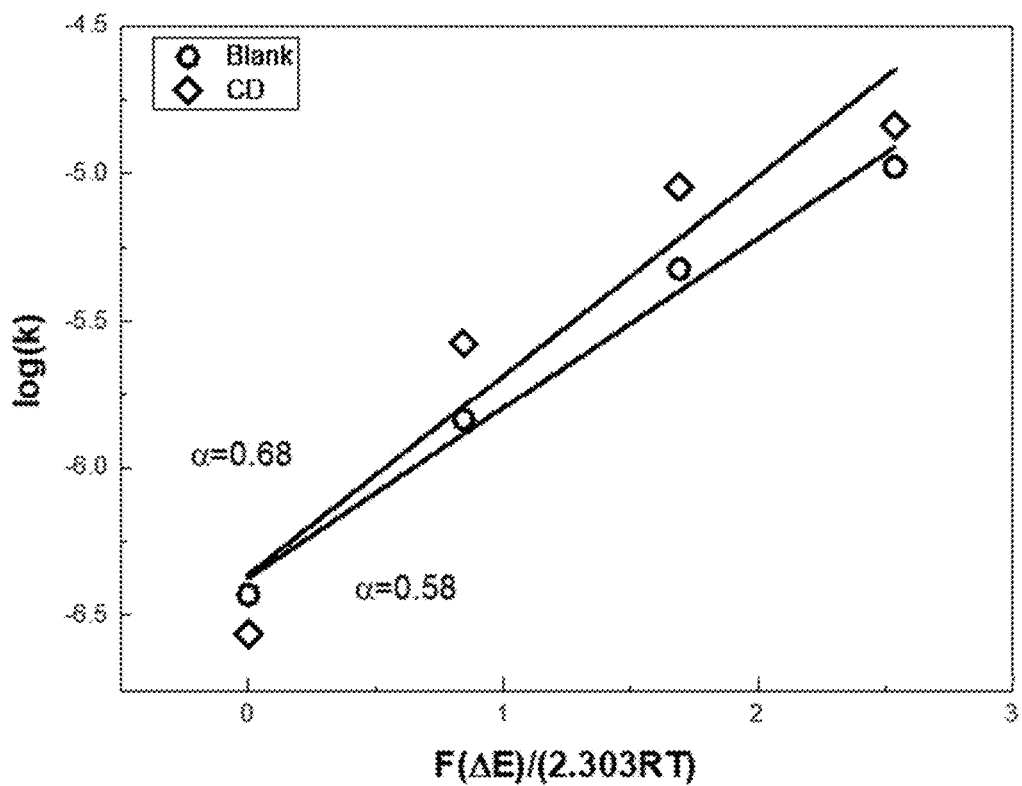
FIG. 19 is a graph showing the oxidation rate constant of fluorenol as a function of different overpotential driving force.

As discussed herein, the stronger the proton acceptor, the more favorable PT thermodynamically. Under same solution pH (hydroxide as proton acceptor), the lower the fluorenol pKa, the higher the PT driving force thermodynamically, the better discharge rate capability. For the same reaction using a fixed fluorenol derivative, though the thermodynamic driving force remains the same, the employment of a proton regulator could function as a kinetic booster for this PT process (as discussed above for FIG. 10 in proton exchange NMR). From the other side of this PCET process, the ET driving force is also at center of the topic. As shown in FIG. 19, a plot of the reaction log($k_{obs}$) against ET driving force (F$\Delta E_{ox}$/2.303RT) was presented using a pseudo first order reaction model (Hammerich et al., Organic electrochemistry:revised and expanded 2015, CRC Press; Markle et al., Science Advances 2018, 4: eaat5776; Tyburski et al., JACS 2021, 143:560-576). The Brønsted α (defined as the slope of the logarithm of the PCET rate constant versus the scaled driving force (Sayfutyarova, JACS 2018, 140:15641-15645) was fitted at 0.58, suggesting PT lagging behind of ET during the transition state (Savéant, Angew. Chem. Int. Ed. 2019, 58:2125-2128). With addition of CD, a larger Brønsted α was obtained, suggesting an even more lagging PT due to proton relay process. In comparison, a deuterated fluorenol oxidation rate was observed of 1.4 times enhancement with addition of β-CD. In the deuterated fluorenol test, the additive boosting effect was smaller than the protonated version. Following the method described in Method section, a KIE value of 2.58 was obtained for the blank test case, and 2.42 for the β-CD case at the applied potential of −0.65V vs Hg/HgO. This smaller boosting effect was attributed to heavier deuterium than hydrogen. Kinetic isotope effect values of 2.58 in blank case and 2.42 in β-CD case were obtained.

Figure 20:
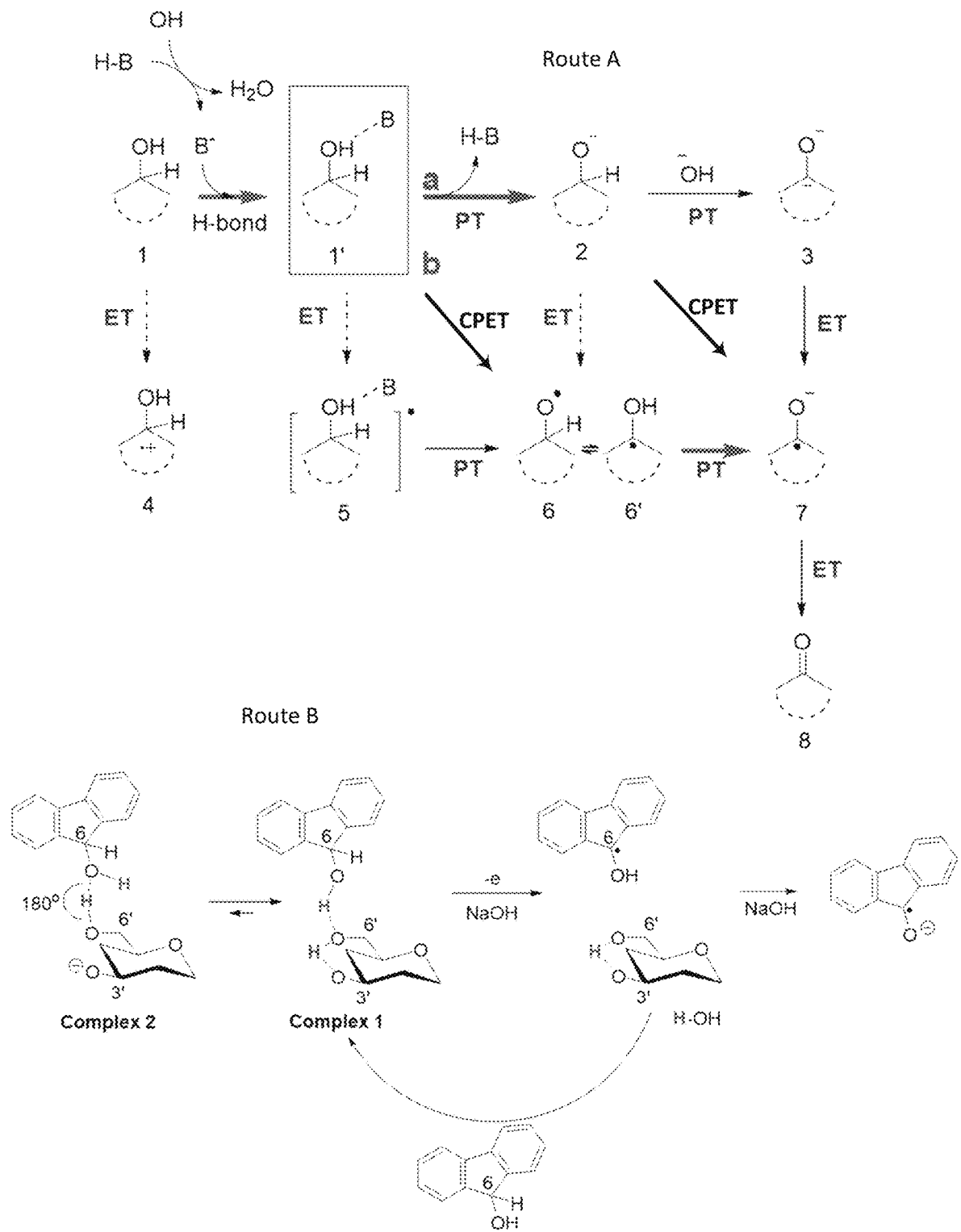
FIG. 20 is a proposed fluorenol proton-coupled electron transfer reaction mechanism to generate a radical anion.

Proposed mechanisms are depicted in FIG. 20 and discussed below. FIG. 20 shows a proposed fluorenol PCET reaction mechanism to generate radical anion 7 (two protons and one electron removal). In alkaline media, 1, 1', 2, 3 are at equilibrium with the equilibrium resided at the 1 and 1' side in water solution due to high water concentration by Le Chatelier's principle. All the ET step drains reaction towards the final product 7 and 8. The route B PCET likely experienced a lower barrier due to the well positioned proton acceptor in place, serving as localized base (Sayfutyarova, JACS 2019, 141:15183-15189; Savéant, Angew. Chem. Int. Ed. 2019, 58:2125-2128) compared to route A PCET process. Based on literature (Wang et al., Nat. Commun. 2019, 10:2796; Hammerich et al., Organic electrochemistry:revised and expanded 2015, CRC Press), during direct alcohol oxidation process on electrode with no novel metal catalyst involved, C—H is the first proton being removed in general proposed mechanism (leading to carbon radical 6' instead of O radical 6) while O—H is indeed the most acidic proton in alcohol. By DFT calculation (method B3LYP/6-311++G**+DFTD3 in implicit water solvent) 6' is 32.6 kcal/mol lower energy compared to 6. As a result, 6' was considered as the PCET product and 7 was detected in alkaline water solution in EPR. As illustrated during the H-bonding complex discussion above, with increasing β-CD ratio, the proton exchange rate of fluorenol benzylic C—H was increased (FIG. 10). This observation confirmed that complex formation accelerated route a(1'-2) PT by lowering the proton exchange barrier. The following reaction 2-7 was challenging to identify a clear pathway between concerted or stepwise PT-ET due to proton exchange observed prior. Alternatively, taking into consideration of the calculated Brønsted a at a value larger than 0.5 and KIE values resided in concerted pathway range in literature reports, route B was proposed (Hammes-Schiffer, Chem. Rev. 2010, 110:6937-6938; Huynh et al., Chem. Rev. 2007, 102:5004-6063; Sayfutyarova et al., JACS, 2019, 141:15183-15189; Darcy et al., JACS 2019, 141:10777-10787; Markle et al., Science Advances 2018, 4: eaat5776; Savéant, Angew. Chem. Int. Ed. 2019, 58:2126-2128; Tyburski et al., JACS 2021, 143:560-576). By forming the H-bonding complex and providing proton acceptor well positioned (FIG. 9A), a concerted pathway route b (1'-6') would bypass the high energy barrier for ET (1'-5). The following PT (6'-7) was significantly energy down-hill as revealed by DFT calculation. Considering around 32.6 kcal/mol energy difference between 6 and 6' (FIG. 20), the deprotonation of 6' was still very thermodynamically favored (larger than 10 kcal/mol).

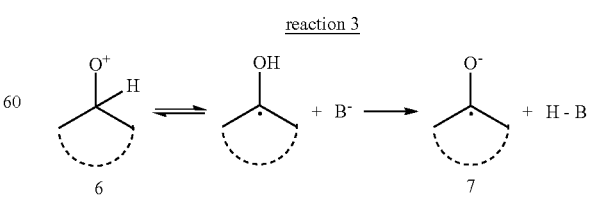

reaction 3

| B⁻ | H—B pKa | B3LYP/6-31++G** + GD3BJ deltaG3 | B3LYP/6-31++G** + GD3BJ deltaG3 | B3LYP/aug-cc-pvtz + GD3BJ deltaG3 |
|---|---|---|---|---|
| $H_2O$ | -1.74 | 5.05 | 4.05 | 4.12 |
| HO-C₆H₄-O⁻ (4-hydroxyphenolate) | 9.7 | -41.48 | -42.56 | -43.39 |
| $CF_3CH_2O^-$ | 11.4-12.4 | -46.35 | -47.75 | -48.50 |
| $OH^-$ | 14 | -54.7 | -56.29 | -56.69 |
| $EtO^-$ | 15.9 | -55.37 | -56.75 | -57.1 |

Example 2

Effects of Various Additives

Figure 21:
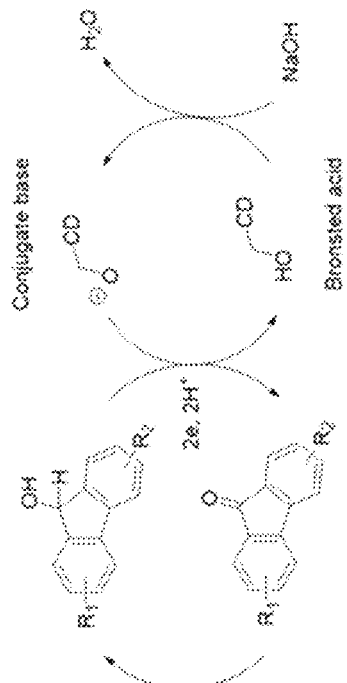
FIG. 21 shows H-cell measurements of the oxidation rate of fluorenol with different additives of different pKa.
Figure 21:
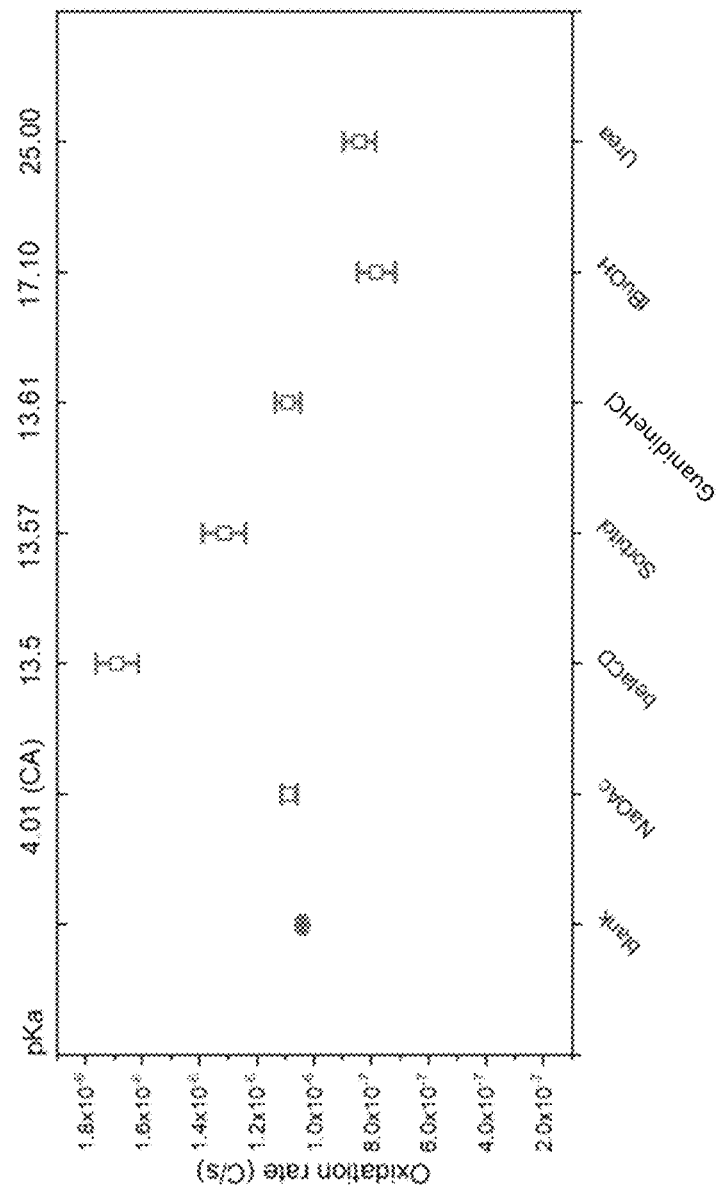

Oxidation rate measurements of fluorenol with different additives with differing pKa values are presented in FIG. 21. A variation on the oxidation rate was observed due to multiple factors and theoretical limitations on the model applied here. When the pKa is too low (e.g., sodium acetate), the additive cannot accept a proton from the fluorenol derivative. When the pKa is too high (e.g., t-butanol or urea), the proton cannot be delivered to the hydroxide. As shown in FIG. 21, the additive conjugate base serves as proton acceptor to participate in the fluorenol oxidation process. The conjugate base was generated from the added additive in acid form. In the experiment, the total amount of proton acceptors (hydroxide and conjugate base) was controlled the same, except in the NaOAc case to maintain solution pH. The ratio of hydroxide and conjugate base was controlled by the pKa of additive and water. As shown in FIG. 21, varying oxidations rates were measured with different additive pKa values. The additive acid form was employed in alkaline water during the experiments. The pKa of the additive, pKa of water and solution pH were considered. Also due to the intrinsic molecular difference between each proton acceptor, the H-bonding ability between FL-OH and additive was considered. For example, in guanidinium salt case, the proton acceptor is a charge neutral species, which may introduce a weaker hydrogen bonding when compared to other anionic proton acceptors. The electrode adsorption influence cannot be excluded from this rate measurement. On a larger picture (assuming the electrode surface substrate adsorption variation is small enough when using low concentration additive), pKa match theory applies here on the observed oxidation rate (C/s), generating a volcanic performance (Wang et al., Nat. Catal. 2021, 4:753-762).

Figure 22:
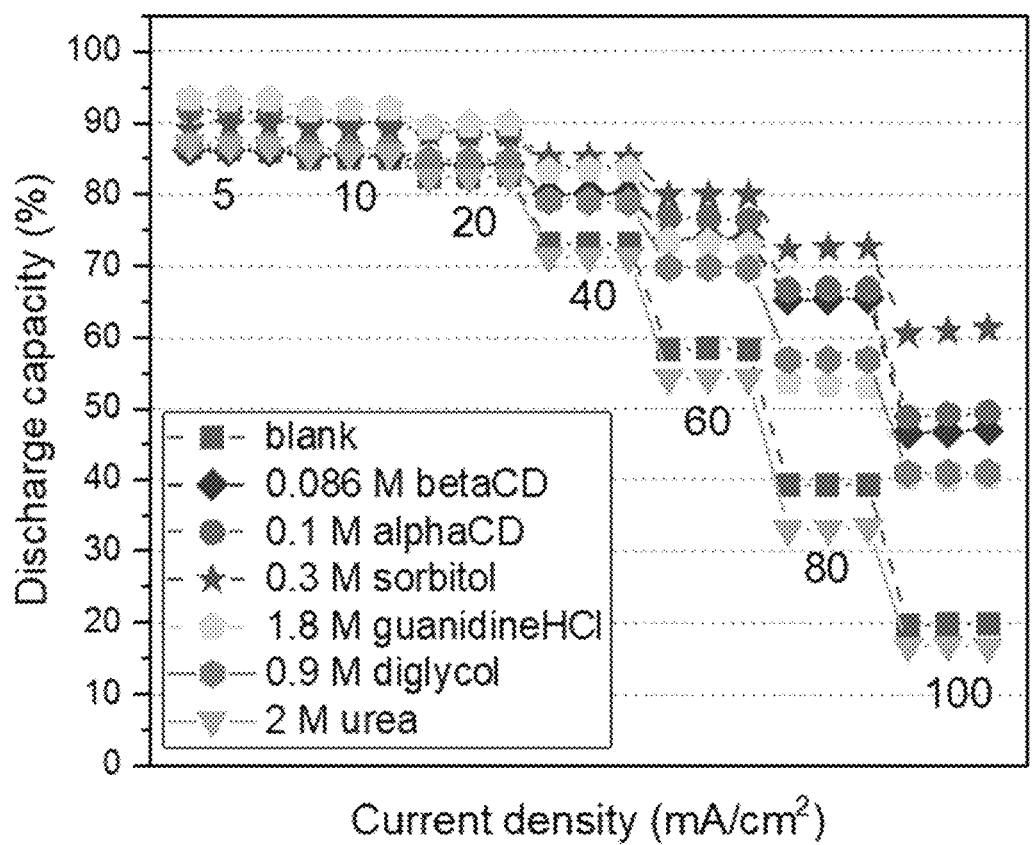
FIG. 22 is a graph showing the effective of additives with varying pKa values on battery current density capability, wherein the additives' total hydroxyl group concentration was the same.
Figure 23:
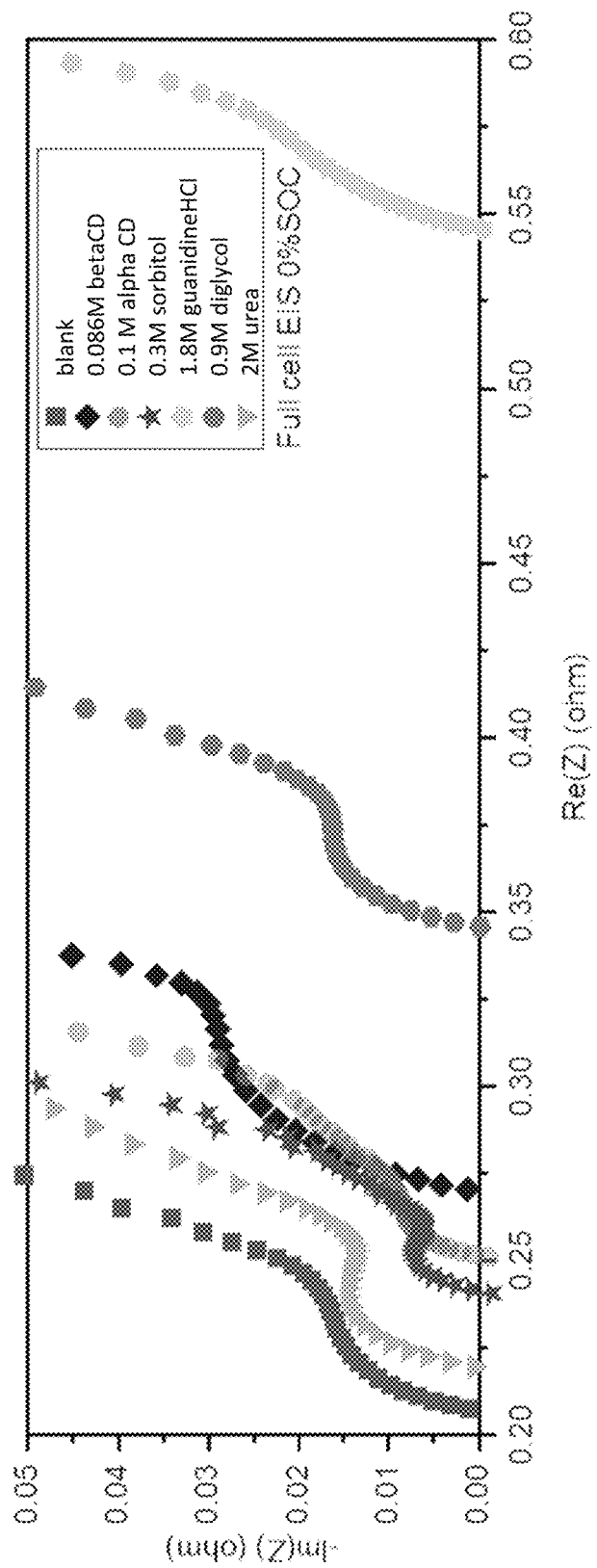
FIG. 23 shows electrochemical impedance spectra of batteries with a catholyte comprising ferri/ferrocyanide and an anolyte comprising 27S4CFL with various additives.
Figure 24D:
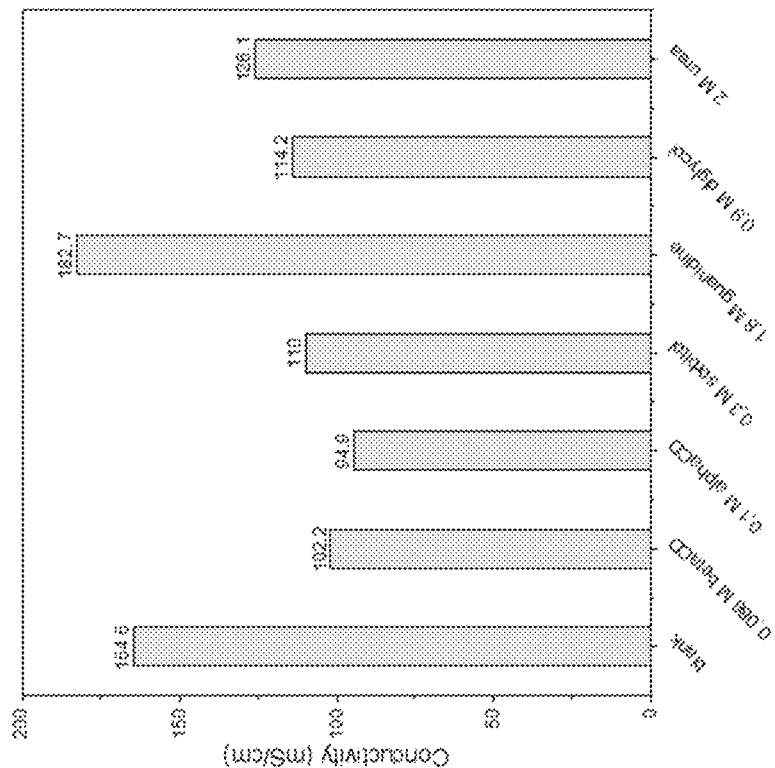
Figure 24C:
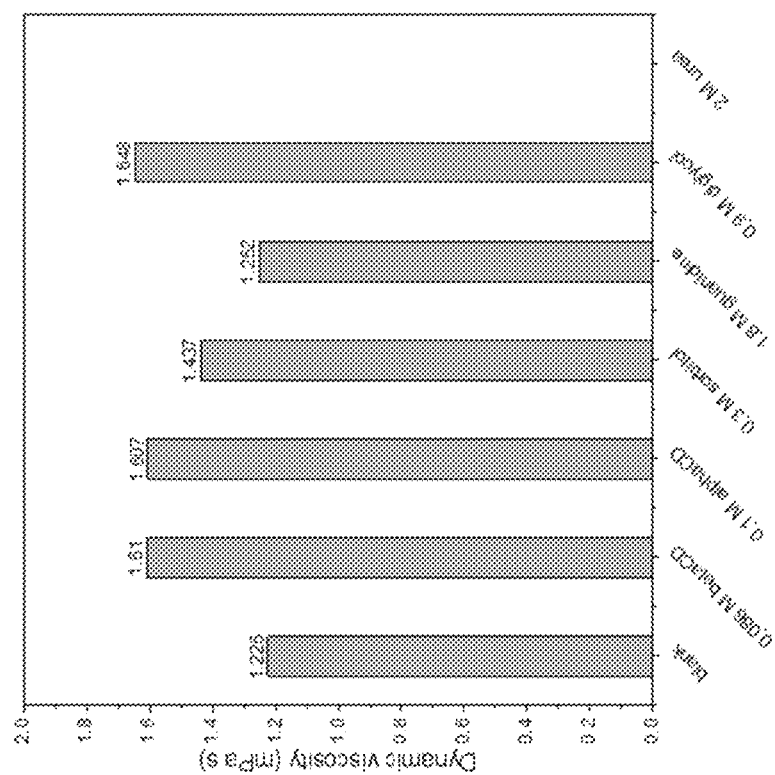
Figure 25:
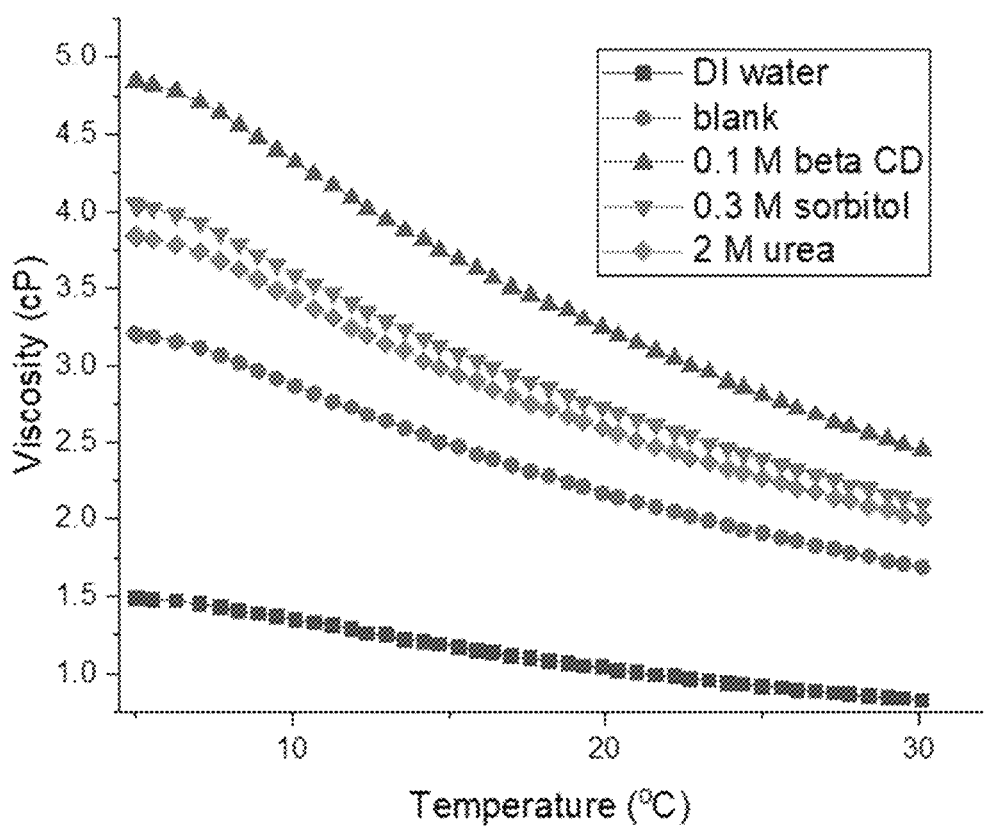
FIG. 25 is a graph of viscosity vs. temperature for electrolytes comprising 0.5 M 27S4CFL/1 equiv. NaOH, the specified concentration of additive, and 1 M NaOH.
Figure 26A:
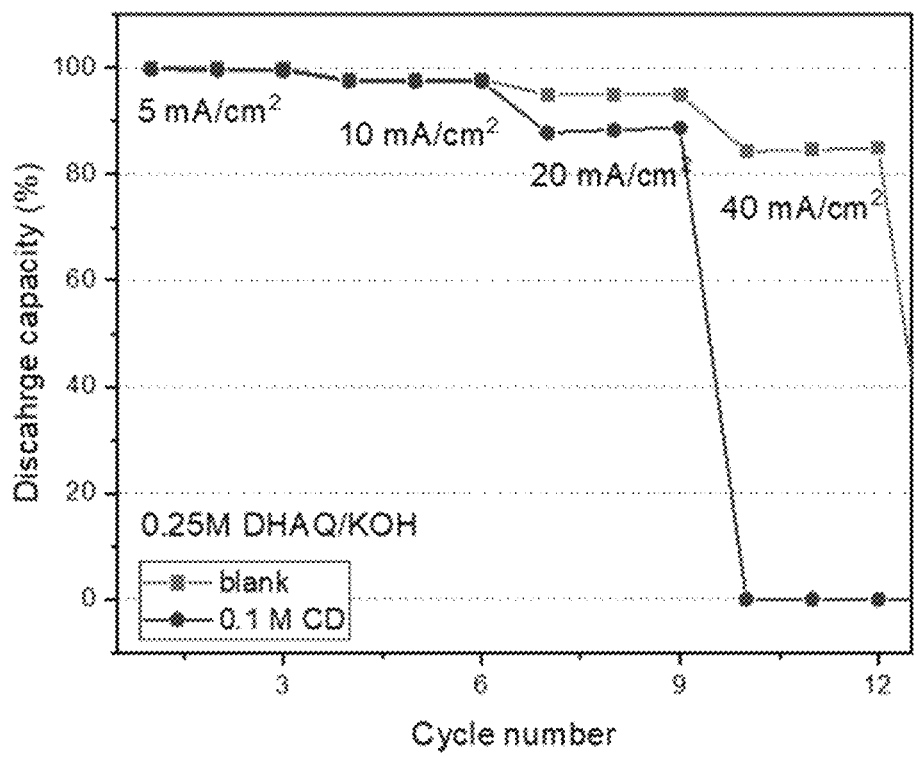
Figure 26B:
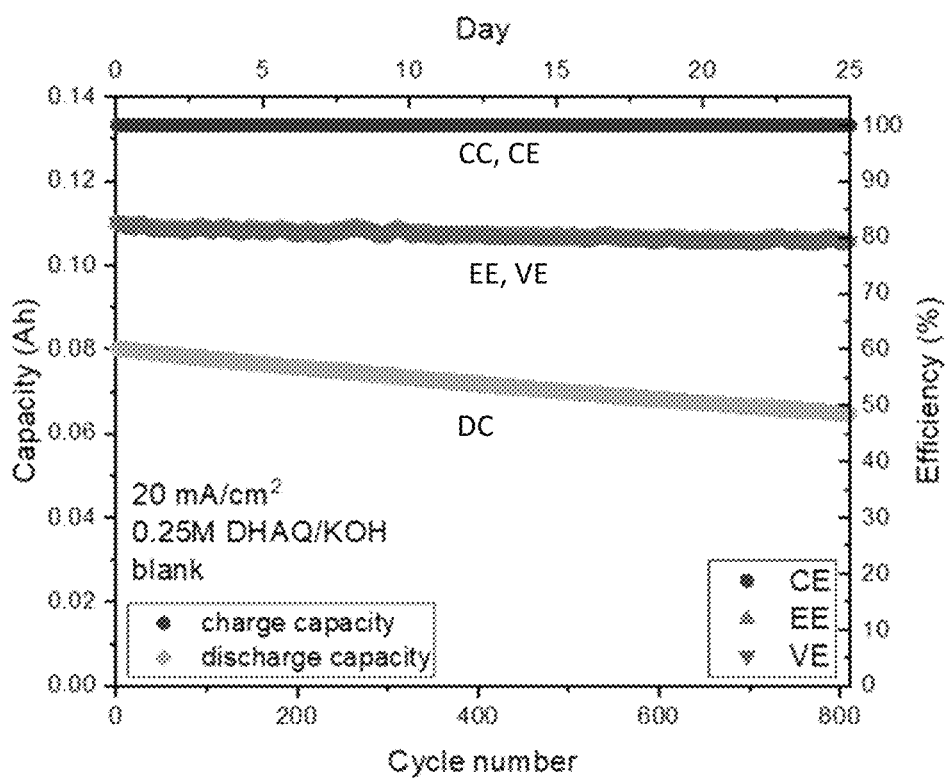
Figure 26C:
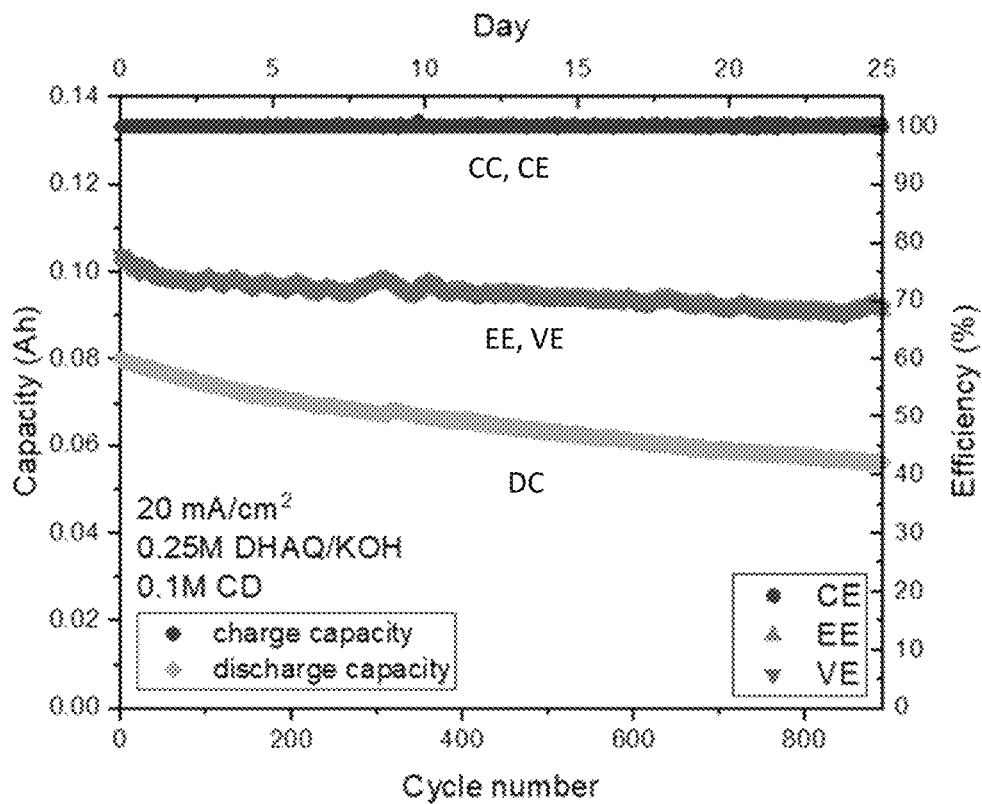

The proton regulation strategy was confirmed effective to various degrees in a battery context with a series of additives with a range of pKa values and 27S4CFL as a model fluorenone/fluorenol derivative (FIG. 22). CV of the additives was screened to warrant a redox inert character to be applicable in RFB. Within the water window, no redox event was observed from the additives. No obvious alteration was observed on 274FL redox events by CV with additives present. With the addition of organic additives, some physical properties of the electrolyte, such as viscosity, conductivity, full cell resistance, and charge transfer resistance revealed a negative effect on the battery performance, due to the increased viscosity and decreased conductivity (FIGS. 23-25). The results were verified with a battery test result using 2,7-dihydroxyanthraquinone (DHAQ) (FIGS. 26A-26C). The battery physical parameters were negatively affected by CD, and the performance was worse, particularly at higher current density. The interaction between FL and β-CD does not occur with DHAQ, thus the influence on the viscosity does not translate into the same ratio for battery rate performance. Additionally, DHAQ was generally reported via CPET mechanism, with no limitation on PT. In the FL battery case, the additive positive-sum effect was an overall result targeting a coupled chemical reaction mechanism and enabling CPET pathway by providing a proton acceptor in an H-bonding structure. In the FL case, in contrast to DHAQ, the rate capability experienced degrees of enhancement (FIG. 22). A detailed discussion regarding battery performance in each case is presented below.

Figure 27:
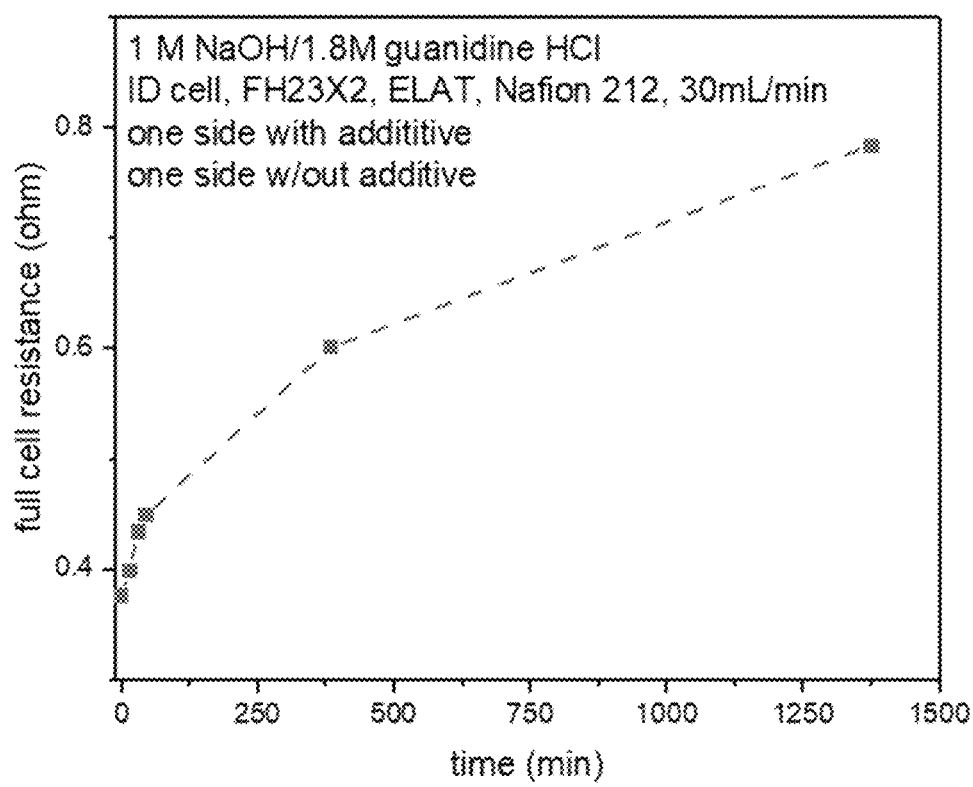
FIG. 27 shows full cell resistance over time for a cell wherein the electrolytes include 1.8 M guanidinium chloride- and 1M NaOH.
Figure 28:
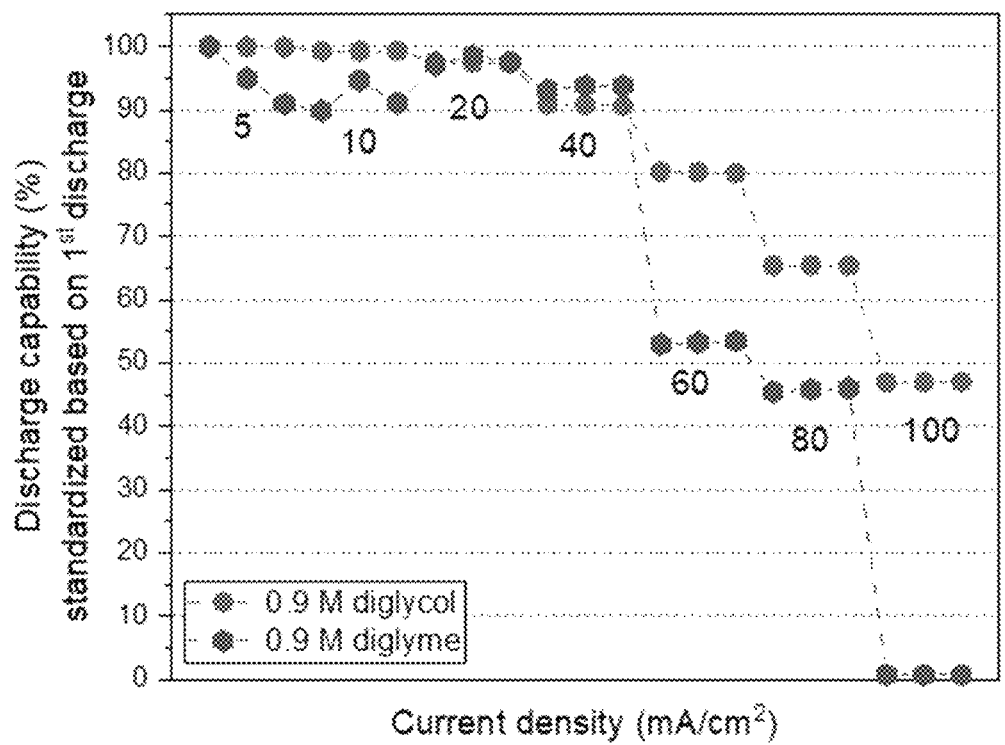
FIG. 28 is a graph comparing rate capability with diglycol and diglyme as additives.
Figure 29A:
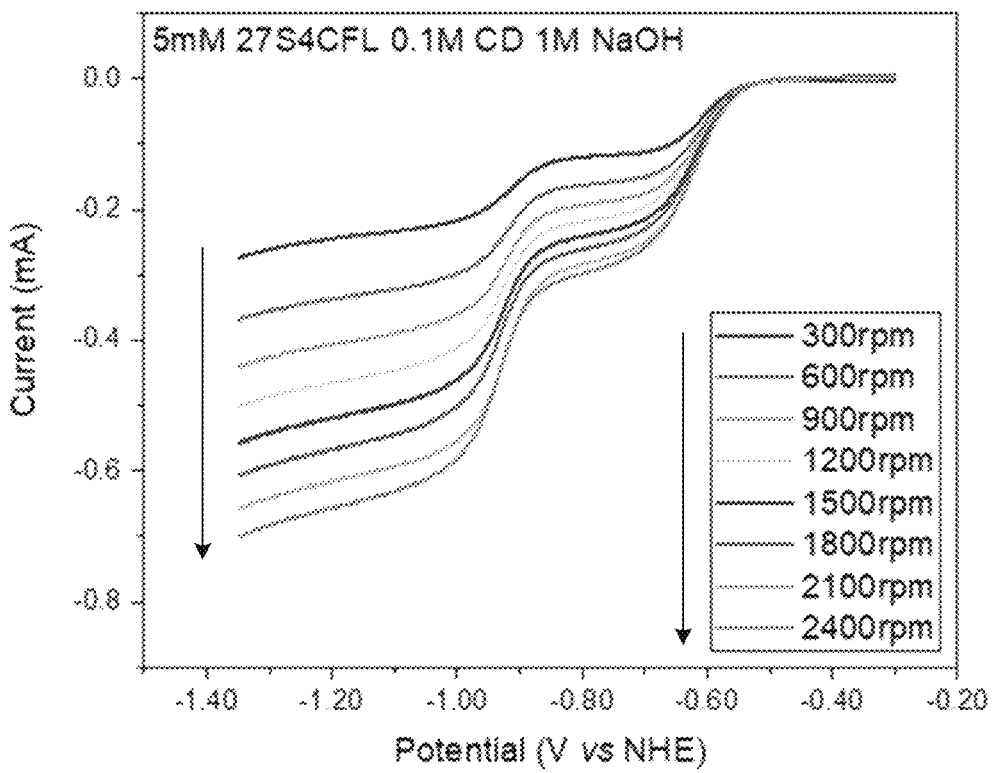
Figure 29B:
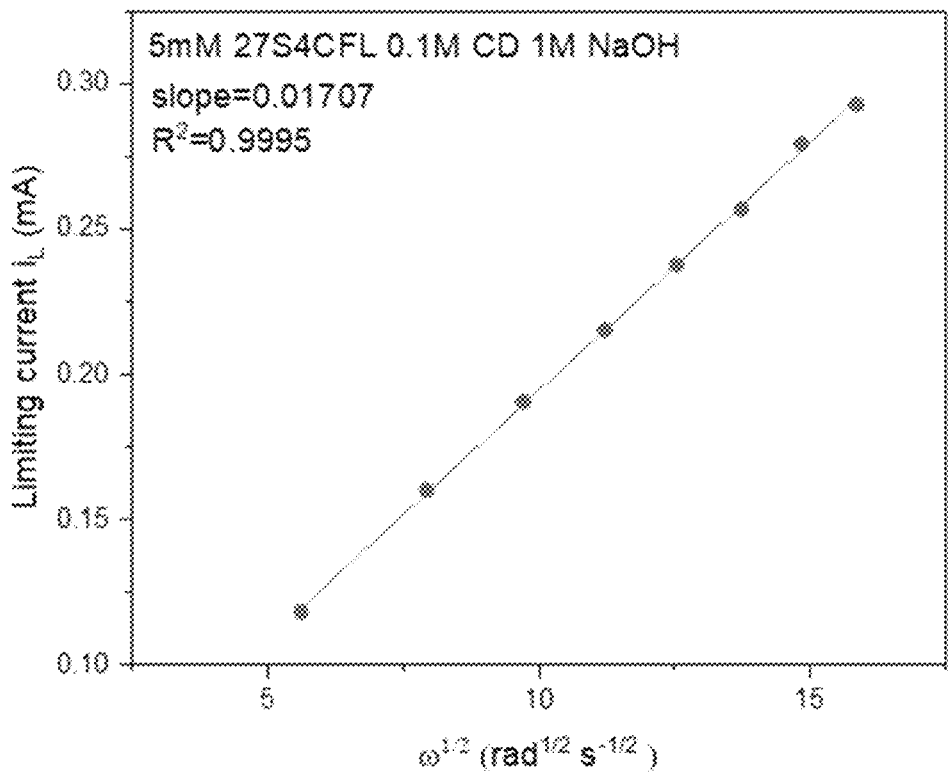
Figure 29C:
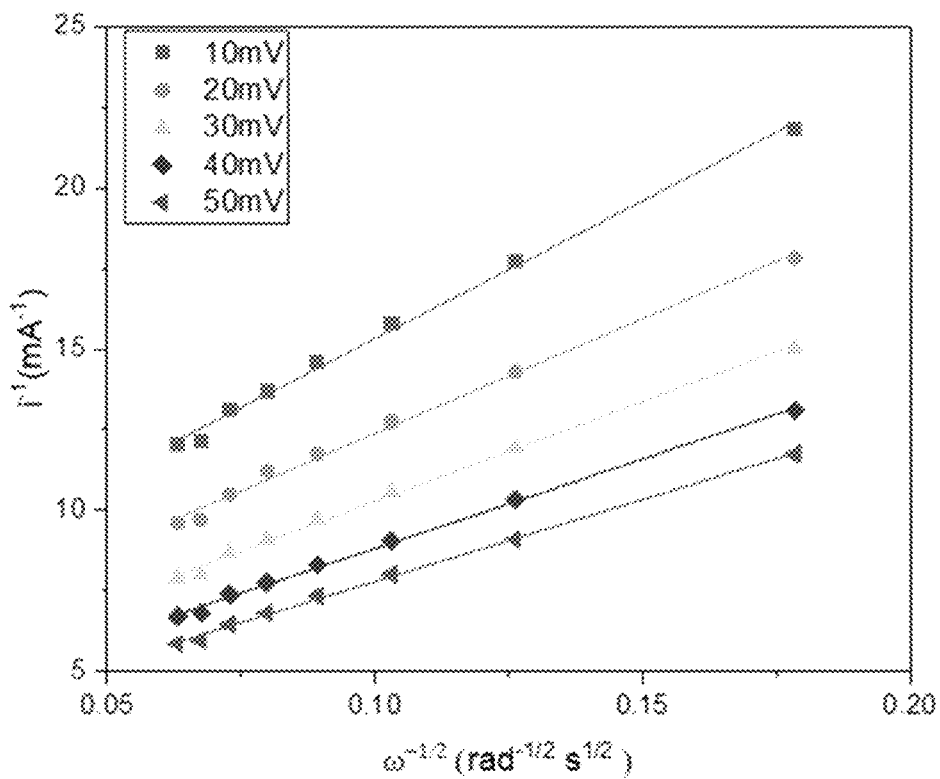
Figure 29D:
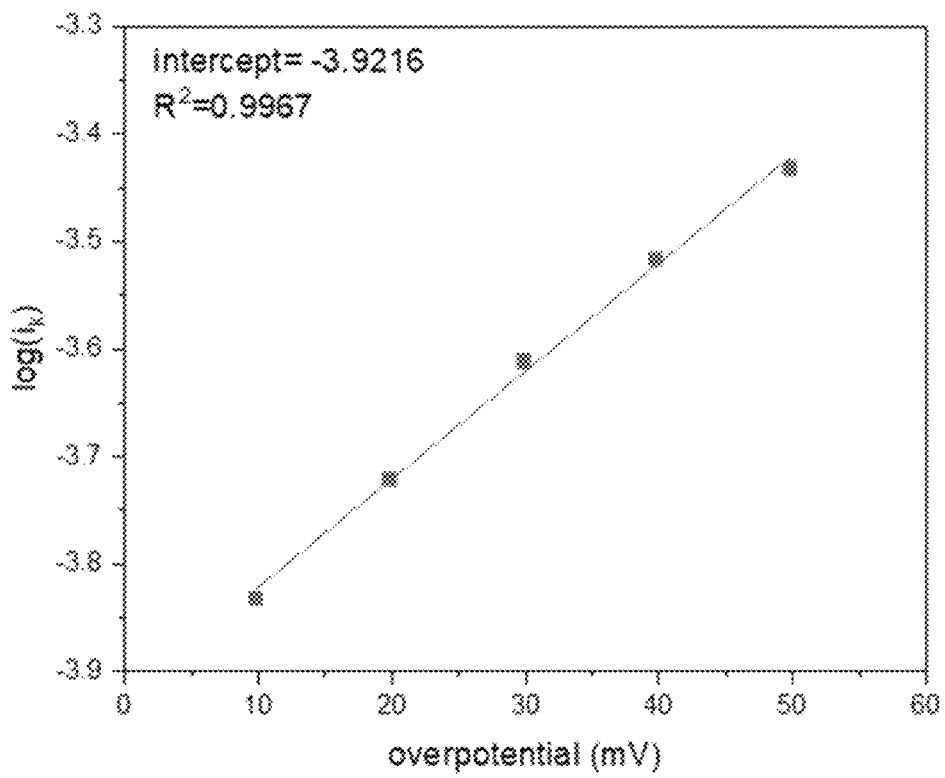

As expected, the sorbitol case revealed the highest rate capability enhancement due to its lowest viscosity increment, befitting a better mass transfer. The discharge capacity remained 81.4% at 80 mA/cm², 68.4% at 100 mA/cm² compared to the 5 mA/cm² test. Both β-CD and α-CD cases demonstrated similar effects due to their inherent similar molecular structure and physical property. The guanidium salt containing electrolyte had the lowest electrolyte conductivity with the cell performance lower than other additives cases. This phenomenon was suspected to be related to membrane fouling (Journal of Power Sources 2010, 195: 30-38). A full cell resistance increment was observed during a 24 h period monitoring, suggesting electrode passivation or membrane fouling (FIG. 27). The diglycol case showed the lowest enhancement. A control experiment using diglyme was conducted (FIG. 28) due to their similar molecular chain like structure except the hydroxyl group and methoxy group difference. Another purpose was to rule out the liquid form diglycol influence, which technically can be considered as organic solvent and may cause a water concentration (proton source) difference compared with other additive cases. The comparison result still suggested under similar ratio of organic solvent and water, that a proton acceptor other than hydroxide was needed for the enhancement. The 2 M urea case test was an example of an additive that doesn't generate anionic RNH⁻ in alkaline water as a proton acceptor, nor have the ability to serve as a proton acceptor to generate $RNH_3^+$ in alkaline solution. Even with better conductivity and viscosity (FIGS. 24A-24D) than the other tested additives, no boosting effect was observed. This example suggested the proton loop is important (FIG. 4, reaction III). To summarize, suitable proton acceptors can enhance fluorenol PCET process for increased radical anion supply. In a battery context, battery performance was based on the balance of the negative (physical character) and positive effects (fluorenol oxidation) of the additive.

Although the curves are similar, the charge and discharge curves of the test with additives showed increased accessible discharge capacity. The radical anion kinetics were verified to be on par with other reported redox active materials like DHAQ by rotating disk electrode (RDE) (FIGS. 29A-29D). The study was performed with 27S4CFL (5 mM) in 0.1 M β-CD/1 M NaOH. The calculated diffusion coefficient was $7.56 \times 10^{-6}$ cm$^2$/s. The calculated kinetic reduction rate constant for the first electron was $3.51 \times 10^{-3}$ cm/s. The first electron reduction rate constant was similar to a blank test, while the diffusion coefficient was 10 times slower than blank test (Feng et al., *Science* 2012, 372:836). The addition of a proton regulator like β-CD serves as an additional route to supply radical anion for battery discharge and overcome the kinetic limitation by comproportionation reaction rate at high DOD.

Figure 30A:
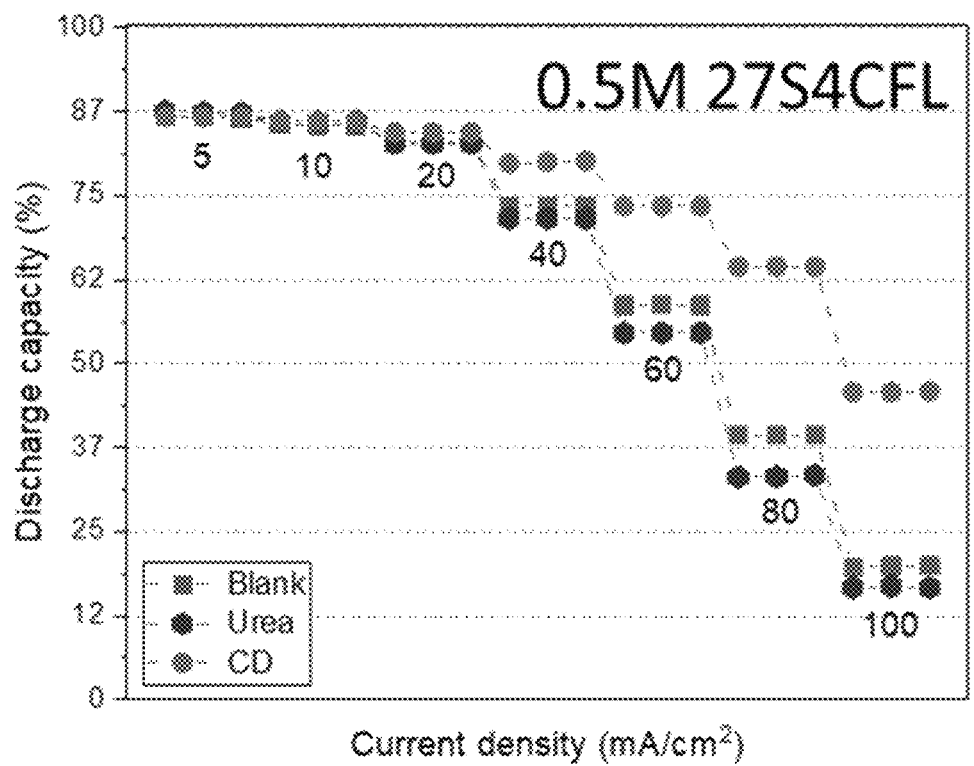
FIGS. 30A-30C are graphs showing boosting effects of β-CD with different FL derivatives—0.5 M 27S4CFL (FIG. 30A), 0.5 M 4C7SFL (FIG. 30B), and 0.5 M 27F4CFL (FIG. 30C). The additive was controlled at 0.1 M; 1 M NaOH was used as the supporting electrolyte.
Figure 30B:
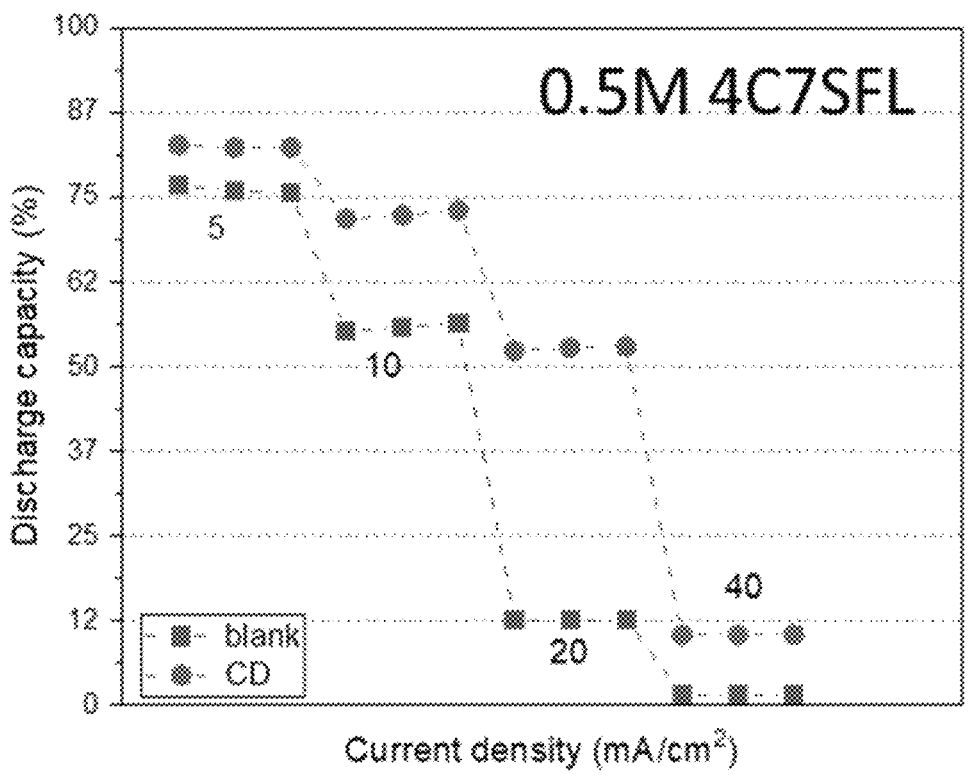
Figure 30C:
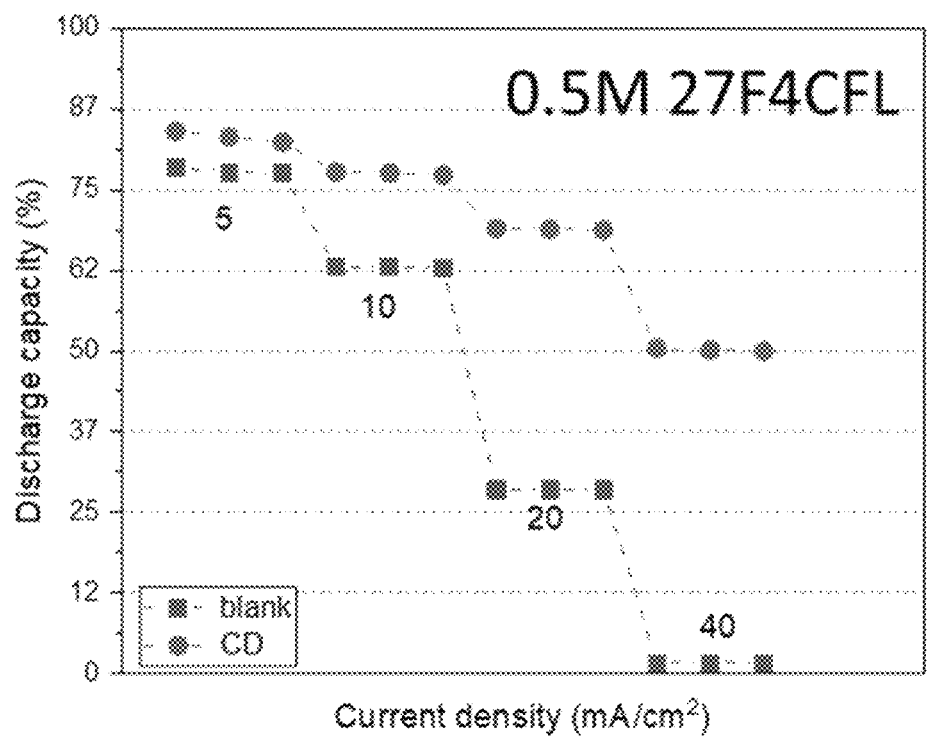

This enhancing phenomenon can be extended to other substituted FLs (e.g., 27S4CFL, 4C7SFL, and 27F4CFL) sharing the same coupled chemical reaction electrochemical process mechanism (FIGS. 30A-30C). The additive was controlled at 0.1 M; 1 M NaOH was used as the supporting electrolyte. It should be noted that due to different substituents, the fluorenol compounds have different pKa values and can behave differently in the absence of the additive.

Figure 31:
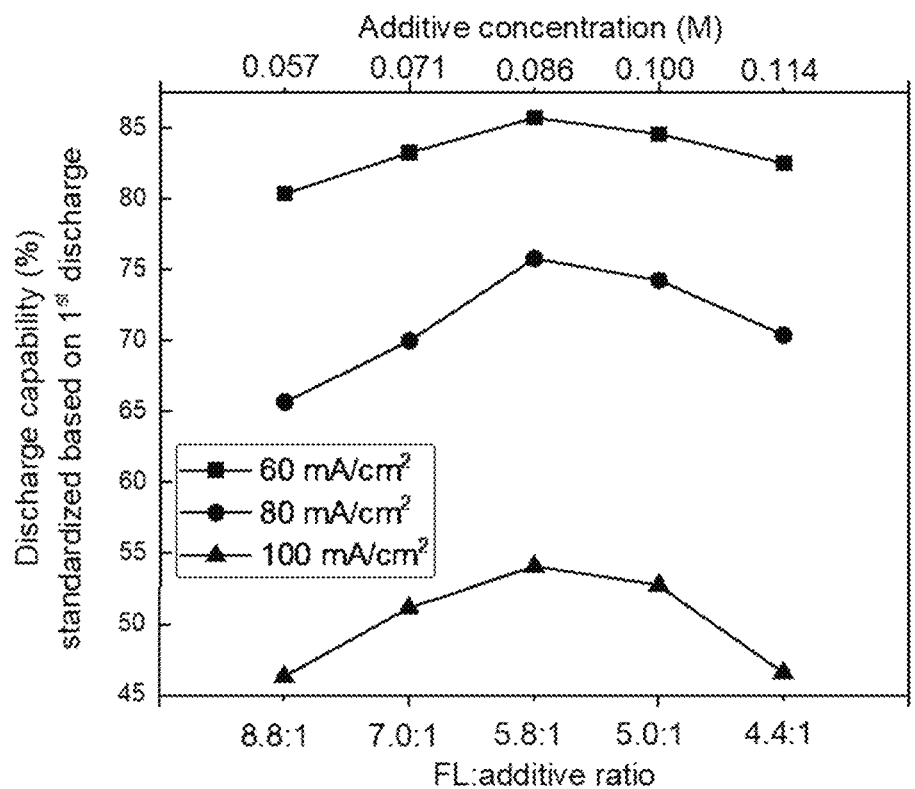
FIG. 31 is a graph showing the discharge capability as a function of the FL (27S4CFL) to additive (β-CD) ratio.

A concave-shaped performance with varying the ratio of FL (0.5 M) and β-CD additive peaked at 5.8:1 (FIG. 31). This concave-shaped performance as a function of material/additive ratio confirms the best battery rate performance is achieved when the negative and positive effects of the additive are balanced. The result suggested the addition of β-CD can exhibit an overall positive effect when added in a suitable amount. The higher the current density, the more pronounced the peak performance was.

For practical battery design, active material solubility is one of the design principles. β-CD is well studied for its interaction with substrates via guest-host interactions, thus resulting in increased guest solubility (Li et al., *ChemSusChem* 2021, 14:745-752). Fluorenone also follows this discipline. The measured solubility of 4C7SFL was close to 1.9 M (corresponding to 101.8 Ah/L volumetric capacity) with less than 0.1 M β-CD added (close to 30% increase compared with the solubility of 4C7SFL without β-CD). With such highly uneven ratio of FL and β-CD, it is believed that the hydrotropic effect plays a major role in the solubility increment. The large molecular structure of β-CD also is an advantage, potentially alleviating crossover during long time operation. With these additional benefits, both 27S4CFL and 4C7SFL were subjected to extended battery cycling test at close to saturated concentration (FIGS. 32A and 32B, respectively) with β-CD as additive. In the demonstrated 27S4CFL case (0.7 M 27S4CFL/1 eq NaOH, 0.86 M β-CD, 1 M NaOH; catholyte—0.3 M potassium ferrocyanide, 0.3 M potassium ferricyanide, 1 M NaOH), the battery exhibited 0.025%/day observed capacity decay rate over the continuous operation of over half year, with VE decreased 9% (FIG. 32A). In the galvanostatic step, the current was held at 40 mA/cm$^2$ until the 1.6 cutoff voltage was reached during charging, and at 20 mA/cm$^2$ until the 0.2 V cutoff voltage was reached during discharge. In the potentiostatic step, the potential was held at 1.4 V until 2 mA/cm$^2$ was reached during charging, and at 0.6 V until the 0.2 mA/cm$^2$ cutoff current was reached during discharging. The catholyte material was refreshed at cycle 1600. This VE decrease suggested the battery experienced internal resistance increase, potentially resulted from membrane fouling and electrode passivation. A similar capacity decay rate was observed in the 4C7SFL case, at 0.020%/day over 160 days, with around 5% VE drop (FIG. 32B). The same galvanic/potentiostatic cycling protocol was applied, except 20 mA/cm$^2$ was employed at the constant current step. The battery voltage efficiency experienced fluctuations in both cases, which were being tested during the same time period. This fluctuation was attributed to environment temperature change during the testing period. The stable cycling with low capacity decay rate are the comprehensive result of battery operation including material crossover, cell parts/membrane aging and material degradation over a period of more than half year. This demonstration suggested β-CD to be an exceptional additive for higher battery energy density, long time stability and inexpensive/non-toxic homogeneous organic catalyst for battery kinetics.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:
1. An aqueous composition, comprising:
   an aqueous anolyte comprising
   (i) a fluorenone/fluorenol derivative or a salt thereof having a structure according to any one of formulas I-III

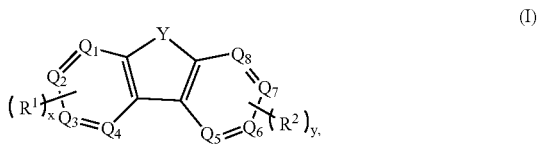

(I)

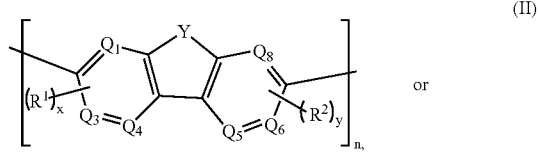

(II)

or

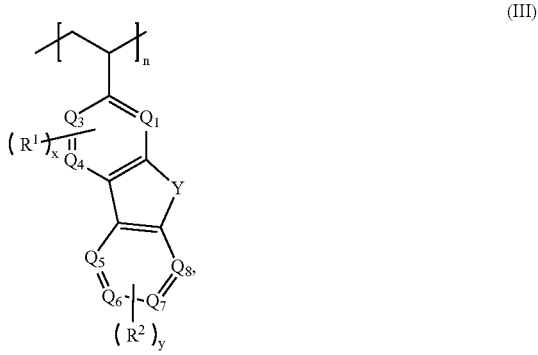

(III)

where $Q^1$-$Q^4$ independently are CH, C($R^1$) or N, wherein 0, 1, or 2 of $Q^1$-$Q^4$ are N, $Q^5$-$Q^8$ independently are CH, C($R^2$), or N, wherein 0, 1, or 2 of $Q^5$-$Q^8$ are N, Y is C=O or C(H) OH,
each $R^1$ and $R^2$ independently is an electron withdrawing group,
n is an integer >1, and
x and y independently are 0, 1, 2, 3, or 4, where if none of $Q^1$-$Q^8$ is N, then x and y are not 0, and
   (a) $R^1$ and $R^2$ are different electron withdrawing groups, or (b) the compound comprises two different $R^1$ or two different $R^2$ groups, or
(c) both (a) and (b);
(ii) an additive, wherein the additive is an organic compound including one or more proton acceptor groups;
(iii) an alkali metal hydroxide; and
(iv) water.

2. The aqueous composition of claim 1, wherein:
(i) the additive comprises two or more proton acceptor groups; or
(ii) wherein the additive has a pKa of from 9 to 17; or
(iii) both (i) and (ii).

3. The aqueous composition of claim 1, wherein the proton acceptor groups comprise —OH, —N($R^A$)$R^B$, —O$^-$Z, or any combination thereof, where Z is a counterion with a +1 charge, and $R^A$ and $R^B$ independently are H, unsubstituted $C_1$-$C_6$ alkyl, or substituted $C_1$-$C_6$ alkyl.

4. The aqueous composition of claim 1, wherein the additive comprises an oligosaccharide, a sugar alcohol, a glycol, guanidinium chloride, an amine, or any combination thereof.

5. The aqueous composition of claim 1, wherein the additive comprises a cyclodextrin, D-sorbitol, diglycol, guanidinium chloride, or any combination thereof.

6. The aqueous composition of claim 1, wherein:
(i) the additive is present in the anolyte at a concentration of from 0.05 M to 2 M; or
(ii) the additive is present in the anolyte at a concentration of from 1.5 N to 2 N with respect to proton acceptor groups; or
(iii) both (i) and (ii).

7. The aqueous composition of claim 1, wherein the additive comprises β-cyclodextrin.

8. The aqueous composition of claim 7, wherein the anolyte comprises 0.07 M to 0.1 M β-cyclodextrin.

9. The aqueous composition of claim 1, wherein each $R^1$ and $R^2$ independently is —SO$_3$Z, —CO$_2$Z, —CF$_3$, —NO$_2$, —CN, or —OH, wherein each Z independently is a counterion with a +1 charge.

10. The aqueous composition of claim 1, wherein the fluorenone/fluorenol derivative has a structure according to any one of formulas IA-IC, IIA-IIB, or IIIA-IIIC:

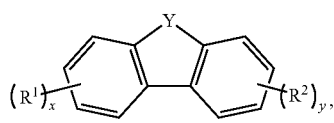
(IA)

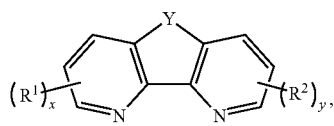
(IB)

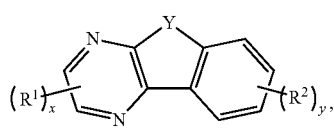
(IC)

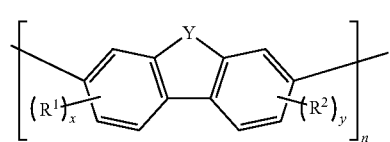
(IIA)

-continued

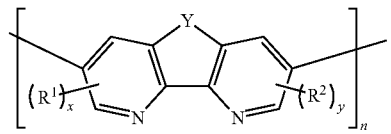
(IIB)

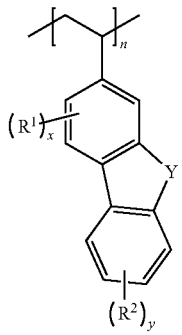
(IIIA)

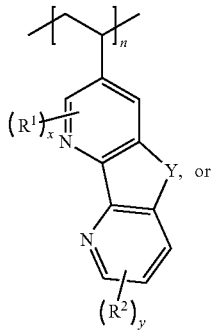
(IIIB)

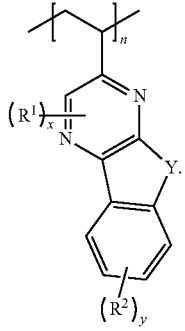
(IIIC)

11. The aqueous composition of claim 1, wherein the fluorenone/fluorenol derivative comprises

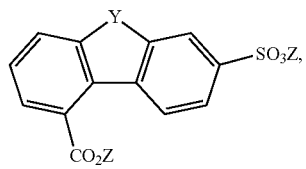

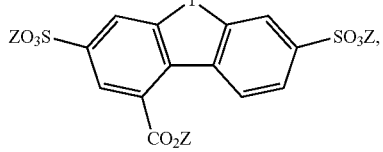

-continued

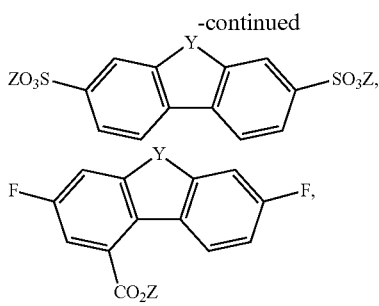

or any combination thereof, where Y is C=O or C(H)OH, and each Z independently is a counterion with a +1 charge.

12. The aqueous composition of claim 11, wherein the additive comprises a cyclodextrin, D-sorbitol, diglycol, guanidinium chloride-, diglyme, or any combination thereof.

13. The aqueous composition of claim 12, wherein the additive comprises β-cyclodextrin.

14. The aqueous composition of claim 1, wherein:
(i) the fluorenone/fluorenol derivative is present in the anolyte at a concentration of 0.5 M to 1.5 M; or
(ii) the additive is present in the anolyte at a concentration of from 1.5 N to 2 N with respect to proton acceptor groups; or
(iii) the alkali metal hydroxide is present in the anolyte at a concentration of from 0.1 M to 6 M; or
(iv) any combination of two or more of (i), (ii), and (iii).

15. The aqueous composition of claim 1, consisting essentially of:
the fluorenone/fluorenol derivative;
the additive;
the alkali metal hydroxide; and
water.

16. An aqueous electrolyte system for a redox flow battery system, comprising:
an aqueous anolyte comprising an aqueous composition according to claim 1; and
an aqueous catholyte comprising water and an electrochemically active material.

17. The aqueous electrolyte system of claim 16, wherein the aqueous catholyte comprises:
$K_4Fe(CN)_6$, $K_3Fe(CN)_6$, or a combination thereof; and water.

18. The aqueous electrolyte system of claim 16, wherein the additive comprises a cyclodextrin, D-sorbitol, diglycol, guanidinium chloride-, diglyme, or any combination thereof.

19. The aqueous electrolyte system of claim 16, wherein:
(i) the fluorenone/fluorenol derivative comprises

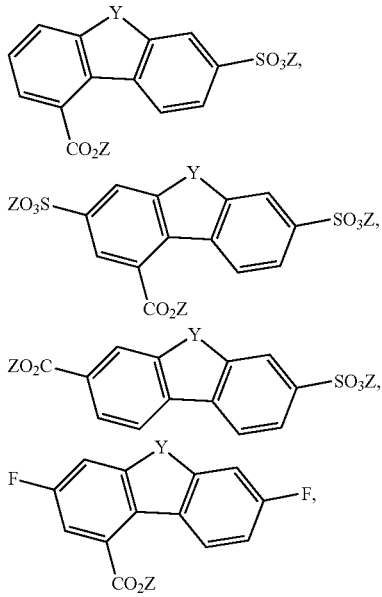

or any combination thereof, where Y is C=O or C(H)OH, and each Z independently is a counterion with a +1 charge; or
(ii) the additive comprises a cyclodextrin; or
(iii) both (i) and (ii).

20. A redox flow battery system, comprising:
the aqueous electrolyte system of claim 16;
an anode;
a cathode; and
a separator.

* * * * *